(12) United States Patent
Fukui et al.

(10) Patent No.: US 6,627,830 B2
(45) Date of Patent: Sep. 30, 2003

(54) PUSH BUTTON AND TEACHING PENDANT WITH THE PUSH BUTTON

(75) Inventors: Takao Fukui, Osaka (JP); Kenji Miyauchi, Osaka (JP); Kazuya Okada, Osaka (JP); Yasushi Kamino, Osaka (JP); Ken Maeda, Osaka (JP); Yoshio Sekino, Osaka (JP)

(73) Assignee: Idec Izumi Corporation, Osaka (JP)

( * ) Notice: Subject to any disclaimer, the term of this patent is extended or adjusted under 35 U.S.C. 154(b) by 6 days.

(21) Appl. No.: 10/089,494

(22) PCT Filed: Jul. 25, 2001

(86) PCT No.: PCT/JP01/06417

§ 371 (c)(1),
(2), (4) Date: Mar. 28, 2002

(87) PCT Pub. No.: WO02/11162

PCT Pub. Date: Feb. 7, 2002

(65) Prior Publication Data

US 2003/0027107 A1 Feb. 6, 2003

(51) Int. Cl.[7] .................................................. H01H 5/08
(52) U.S. Cl. ...................................... 200/434; 200/509
(58) Field of Search ................................ 200/434, 509, 200/341, 334, 330, 18, 435, 1 R, 17 R, 16 D–16 R, 17 B, 1 B, 51 LM, 520, 521, 530, 532, 534, 535, 298, 431, 438, 441

(56) References Cited

U.S. PATENT DOCUMENTS 6,028,274 A * 2/2000 Harris ....................... 200/52 R
6,288,352 B1 * 9/2001 Fukui et al. ................ 200/435
6,433,291 B1 * 8/2002 Mori et al. ................. 200/437

FOREIGN PATENT DOCUMENTS

| EP | 0702384 | 3/1996 |
|---|---|---|
| JP | 60-94737 | 6/1985 |
| JP | 6-103850 | 4/1994 |
| JP | 7-262865 | 10/1995 |
| JP | 10-92262 | 4/1998 |
| WO | WO95/025333 | 9/1995 |

* cited by examiner

Primary Examiner—Lincoln Donovan
Assistant Examiner—Lisa Klaus
(74) Attorney, Agent, or Firm—Jordan and Hamburg LLP

(57) ABSTRACT

A push-button switch and a teaching pendant employing the same are provided. The push-button switch ensures that a push button is capable of switching ON/OFF the switch if one of contacts thereof should fail during an operation of the switch. For achieving this object, a switch case 3 contains two c-contacts 9a, 9b each having a snap action configuration and switching mechanisms 11a, 11b for opening/closing the c-contacts 9a, 9b. When a push button 5 is depressed, the switching mechanisms 11a, 11b simultaneously open/close the c-contacts 9a, 9b for turning ON/OFF a push-button switch 1.

13 Claims, 39 Drawing Sheets

PUSH BUTTON AND TEACHING PENDANT WITH THE PUSH BUTTON

TECHNICAL FIELD

The present invention relates to a push-button switch adapted to shift from a first OFF state to an ON state according to the increase of the amount of depression of a push button and then to shift to a second OFF state according to further depression of the push button, and also relates to a teaching pendant comprising the same.

BACKGROUND ART

In cases where, for example, a manual operation is performed on numerically controlled machines such as robots, an operator often enters a dangerous area to carry out his job. In such cases, a teaching pendant with a push-button switch, such as called an enable switch (or deadman switch), is used for preventing an accident due to contact with the machine during the work.

As shown in FIG. 34, a teaching pendant 600 is a portable unit which is used as connected with a control unit to teach a program to the robot or to operate the robot. The teaching pendant 600 includes an input keyboard 601 disposed on a main surface and a push-button switch (enable switch) 602 disposed on one side surface thereof. In some cases, the push-button switch 602 may be disposed on a rear surface of the teaching pendant 600. The teaching pendant 600 further includes a signal cable 603 for connection with the control unit not shown.

Such a teaching pendant employs a push-button switch which is called a snap action type, as shown in FIG. 35 for example.

As seen in FIG. 35, the push-button switch 602 includes a push button 605 and a microswitch 606 in opposing relation with the push button. The push button 605 is provided with a leaf spring 607 extended downwardly from a bottom surface thereof. Disposed on a top surface of the microswitch 606 are a resilient push plate 608 and an actuator 609. A bent portion 607a is formed at a tip of the leaf spring 607.

The push-button switch 602 is used as follows. First, the teaching pendant 600 incorporating the push-button switch 602 is connected, via the signal cable 603, with a control panel of a machine to be manually operated. If the push-button switch 602 is in the OFF state at this time, manipulating the keyboard 601 of the teaching pendant 600 does not effect the key entry.

Next, depressing the push button 605 brings the bent portion 607a of the leaf spring 607, moved in unison with the push button 605, into engagement with the push plate 608 of the microswitch 606. At the same time, the push plate 608 is resiliently deformed downward to press down the actuator 609, as shown in FIG. 36. This causes the actuator 609 to descend to bring a contact within the microswitch 606 into a contacted state, so that the microswitch 606 is shifted to the ON state.

The operator performs key entry via the keyboard 601 of the teaching pendant 600 while keeping the push button 605 depressed so as to maintain the microswitch in the ON state. If, during the operation, the operator releases the push button 605 sensing the danger of contacting some moving part of the machine manually operated, the push button 605 returns to the state shown in FIG. 35, thereby shifting the microswitch 606 to the first OFF state or the initial state. That is, the machine is brought into standstill.

In a case where the operator, who is in panic facing the imminent danger, further depresses the push button 605, the bent portion 607a of the leaf spring 607 slides on the push plate 608 to disengage therefrom, as shown in FIG. 37, so that the push plate 608 is returned to its original position by its restoring force. This shifts the microswitch 606 to the second OFF state for deactivating the machine.

Thus, the push-button switch 602 is adapted to permit the key entry through the keyboard 601 of the teaching pendant 600 only when the microswitch 606 is in the ON state. Furthermore, the push-button switch 602 can be set to any of the three positions (the first OFF state, ON state and second OFF state) according to the amount of depression of the push button 605. Therefore, the operator's intent during the manual operation of the machine can be distinctly implemented and hence, the operator's safety is ensured.

As the push-button switch having such three positions, there may be employed a push-button switch of a so-called slow action type, as shown in FIG. 38.

As shown in FIG. 38, such a push-button switch 701 includes a switch case 702, a push button 703 depressibly supported by the switch case 702, a pair of stationary terminals 705 each attached to a leaf spring 704 disposed within the switch case 703, a pair of movable terminals 707 attached to a bracket 706 and adapted to be brought into or out of contact with the stationary terminals 705, and a switching mechanism 708 moving in response to the depression of the push button 703 for bringing the movable terminals 707 into contact with the stationary terminals 705 and designed to separate the movable terminals 707 from the stationary terminals 705 when the depression of the push button reaches a predetermined amount. In the push-button switch 701, the movable terminal 707 and the stationary terminal 705 constitute a normally open contact.

The push button 703 is formed with an accommodating portion 709 defining a rectangular internal space in plan, the accommodating portion 709 formed with slopes 710 on opposite walls thereof.

The switching mechanism 708 includes an insertion member 712 disposed in the accommodating portion 709 of the push button 703 and formed with a pair of bores 711, a pair of slide blocks 713 disposed in the respective bores 711 of the insertion member 712 as allowed to move horizontally (the transverse direction as seen in FIG. 38), a helical spring 714 interconnecting the insertion member 712 and the bracket 706 and urging the movable terminals 707 downwardly, and a shaft member 715 projecting downward from the bracket 706.

The slide blocks 713 are urged toward opposite ends of the push button 703 by helical springs 716 disposed in the respective bores 711 of the insertion member 712. The slide blocks 713 are each formed with a slope 717 at one end thereof for engagement with each of the slopes 710 of the push button 703.

The shaft member 715 has its lower portion inserted in a bore 718 formed at a bottom of the switch case 702. Disposed in the bore 718 is a return spring 719, an upper end of which is fixed to a lower end of the shaft member 715. Thus, the shaft member 715 is normally urged upward by an urging force of the return spring 719.

When the undepressed push button 703 in the first OFF state is depressed, the switching mechanism 708 is moved downward as interlocked with the push button 703 thereby pushing down the movable terminals 707 into contact with the stationary terminals 705, as shown in FIG. 39. Thus, the push-button switch 701 is shifted to the ON state. At this time, the slopes 710 of the push button 703 apply a pressure to the slopes 717 of the slide blocks 713 for moving the slide blocks 713 inwardly. However, the urging force of the helical spring 714 urging the slide blocks 713 upwardly is greater than this pressure, so that the slide blocks 713 stay at places to maintain the engagement with the push button 703.

When the push button 703 in the ON state is further depressed, the urging force of the helical spring 714 surpasses the force for urging the slide blocks 713 outwardly, so that the slide blocks 713 are moved inwardly of the insertion member 712 as the slopes 717 of the slide blocks 713 slid on the slopes 710 of the push button 703, as shown in FIG. 40. This results in the disengagement of the slide blocks 713 from the push button 703, while the switching mechanism 708 is moved upward by the return spring 719, as shown in FIG. 41. This movement involves an upward movement of the movable terminals 707, which are separated from the stationary terminals 705. Thus, the push-button switch 701 is shifted to the second OFF state.

The above conventional push-button switches 602, 701 are provided with only one contact. In a case where the contact does not work due to failure or the like during the data input operation, for example, the push-button switch is unable to respond to the ON/OFF switching, thus losing the function as the enable switch. Accordingly, the push-button switch fails to assure reliability.

In the push-button switch 701 of slow action type, the amount of depression of the push button 703 to shift the switch from the first OFF state to the ON state is equal to the amount of depression of the push button 703 to shift the switch from the ON state to the first OFF state. Therefore, if the depressed push button 703 of the push-button switch 701 in the ON state is released a little, for example, the movable terminals 707 move away from the stationary terminals 705. That is, the push-button switch 701 is prone to return from the ON state to the first OFF state. In the case of a long data input operation through the teaching pendant, for example, the operator may encounter an inadvertent interruption of the data input because an unintentional slight easing of the depression of the push button will return the push-button switch 701 to the first OFF state.

Furthermore, the push-button switch 701 of slow action type does not provide a tactile click-touch or a click sound when the switch is shifted from the first OFF state to the ON state. Hence, it is difficult for the operator pressing down the push button 703 to determine whether the push-button switch 701 is in the ON state or enabled for data entry.

In view of the foregoing, it is an object of the present invention to provide a push-button switch ensuring the ON/OFF switching thereof despite a failure of one contact during the manipulation of the push-button switch and to provide a teaching pendant employing the same.

It is another object of the present invention to provide a push-button switch adapted to prevent an unintentional shifting from the ON state to the first OFF state as a result of a slight easing of the depression of the push button and to provide a teaching pendant employing the same.

DISCLOSURE OF THE INVENTION

In accordance with the present invention for achieving the above objects, a push-button switch comprises a switch case; a push button depressibly supported by the switch case; a contact comprising a movable terminal disposed in the switch case in a manner that a first end thereof is rotatable about a second end thereof, and a normally open stationary terminal fixed to place in the switch case and arranged to be in or out of contact with the movable terminal through the rotation of the first end of the movable terminal; an operative member disposed in the switch case in a manner that a first end thereof is rotatable as interlocked with the depression of the push button; urging means having its opposite ends locked to the first end of the movable terminal and the first end of the operative member for urging the first end of the movable terminal while urging the first end of the operative member in a first direction; and releasing means brought into action by more than a predetermined amount of depression of the push button to release the operative member from the interlocked relation with the push button, and is characterized in that when in conjunction with the increase of the amount of depression of the push button, the amount of rotation of the first end of the operative member against the urging means is increased to a first dead point at which the urging force applied by the urging means to the movable terminal is changed from the first direction to a second direction, the movable terminal is brought into contact with the normally open stationary terminal thereby shifting the contact from a first OFF state to an ON state, that when the amount of rotation of the first end of the operative member released from the rotation against the urging means reaches a second dead point at which the urging force applied by the urging means to the movable terminal is changed from the second direction to the first direction, the movable terminal is moved away from the normally open stationary terminal thereby shifting the contact from the ON state to a second OFF state, and that two or more of the contacts are disposed in the switch case and are simultaneously turned ON or OFF by depressing the push button.

According to such an arrangement wherein two or more contacts for switching the push-button switch between the ON and OFF states are disposed in the switch case, the contacts can simultaneously be turned ON or OFF by depressing a single push button. Therefore, in the case of a failure of one of the contacts, for example, the push-button switch can be switched between the ON and OFF states by means of the other contacts. Thus, the push-button switch is improved in reliability.

The push-button switch according to the present invention is characterized in that as to transition from the ON state to the first OFF state resulting from eased depression of the push button, the amount of rotation of the first end of the operative member to reach the second dead point is set smaller than that of rotation of the first end of the operative member to reach the first dead point.

According to this arrangement wherein the amount of rotation of the first end of the operative member to reach the second dead point is set smaller than that of rotation of the first end thereof to reach the first dead point, the movable terminals are separated from the normally open stationary terminals by a smaller amount of depression of the push button than that required for bringing the movable terminals into contact with the normally open stationary terminals.

That is, the push-button switch has a so-called hysteresis characteristic that the switch requires a different amount of rotation of the first end of the operative member to be shifted from the first OFF state to the ON state than that required to be shifted from the ON state to the first OFF state. Therefore, even if the depression of the push button for maintaining the push-button switch in the ON state is eased, for example, the movable terminals are not separated from the normally open stationary terminals so long as the decrease of the depression of the push button is within a predetermined range or unless the amount of rotation of the operative member reaches the second dead point. Thus, the push-button switch is prevented from being inadvertently shifted from the ON state to the first OFF state.

The push-button switch according to the present invention is characterized in that one of the contacts includes a normally close stationary terminal, and that the one contact maintains the movable terminal and the normally close stationary terminal thereof in contacted relation when the other contacts are in the first OFF state, maintaining the movable terminal and the normally close stationary terminal thereof in separated relation when the other contacts are in the ON state, maintaining the movable terminal and the normally close stationary terminal thereof in contacted relation when the other contacts are in the second OFF state.

According to this arrangement wherein the one contact assumes the opposite open/close position to that assumed by the other contacts when the push-button switch is shifted from the first OFF state to the ON state or from the ON state to the second OFF state, it is readily determined that any one of the contacts is in failure when the one contact and the other contacts assume the open or close position at a time.

The push-button switch according to the present invention is characterized in that an auxiliary contact is disposed in the switch case, the auxiliary contact designed to be opened or closed when the contacts are in the first OFF state and to be closed or opened when the contacts are in the second OFF state.

According to this arrangement wherein there is provided the auxiliary contact switched between the open and close positions depending upon the first OFF state and the second OFF state, whether the push-button switch is in the first OFF state or in the second OFF state can be determined by monitoring the open/close position of the auxiliary contact.

More specifically, the movable terminals and the normally open stationary terminals of the contacts are open when the push-button switch is in the first OFF state and when the push-button switch is in the second OFF state. Therefore, it is impossible to determine the push-button switch to be in the first OFF state or in the second OFF state by merely monitoring the open/close relation between the movable terminals and the normally open stationary terminals. However, the provision of such an auxiliary contact permits the determination as to whether the push-button switch is in the first OFF state or in the second OFF state.

The push-button switch according to the present invention is characterized in that the auxiliary contact is provided in correspondence to each of the contacts. According to this arrangement wherein the auxiliary contact is provided in correspondence to each of the contacts, each of the contacts can be determined to be in the first OFF state or in the second OFF state by monitoring the corresponding auxiliary contact.

The push-button switch according to the present invention is characterized in that the auxiliary contact comprises a normally close contact designed to be closed when the contacts are in the first OFF state and to be opened when the contacts are in the second OFF state, and is provided with forcible separation means for forcibly opening the auxiliary contact in the second OFF state.

According to this arrangement, in a case where the auxiliary contact is fused, for example, the forcible separation means can forcibly open the auxiliary contact. This provides a positive distinction between the first OFF state and the second OFF state of the push-button switch.

The push-button switch according to the present invention further comprises a distribution member for evenly distributing a pressing load applied by depressing the push button. According to this arrangement, whatever portion of the push button is depressed, the distribution member evenly distributes the pressing load. This ensures that the plural contacts are opened or closed at a time.

The push-button switch according to the present invention further comprises a rubber cover mounted to place in a manner to cover the push button. According to this arrangement wherein the push button is covered by the rubber cover, the push-button switch is enhanced in watertightness.

The push-button switch according to the present invention further comprises an external button mounted to place in a manner to cover the push button. According to this arrangement wherein the push button is covered by the external button, a top surface of the push button is protected against deformation or fracture.

In accordance with the present invention, a teaching pendant is characterized in that a pendant body includes a left-hand and a right-hand operation sections to be held in the left hand and the right hand, respectively, and the push-button switches disposed at the respective inner sides of the operation sections to be operated by gripping the corresponding operation sections, and that gripping either one of the operation sections shifts the corresponding push-button switch to the ON state thereby enabling a data input operation.

According to this arrangement wherein there are provided the left-hand and right-hand operation sections with the respective push-button switches to be operated by gripping the corresponding operation sections, the data input operation can be done by either hand. In a case where, for example, the left hand is fatigued while depressing the left-hand operation section in order to maintain the push-button switch in the ON state for data input operation, the pendant body may be held by the right hand, in turn, so that the push-button switch may be maintained in the ON state via the right-hand operation section.

The teaching pendant according to the present invention is characterized in that when either one of the operation sections is gripped to shift the corresponding push-button switch at the inner side thereof to the second OFF state, the gripping of the other operation section does not enable the operation of the corresponding push-button switch at the inner side thereof.

According to this arrangement wherein with either one of the push-button switches placed in the second OFF state, the other push-button switch is disabled for operation, an effort to shift the other push-button switch to the ON state, for example, is ineffective to place the teaching pendant in the teaching mode. Thus, the data input operation is inhibited.

In accordance with the present invention, a teaching pendant is characterized in that a pendant body is provided with one piece of the push-button switch and a right-hand and a left-hand manipulation levers to be gripped by the right hand and left hand, respectively, for operative depression of the push-button switch, and that either one of the manipulation levers is manipulated to shift the push-button switch to the ON state, thereby enabling a data input operation.

According to this arrangement wherein the left-hand and right-hand manipulation levers are provided and the push-button switch can be operated via either of the manipulation levers, even when the left hand involved in the operation is fatigued, for example, the pendant body may be held in the right hand so as to continue the data input operation. Furthermore, the teaching pendant is reduced in costs because only one push-button switch is provided in the pendant body.

The teaching pendant according to the present invention is characterized in that when either one of the manipulation levers is gripped to shift the push-button switch to the second OFF state, the gripping of the other manipulation lever does not enable the operation of the push-button switch.

According to this arrangement, when the push-button switch is shifted to the second OFF state by gripping either one of the manipulation levers, the other manipulation lever is disabled for operation. Hence, data cannot be inputted unless both of the manipulation m levers are manipulated to shift the push-button switch to the first OFF state.

BEST MODES FOR PRACTICING THE INVENTION (First Embodiment)

Figure 4:
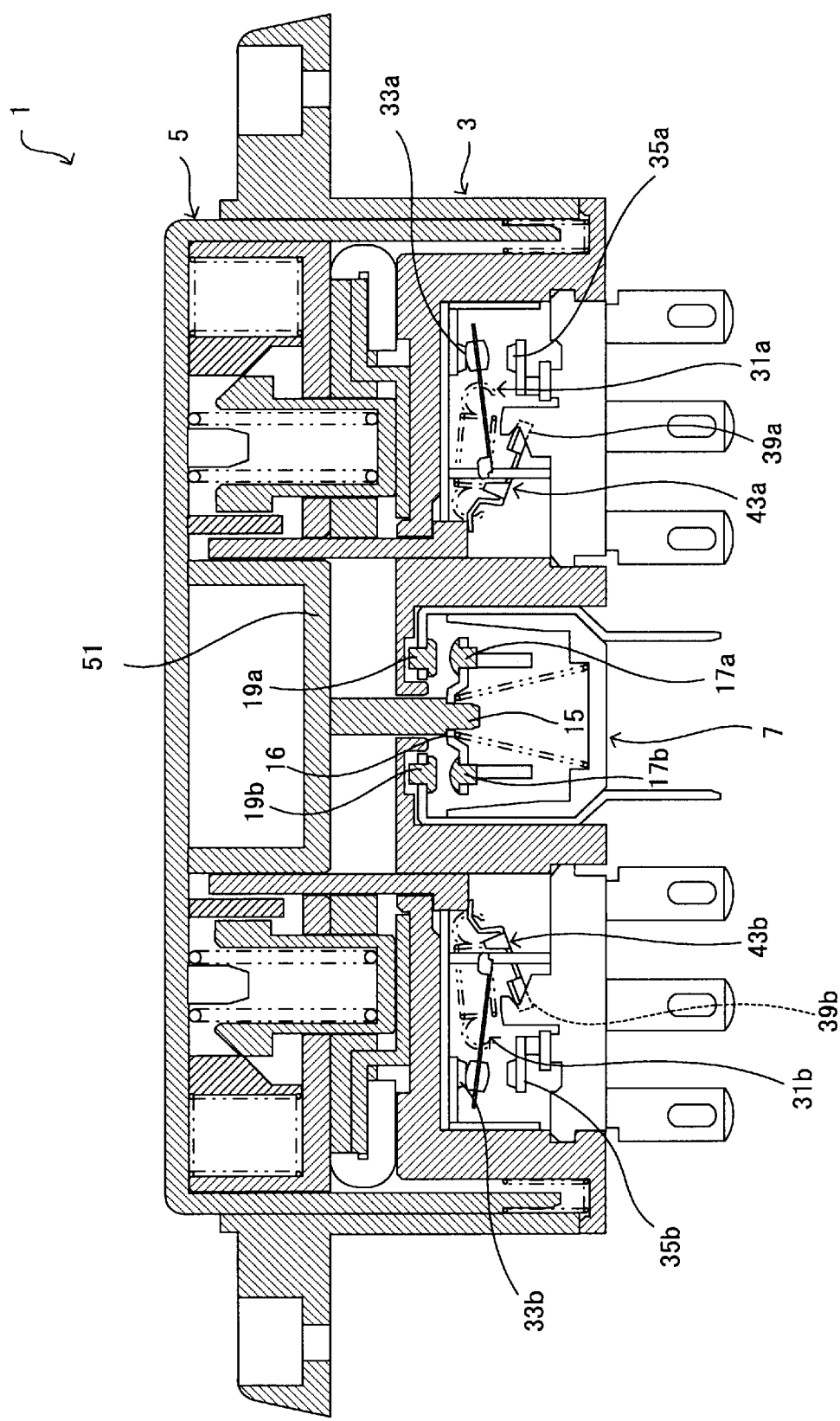
FIG. 4 is a sectional front view showing still another state of the push-button switch according to the first embodiment hereof.
Figure 5:
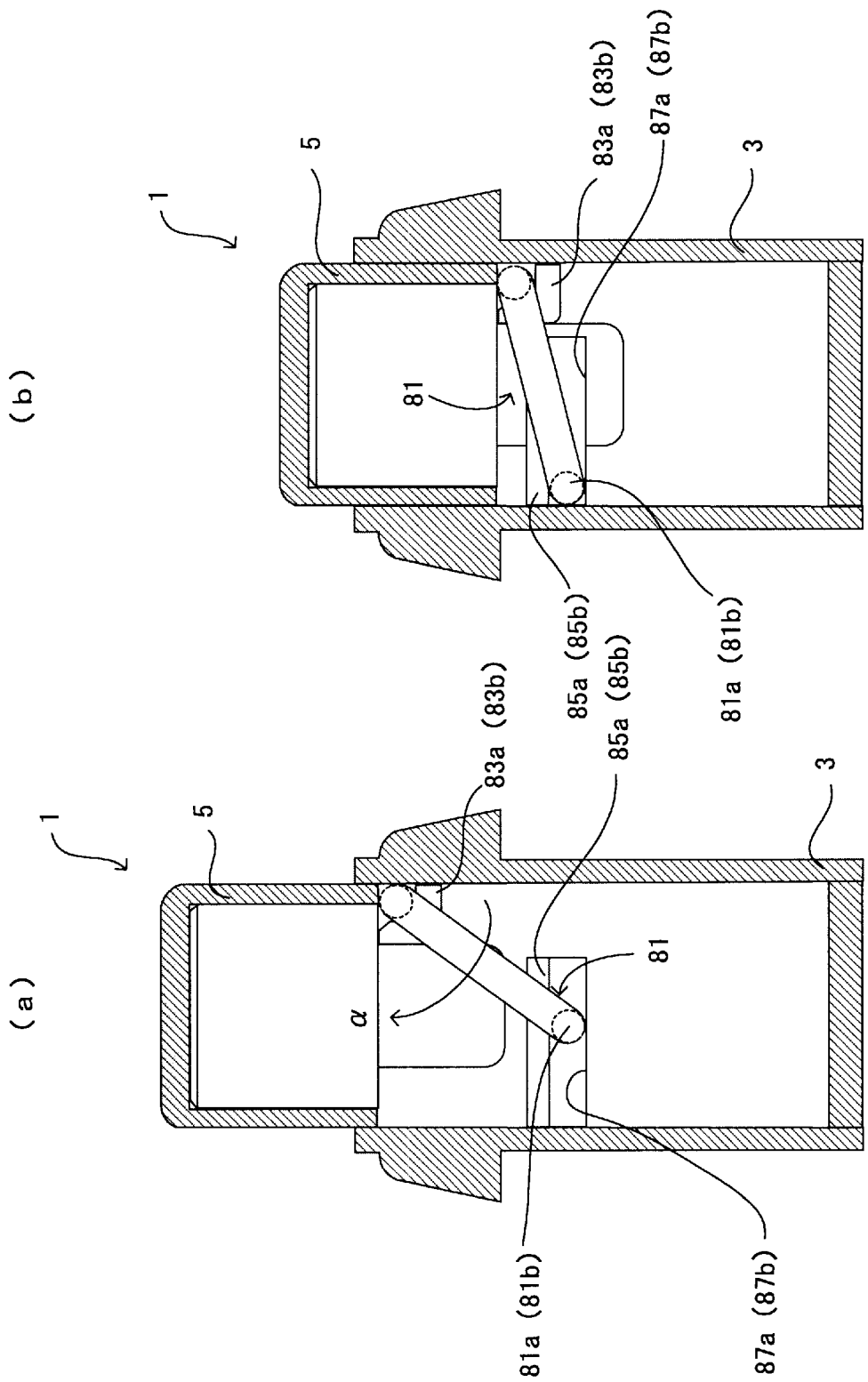
FIG. 5 is a group of sectional views taken on the line A—A in FIG. 1.
Figure 6:
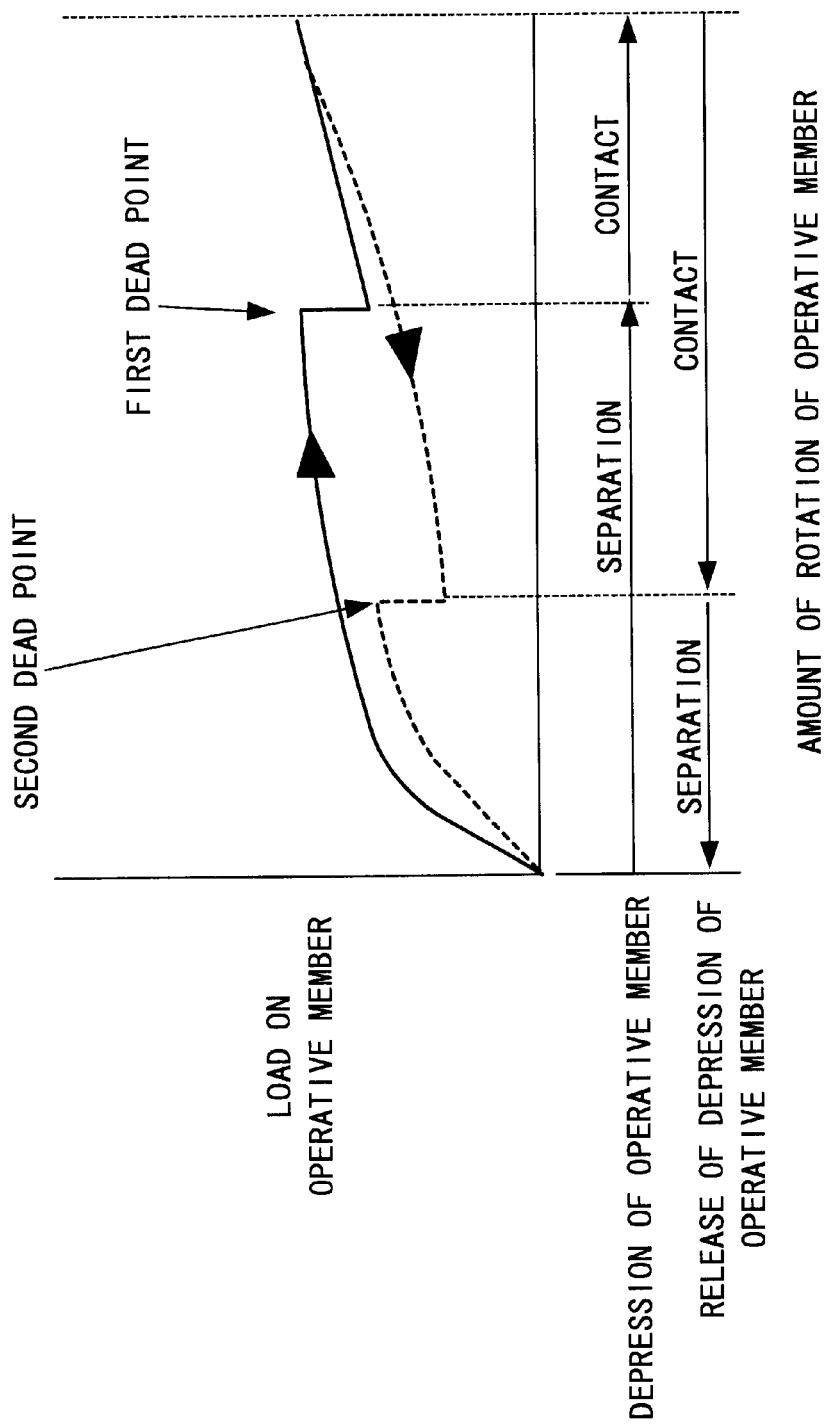
FIG. 6 is a graph representing a relation between the amount of rotation of an operative member of the first embodiment and the pressure load thereon.
Figure 7:
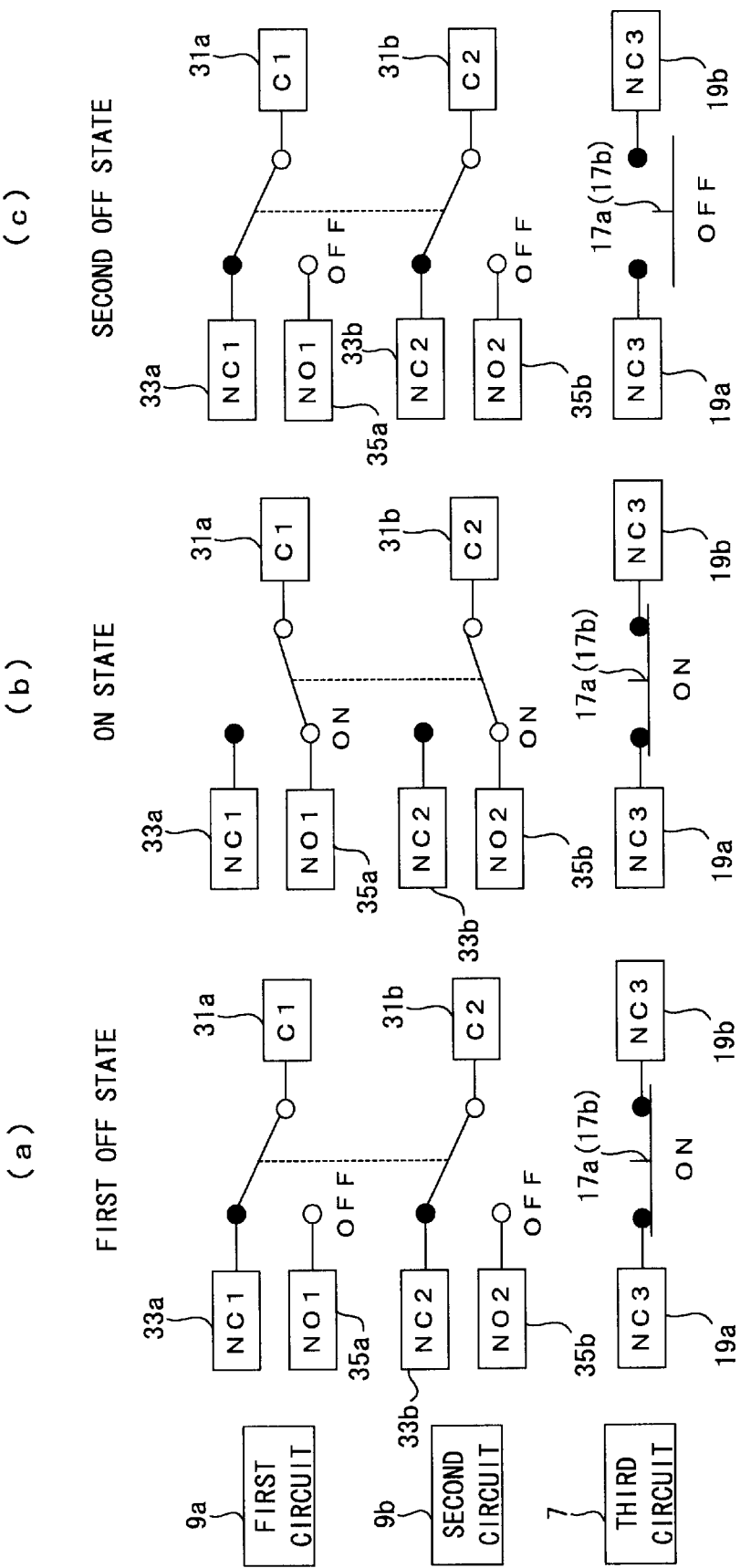
FIG. 7 is a group of circuit connection diagrams according to the first embodiment hereof.
Figure 9:
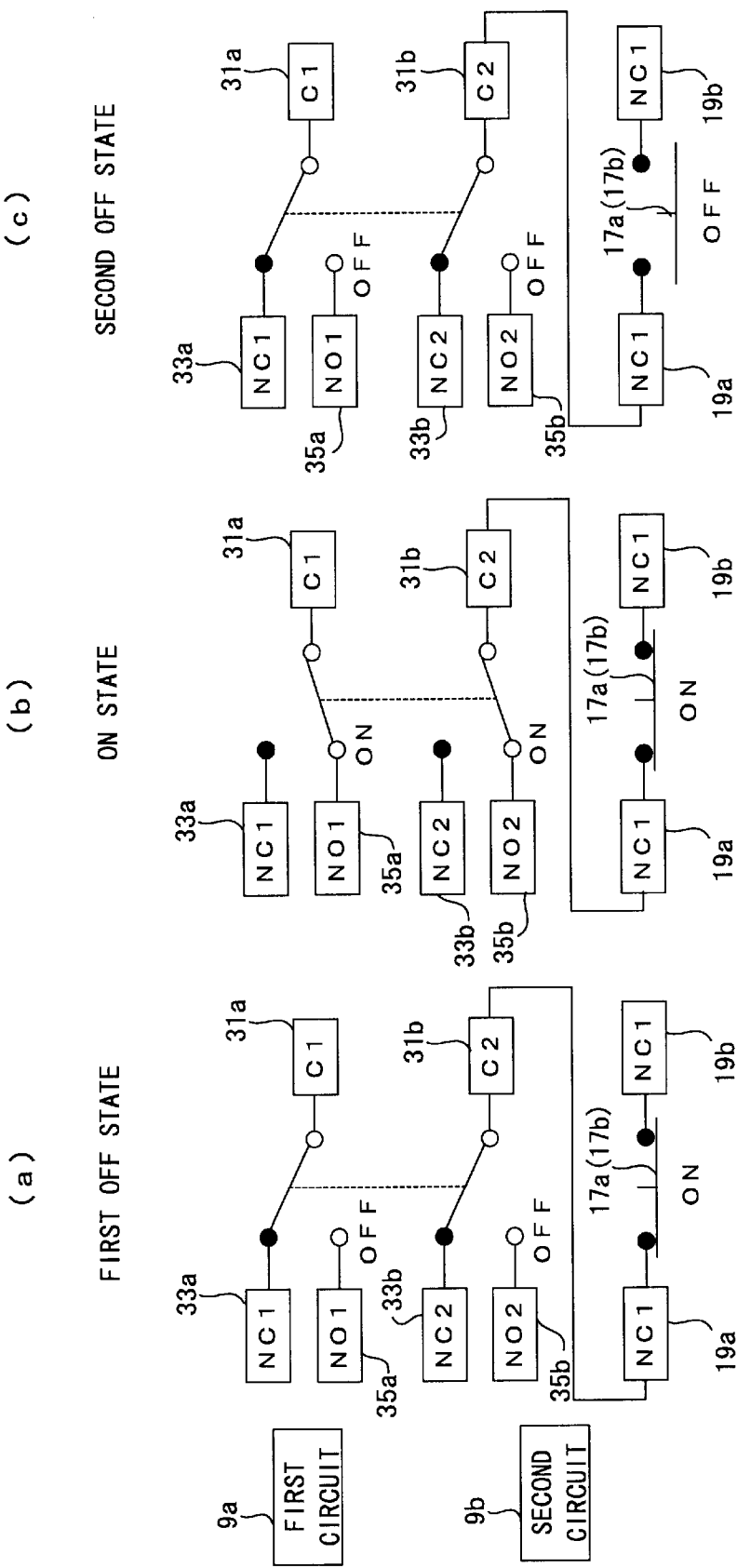
FIG. 9 is a group of diagrams showing an exemplary modification of the circuit connections according to the first embodiment hereof.
Figure 10:
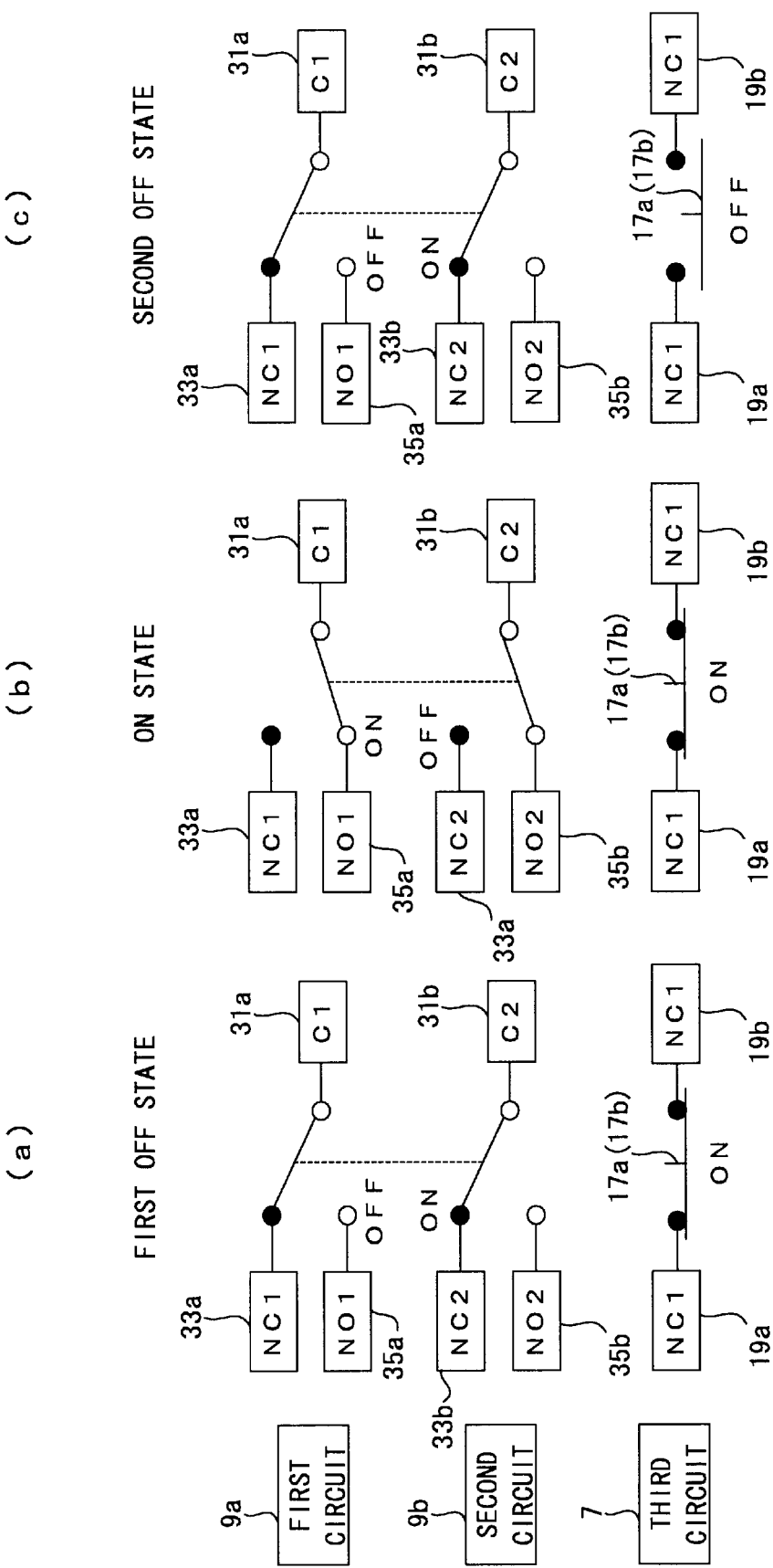
FIG. 10 is a group of diagrams showing another exemplary modification of the circuit connections according to the first embodiment hereof.

A first embodiment of the present invention will be described with reference to FIGS. 1 to 10. FIGS. 1 to 4 are sectional front views showing different states of a push-button switch; FIG. 5 is a group of sectional views taken on the line A—A in FIG. 1; FIG. 6 is a graph representing a relation between the amount of rotation of an operative member and the load thereon; FIGS. 7, 9 and 10 are connection diagrams of the push-button switch according to the first embodiment; and FIG. 8 a graph representing a relation between the operation stroke and the operating load of a push button.

Figure 1:
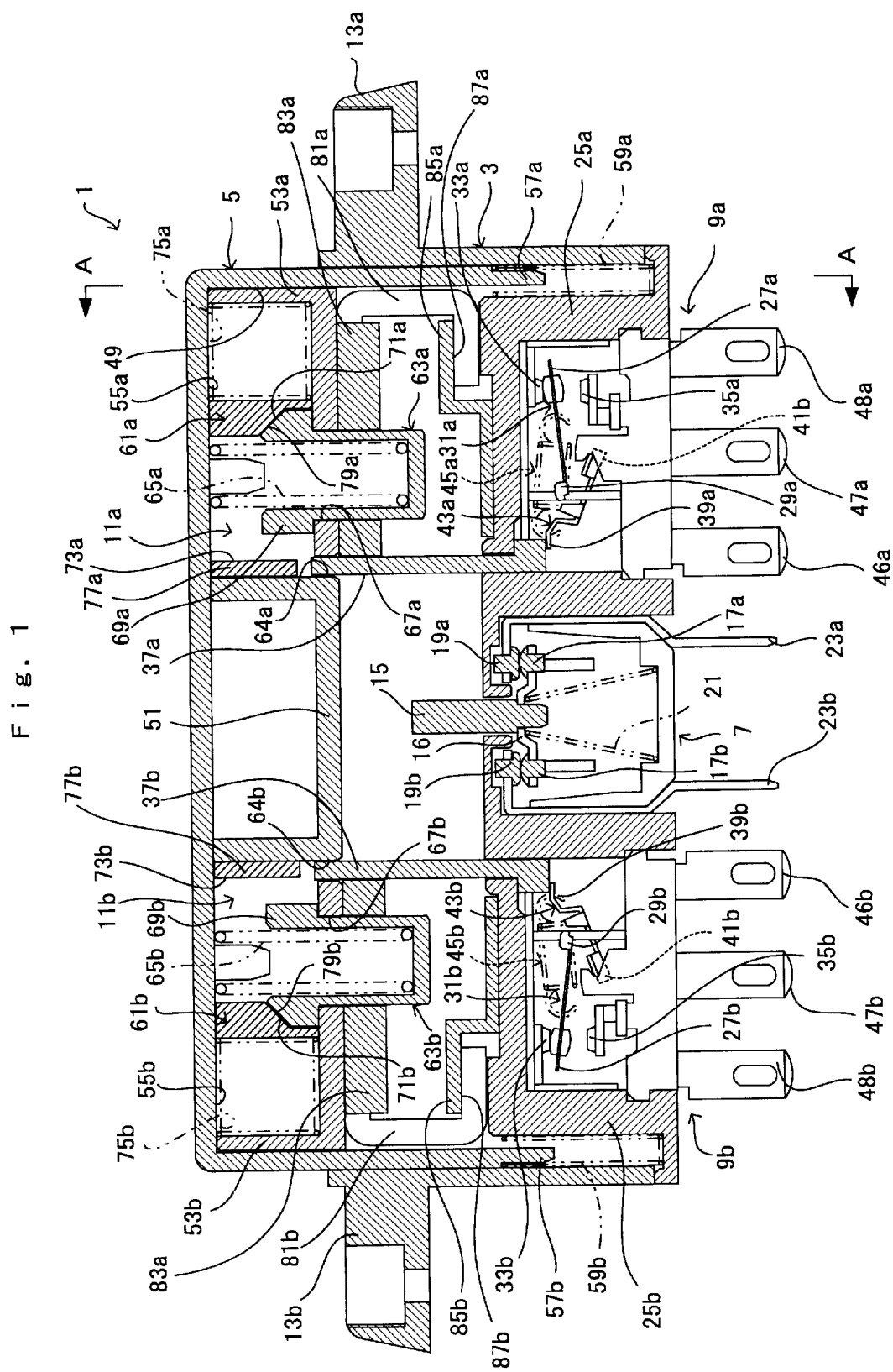
FIG. 1 is a sectional front view showing one state of a push-button switch according to a first embodiment of the present invention.

As shown in FIG. 1, a push-button switch 1 according to this embodiment comprises a switch case 3 of a rectangular shape in plan; a push button 5 depressibly supported by the switch case 3; a normally close contact 7 as an auxiliary contact and two c-contacts 9a, 9b disposed in the switch case 3; and two switching mechanisms 11a, 11b disposed in the push button 5 and adapted to open/close the corresponding c-contacts 9a, 9b as interlocked with the depression of the push button 5.

Within the switch case 3, the normally close contact 7 is disposed centrally of a lower portion thereof whereas the c-contacts 9a, 9b are disposed on opposite ends thereof as sandwiching the normally close contact 7 therebetween. The switch case 3 is formed with flanges 13a, 13b on lateral sides of an outside surface thereof. The flanges 13a, 13b are fixed to a teaching pendant for data entry or the like by means of screws or the like.

The normally close contact 7 comprises a movable member 15 located within the switch case 3 and projecting toward the push button 5 (upward); a pair of movable terminals 17a, 17b each attached to a lower end of the movable member 15 via a conductive member 16; and a pair of stationary terminals 19a, 19b arranged to be in or out of contact with the corresponding movable terminals 17a, 17b.

The movable member 15 has a helical spring 21 attached to the lower end thereof, the helical spring 21 urging the movable member 15 upwardly. In an initial state wherein the push button 5 is undepressed, the normally close contact 7 is closed with the movable terminals 17a, 17b kept in contact with the stationary terminals 19a, 19b by an urging force of the helical spring 21. Projected from a lower end of the switch case 3 are two metallic terminal pieces 23a, 23b, which are electrically connected with the stationary terminals 19a, 19b of the normally close contact 7, respectively.

The c-contacts 9a, 9b are disposed under partitioning walls 25a, 25b of an L-shape in section formed at the opposite ends of the switch case 3, respectively. The c-contacts 9a, 9b each comprise a snap action configuration including a movable terminal 31a, 31b, a first end 27a, 27b of which is rotatable about a second end 29a, 29b thereof; a normally close stationary terminal 33a, 33b and a normally open stationary terminal 35a, 35b disposed above and below the movable terminal 31a, 31b, respectively; an operative member 43a, 43b, a first end 39a, 39b of which is rotated about its second end 41a, 41b as pressed by a pressing section 37a, 37b of the switching mechanism 11a, 11b to be described hereinafter; and a helical spring 45a, 45b with opposite ends locked to the first end 27a, 27b of the movable terminal 31a, 31b and to the first end 39a, 39b of the operative member 43a, 43b for urging upward the first end 27a, 27b of the movable terminal 31a, 31b as well as the first end 39a, 39b of the operative member 43a, 43b.

In the initial state wherein the push button 5 is undepressed, as shown in FIG. 1, the push-button switch 1 is in the first OFF state wherein the movable terminals 31a, 31b of the c-contacts 9a, 9b are urged upward by the helical springs 45a, 45b thereby being kept away from the normally open stationary terminals 35a, 35b but in contact with the normally close stationary terminals 33a, 33b.

The movable terminal 31a, normally close stationary terminal 33a and normally open stationary terminal 35a of the c-contact 9a on one side are electrically connected with terminal pieces 46a, 47a, 48a projecting from the bottom of the switch case 3, respectively. Likewise, the movable terminal 31b, normally close stationary terminal 33b and normally open stationary terminal 35b of the other c-contact 9b on the other side are electrically connected with terminal pieces 46b, 47b, 48b projecting from the bottom of the switch case 3, respectively.

The push button 5 is formed with an accommodating portion 49 extending vertically and defining a rectangular space in plan. The accommodating portion 49 has a centrally located pressing member 51 for depressing the normally close contact 7. Disposed on laterally opposite sides of the pressing member 51 are partitioning plates 53a, 53b of an L-shaped section each dividing the accommodating portion 49 into an upper portion and a lower portion. The switching mechanisms 11a, 11b for opening/closing the c-contacts 9a, 9b are disposed in upper cavities 55a, 55b defined by the partitioning plates 53a, 53b, respectively.

The push button 5 is formed with projections 57a, 57b projected downward from opposite ends thereof. The projections 57a, 57b have helical springs 59a, 59b fitted thereover, respectively. Lower ends of the helical springs 59a, 59b are fixed to opposite ends of the bottom of the switch case 3 so that the push button 5 is normally urged upward by urging forces of the helical springs 59a, 59b.

The switching mechanisms 11a, 11b each comprise the a pressing section 37a, 37b for depressing the operative member 43a, 43b of the c-contact 9a, 9b; a slide block 61a, 61b for pushing down the pressing section 37a, 37b as interlocked with the depression of the push button 5; and a pressing shaft 63a, 63b locked to the slide block 61a, 61b.

The pressing section 37a, 37b extends downward from place in a gap 64a, 64b defined between the partitioning plate 53a, 53b and the pressing member 51 and has its lower end abutted against the first end of the operative member 43a, 43b of the c-contact 9a, 9b.

The pressing shaft 63a, 63b has a hollow structure and is urged downward by a helical spring 65a, 65b which is attached to an upper inside wall of the push button 5 and has its lower end fixed to place inside of the pressing shaft 63a, 63b.

The pressing shaft 63a, 63b is inserted through a through hole 67a, 67b formed in the partitioning plate 53a, 53b. On the other hand, a flange 69a, 69b at an upper end of the pressing shaft 63a, 63b is locked to the partitioning plate 53a, 53b at a circumference of the through hole 67a, 67b so that the pressing shaft 63a, 63b is restrained from moving downwardly (dropping-off). The flange 69a, 69b of the pressing shaft 63a, 63b is formed with a slope 71a, 71b on one lateral side thereof.

The slide block 61a, 61b is formed with a cavity 73a, 73b vertically extended therethrough, in which cavity 73a, 73b the pressing shaft 63a, 63b is inserted. The slide block 61a, 61b is disposed in the upper cavity 55a, 55b defined in the accommodating portion 49 by the partitioning plates 53a, 53b, as allowed to move horizontally (the transverse direction as seen in FIG. 1). A helical spring 75a, 75b is interposed between a first end of the slide block 61a, 61b and a side surface of the partitioning plate 53a, 53b for urging the slide block 61a, 61b toward the center of the push button 5.

The slide block 61a, 61b is adapted to abut against an upper end of the pressing section 37a, 37b at a second end thereof. Thus, the slide block 61a, 61b is moved downwardly as interlocked with the depression of the push button 5, thereby pressing down the pressing section 37a, 37b.

Furthermore, the slide block 61a, 61b is formed with a slope 79a, 79b on one inside wall thereof defining the cavity 73a, 73b. The slope 79a, 79b is locked to the slope 71a, 71b of the flange 69a, 69b of the pressing shaft 63a, 63b.

As shown in FIGS. 1 and 5, a U-shaped distribution member 81 is disposed between the partitioning plate 53a, 53b and the partitioning wall 25a, 25b. The distribution member 81 has its upper end rotatably retained by a lower surface of the partitioning plate 53a, 53b via a retaining member 83a, 83b and its lower end 81a, 81b retained in a cavity 87a, 87b defined between an upper surface of the partitioning wall 25a, 25b and a guide member 85a, 85b disposed thereabove in a manner to be slidably movable in the horizontal direction (the anteroposterior direction as seen in FIG. 1).

When the push button 5 in the initial state, shown in FIG. 5(a), is depressed, the distribution member 81 rotates about the upper end thereof in the direction of α in FIG. 5(a) with its lower end 81a, 81b sliding in the cavity 87a, 87b. When the push button is fully depressed, the distribution member 81 assumes a position as shown in FIG. 5(b). Since such distribution members 81 are provided at opposite ends of the push-button 5, a pressing load from the push button 5 is evenly distributed by the distribution members 81 whatever portion of the push button 5 may be depressed. Hence, it is ensured that the c-contacts 9a, 9b are opened/closed at a time.

Next, the operations of the push-button switch 1 of the above arrangement will be described with reference to FIGS. 1 to 4.

When the push button 5 in the first OFF state shown in FIG. 1 is depressed, both of the switching mechanisms 11a, 11b operate as follows. The pressing shafts 63a, 63b move down in conjunction with the push button 5 while the slopes 71a, 71b thereof are locked to the slopes 79a, 79b of the slide blocks 61a, 61b. On the other hand, the depression of the push button 5 brings the second ends 77a, 77b of the slide blocks 61a, 61b into abutment against the upper ends of the pressing sections 37a, 37b, thereby pressing down the pressing sections 37a, 37b. Thus, the first ends 39a, 39b of the operative members 43a, 43b are pressed downward against the helical springs 45a, 45b.

When the operative members 43a, 43b of the c-contacts 9a, 9b are pressed downward in this manner, the first ends 39a, 39b of the operative members 43a, 43b are rotated downward about the second ends 41a, 41b thereof. Such a rotation expands the helical springs 45a, 45b. When the amount of rotation of the first ends 39a, 39b of the operative members 43a, 43b reaches a first dead point at which the upward urging force of the helical springs 45a, 45b on the first ends of the movable terminals 31a, 31b is changed to a downward urging force, the movable terminals 31a, 31b rotate downward about the second ends 29a, 29b thereof leaving the normally close stationary terminals 33a, 33b to come into contact with the normally open stationary terminals 35a, 35b. Thus, the push-button switch 1 is shifted from the first OFF state to the ON state.

At this time, the change of the urging direction of the helical springs 45a, 45b causes the movable terminals 31a, 31b to move to the normally open stationary terminals 35a, 35b, so that the tactile click-touch is produced. This permits the operator to recognize that the push-button switch 1 has been shifted from the first OFF state to the ON state.

During the transition from the first OFF state to the ON state, the slopes 79a, 79b of the slide blocks 61a, 61b are subjected to a pressure from the slopes 71a, 71b of the pressing shafts 63a, 63b, the pressure acting to push the slide blocks 61a, 61b toward the outer sides of the push button 5. However, the force of the helical springs 75a, 75b for urging the slide blocks 61a, 61b toward the center of the push button 5 is greater than this pressure, so that the slide blocks 61a, 61b are not moved toward the opposite ends of the push-button 5. Thus, the pressing shafts 63a, 63b together with the slide blocks 61a, 61b are moved downward as interlocked with the push button 5.

If the depression of the push button 5 in the ON state is eased, the upward movement of the push button 5 involves an upward movement of the pressing sections 37a, 37b. This releases the pressure of the pressing sections 37a, 37b on the operative members 43a, 43b so that the first ends 39a, 39b of the operative members 43a, 43b rotate upwardly.

When the amount of rotation of the first ends 39a, 39b of the operative members 43a, 43b reaches a second dead point at which the downward urging force of the helical springs 45a, 45b on the movable terminals 31a, 31b is changed to the upward urging force, the movable terminals 31a, 31b rotate upwardly about the second ends 29a, 29b thereof leaving the normally open stationary terminals 35a, 35b to come into contact with the normally close stationary terminals 33a, 33b. Thus, the push-button switch 1 is returned from the ON state to the first OFF state.

In the c-contacts 9a, 9b, a relation between the first dead point and the second dead point is defined as follows. As shown in FIG. 6, the amount of rotation of the first end 39a, 39b of the operative member 43a, 43b to reach the first dead point due to the increased load on the operative member 43a, 43b is defined to be greater than the amount of rotation of the first end 39a, 39b of the operative member 43a, 43b to reach the second dead point due to the decreased load on the operative member 43a, 43b.

Accordingly, the amount of depression of the push button 5 to return the push-button switch 1 from the ON state to the first OFF state is defined to be smaller than the amount of depression of the push button 5 to shift the push-button switch 1 from the first OFF state to the ON state. Hence, even if the depression of the push button 5 is eased, the push-button switch 1 is maintained in the ON state so long as the decrease of the depression is within a predetermined range or unless the amount of rotation of the operative member 43a, 43b reaches the second dead point. Thus, the push-button switch 1 is prevented from being inadvertently shifted to the first OFF state.

Figure 2:
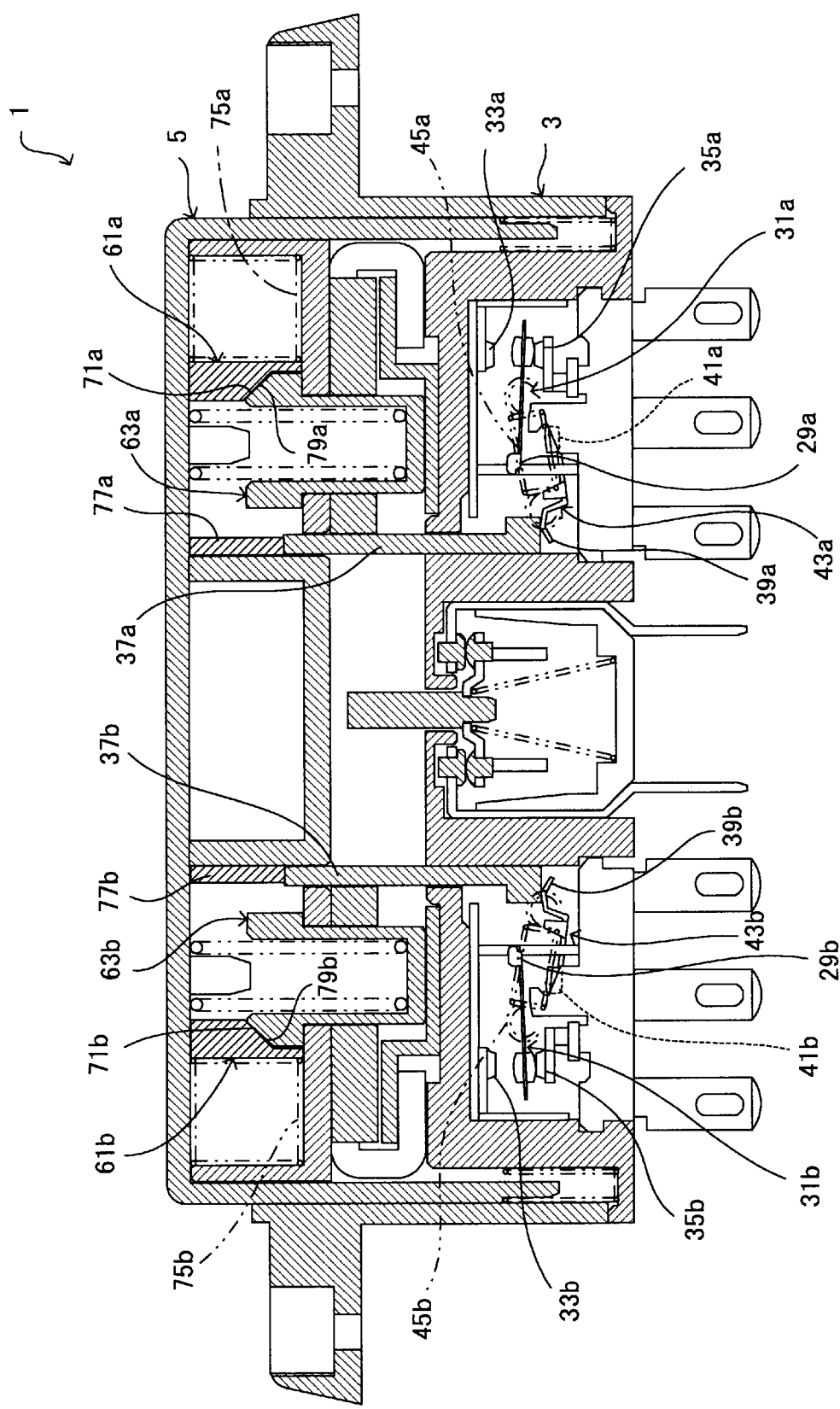
FIG. 2 is a sectional front view showing another state of the push-button switch according to the first embodiment hereof.
Figure 3:
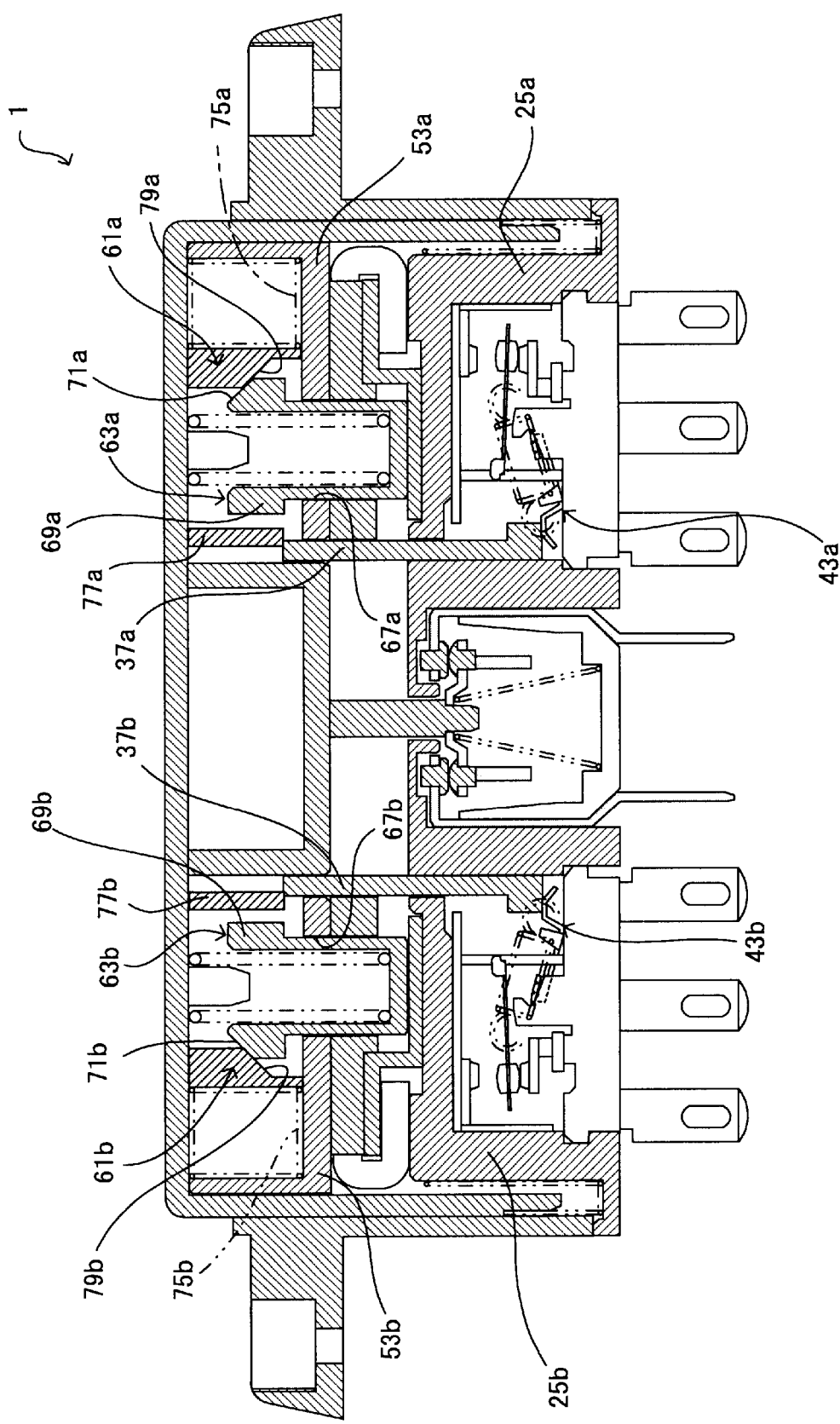
FIG. 3 is a sectional front view showing yet another state of the push-button switch according to the first embodiment hereof.

Then, further depressing the push button 5 in the ON state shown in FIG. 2 brings the lower ends of the pressing shafts 63a, 63b into abutment against the upper surfaces of the partitioning walls 25a, 25b, as shown in FIG. 3. Still further depressing the push button 5 causes the partitioning walls 25a, 25b to push up the pressing shafts 63a, 63b so that the flanges 69a, 69b of the pressing shafts 63a, 63b are disengaged from the circumferences of the through holes 67a, 67b in the partitioning plates 53a, 53b.

In this process, the pressure on the slopes 79a, 79b of the slide blocks 61a, 61b from the slopes 71a, 71b of the pressing shafts 63a, 63b surpasses the urging force of the helical springs 75a, 75b so that the slopes 79a, 79b of the slide blocks 61a, 61b slide on the slopes 71a, 71b of the pressing shafts 63a, 63b. Thus, the slide blocks 61a, 61b are slidably moved outwardly with respect to the push button 5.

The outward slidable movement of the slide blocks 61a, 61b brings the second ends 77a, 77b of the slide blocks 61a, 61b out of the abutment against the pressing sections 37a, 37b, thereby permitting an upward movement of the pressing sections 37a, 37b. Thus, the operative members 43a, 43b become free from the pressure from the pressing sections 37a, 37b. Thus, the switching mechanisms 11a, 11b according to this embodiment constitute releasing means of the present invention.

When the operative members 43a, 43b are released from the pressure from the pressing sections 37a, 37b, the first ends 39a, 39b of the operative members 43a, 43b are urged upward into rotation by the helical springs 45a, 45b. The rotation of the first ends 39a, 39b of the operative members 43a, 43b changes the downward urging force on the first ends of the lovable terminals 31a, 31b to the upward urging force, which, in turn, upwardly rotates the first ends of the movable terminals 31a, 31b. Thus, the movable terminals 31a, 31b in contact with the normally open stationary terminals 35a, 35b are moved away therefrom to come into contact with the normally close stationary terminals 33a, 33b, as shown in FIG. 4. As a result, the push-button switch 1 is shifted from the ON state to the second OFF state.

In the second OFF state, the pressing member 51 of the push button 5 abuts against an upper end of the movable member 15 of the normally close contact 7 to press down the movable member 15, as shown in FIG. 4. Hence, the movable terminals 17a, 17b and the stationary terminals 19a, 19b of the normally close contact 7 are forcibly separated from each other. Therefore, even if the movable terminals 17a, 17b should be fused with the stationary terminals 19a, 19b, for example, the normally close contact 7 is assuredly shifted to the open state because the movable terminals 17a, 17b are forcibly separated from the stationary terminals 19a, 19b. Thus, the combination of the pressing member 51 and the movable member 15 according to this embodiment constitutes forcible separation means of the present invention.

An example of circuit connections of the push-button switch 1 of the above arrangement will be described with reference to FIG. 7. It is noted that the symbols 'NC1' and 'NC2' in FIG. 7 represent the normally close stationary terminals 33a, 33b of the c-contacts 9a, 9b, respectively; 'NO1' and 'NO2' representing the normally open stationary terminals 35a, 35b, respectively; 'C1' and 'C2' representing the movable terminals 31a, 31b, respectively; 'NC3' representing the stationary terminals 19a, 19b of the normally close contact 7. A first and a second circuits comprise the c-contacts 9a, 9b, respectively. More specifically, the respective pair of the normally open stationary terminal 35a, 35b (NO1, NO2) and the movable terminal 31a, 31b (C1, C2) of the c-contact 9a, 9b constitute the first and the second circuits.

As shown in FIG. 7(a), when the push-button switch 1 is in the first OFF state, the first and the second circuits formed by the c-contacts 9a, 9b are in an OFF state with their C1 and C2 switched to NC1 and NC2, respectively. On the other hand, a third circuit formed by the normally close contact 7 is in an ON state with its NC3 closed.

When the push button 5 is depressed, the first and the second circuits are shifted to the ON state with their C1 and C2 switched to NO1 and NO2, respectively, as shown in FIG. 7(b). Thus, the push-button switch 1 is shifted to the ON state, in which the third circuit maintains the ON state with its NC3 closed.

Then, a further depression of the push button 5 shifts the first and the second circuits to the OFF state with their C1 and C2 switched to NC1, NC2, respectively. Thus, the push-button switch 1 is shifted to the second OFF state in which the third circuit is shifted to the OFF state with its NC3 forcibly opened by the forcible separation means.

The push-button switch 1 has such an arrangement that the first and the second circuits (9a), (9b) are simultaneously turned ON or OFF by depressing the push button 5 and that both the circuits assume the ON or OFF state at a time in correspondence to the first OFF state, the ON state or the second OFF state. Therefore, it may be determined that either one of the first circuit (9a) and the second circuit (9b) is in failure if the circuits, when monitored, are not in the ON or OFF state in unison.

When the push-button switch 1 is in the first or second OFF state, both the first and the second circuits (9a), (9b) are in the OFF state. Hence, it is impossible to determine the push-button switch 1 to be in the first OFF state or in the second OFF state by simply monitoring the ON/OFF state of the first and second circuits.

On the other hand, the third circuit (7) assumes different states in correspondence to the first OFF state and the second OFF state. Specifically, when the third circuit (7) is close, the push-button switch 1 is in the first OFF state. When the third circuit (7) is open, the push-button switch 1 is in the second OFF state. Accordingly, whether the push-button switch 1 is in the first OFF state or in the second OFF state can be determined by monitoring the open/close state of the third circuit (7).

Now referring to FIG. 8, description will be made on a relation between the operation stroke and the operating load applied to the push button 5 during the manipulation of the push-button switch 1. It is noted that the numerals in circle correspond to the numbers of the drawings, respectively.

Figure 8:
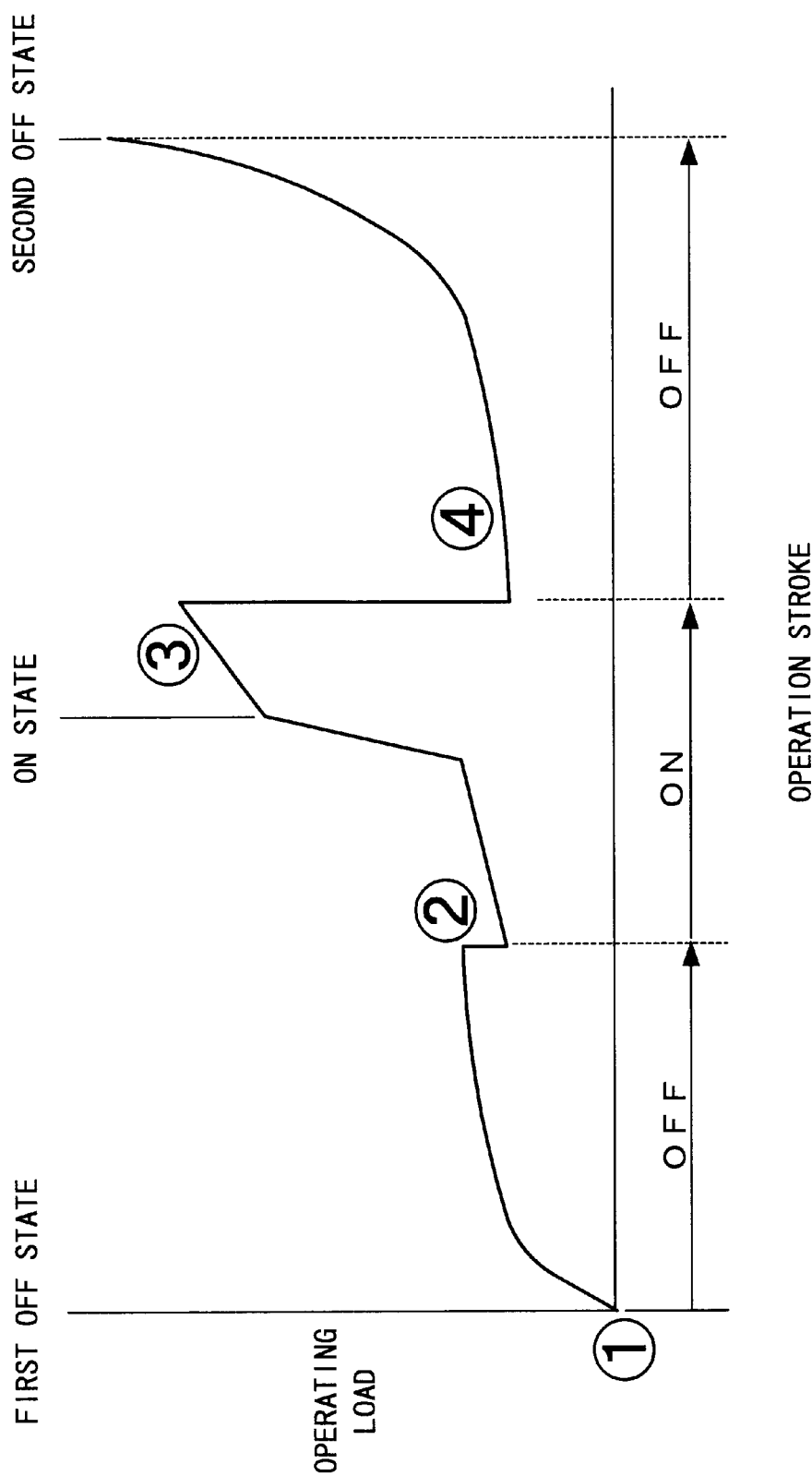
FIG. 8 is a graph representing a relation between the operation stroke and the operating load of a push button according to the first embodiment hereof.

As seen in FIG. 8, during a time period between the first OFF state, which is the initial state, and the ON state or during a transition from the state (①) shown in FIG. 1 to the state (②) shown in FIG. 2, the operating load progressively increases with increase in the operation stroke due to the depression of the push button 5. The operating load originates in the urging force of the helical springs 59a, 59b disposed on the opposite sides of the push button 5.

During the subsequent transition from the state (②) shown in FIG. 2 to the state (③) shown in FIG. 3, the operation stroke by depressing the push button 5 increases little whereas the operating load increases sharply. This is because a great load is required for horizontally moving the slide blocks 61a, 61b.

During the subsequent transition from the state (③) shown in FIG. 3 to the state (④) shown in FIG. 4, the operating load drops abruptly. This is because the pressing shafts 63a, 63b are disengaged from the slide blocks 61a, 61b. That is, it is rather preferred that the push button 5 provides a lighter touch if the operator, manipulating the push-button switch in the ON state, should panic to depress the push button 5 strongly. Hence, a smooth transition from the ON state to the second OFF state is provided by setting such a small operating load.

When the push button in the state (④) shown in FIG. 4 is further depressed, the operating load progressively increases with increase in the operation stroke. The operating load originates in the urging force of the helical springs 59a, 59b disposed on the opposite sides of the push button 5 and of the helical springs 65a, 65b disposed in the pressing shafts 63a, 63b.

According to the first embodiment of the present invention, a single case contains therein two c-contacts 9a, 9b which are simultaneously opened or closed by depressing the push button 5. Therefore, even if one of the contacts fails during the manipulation of the push-button switch 1, for instance, the other contact is capable of turning ON/OFF the push-button switch 1. Thus, the push-button switch 1 is enhanced in reliability. It is noted that the number of c-contact is not limited to 2. Needless to say, a push-button switch including three or more c-contacts can achieve a similar effect.

The c-contacts 9a, 9b have the snap action configurations and are arranged such that the amount of depression of the push button 5 to separate the movable terminals 31a, 31b from the normally open stationary terminals 35a, 35b is smaller than the amount of depression of the push button 5 to bring the movable terminals 31a, 31b into contact with the normally open stationary terminals 35a, 35b. Therefore, even if the depression of the push button 5 is eased while the push-button switch 1 is in the ON state, the push-button switch 1 is maintained in the ON state so long as the decrease of the depression is within a predetermined range or unless the amount of rotation of the operative members 43a, 43b reaches the second dead point. This prevents the push-button switch from being inadvertently shifted to the first OFF state.

By virtue of the snap action configurations of the c-contacts 9a, 9b, a proper tactile click-touch or a proper click sound is produced when the push-button switch 1 is shifted from the first OFF state to the ON state or from the ON state to the second OFF state. Hence, the operator depressing the push button 5 can readily determine whether or not the push-button switch 1 is in the ON state permitting the data entry.

Since the normally close contact 7 is provided, the first OFF state or the second OFF state of the push-button switch 1 can be distinguished based on the open/close state of the normally close contact 7. In this case, the normally close contact 7 is not necessarily configured to be open when the push-button switch 1 is in the second OFF state, as described above. The normally close contact 7 may be configured to be opened when the push-button switch 1 is in the ON state and to maintain the open state when the push-button switch 1 is shifted to the second OFF state.

In the first embodiment described above, the third circuit (see FIG. 7) formed by the normally close contact 7 is independent. Alternatively, the push-button switch 1 may comprise two circuits, as shown in FIG. 9, wherein this normally close contact 7 is connected in series with the second circuit formed by one of the c-contacts 9a (9b).

Similarly to the above embodiment, such an arrangement permits the first OFF state to be distinguished from the second OFF state by monitoring the open/close state of the normally close contact 7.

In the first embodiment described above, both the first circuit (9a) and the second circuit (9b) formed by the c-contacts comprises the normally open stationary terminals 35a, 35b (NO1, NO2) and the movable terminals 31a, 31b (C1, C2), respectively. As shown in FIG. 10, an alternative arrangement may be made such that the second circuit shown in FIG. 9 comprises the normally close stationary terminal 33b (NC2) and the movable terminal 31b (C2) of the c-contact 9b and that the first circuit is adapted to be sequentially shifted to the first OFF state, the ON state and the second OFF state according to three positions of the push-button switch 1 whereas the second circuit is adapted to be sequentially shifted to the ON state, OFF state and the ON state. That is, the first and the second circuits always assume the opposite ON/OFF positions according to the three positions of the push-button switch.

Such an arrangement facilitates the determination that either one of the c-contacts 9a, 9b forming the circuits is in failure when both the first and the second circuits are ON or OFF at a time. In such a case, which of the c-contacts 9a, 9b is in failure can be determined by monitoring these contacts alternately.

In the circuit connections shown in FIG. 10, the first OFF state of the push-button switch 1 can be distinguished from the second OFF state thereof by monitoring the open/close state of the normally close contact 7 just as in the first embodiment described above.

The above first embodiment is described by way of the example including one normally close contact 7. Alternatively, the normally close contact may be provided in correspondence to each of the c-contacts 9a, 9b. Such an arrangement permits the determination of the ON/OFF state of each of the c-contacts 9a, 9b.

In the first embodiment described above, the normally close contact 7 is provided as an auxiliary contact serving for the purpose of distinguishing the first OFF state from the second OFF state of the push-button switch 1. Alternatively, for example, there may be provided a normally open contact adapted to be switched between an open position and a close position according to the first OFF state and the second OFF state.

(Second Embodiment)

Figure 11:
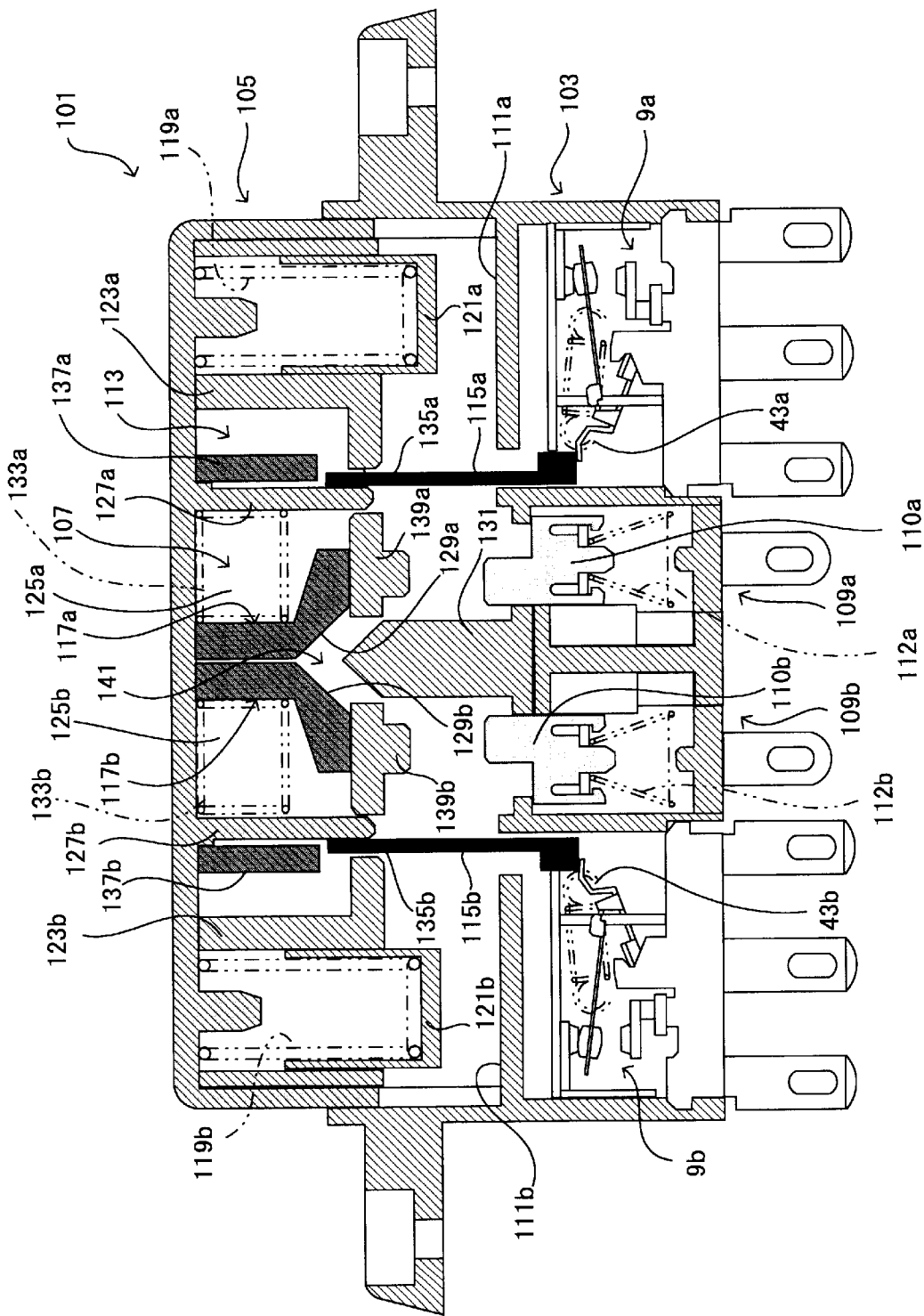
FIG. 11 is a sectional front view showing one state of a push-button switch according to a second embodiment hereof.
Figure 12:
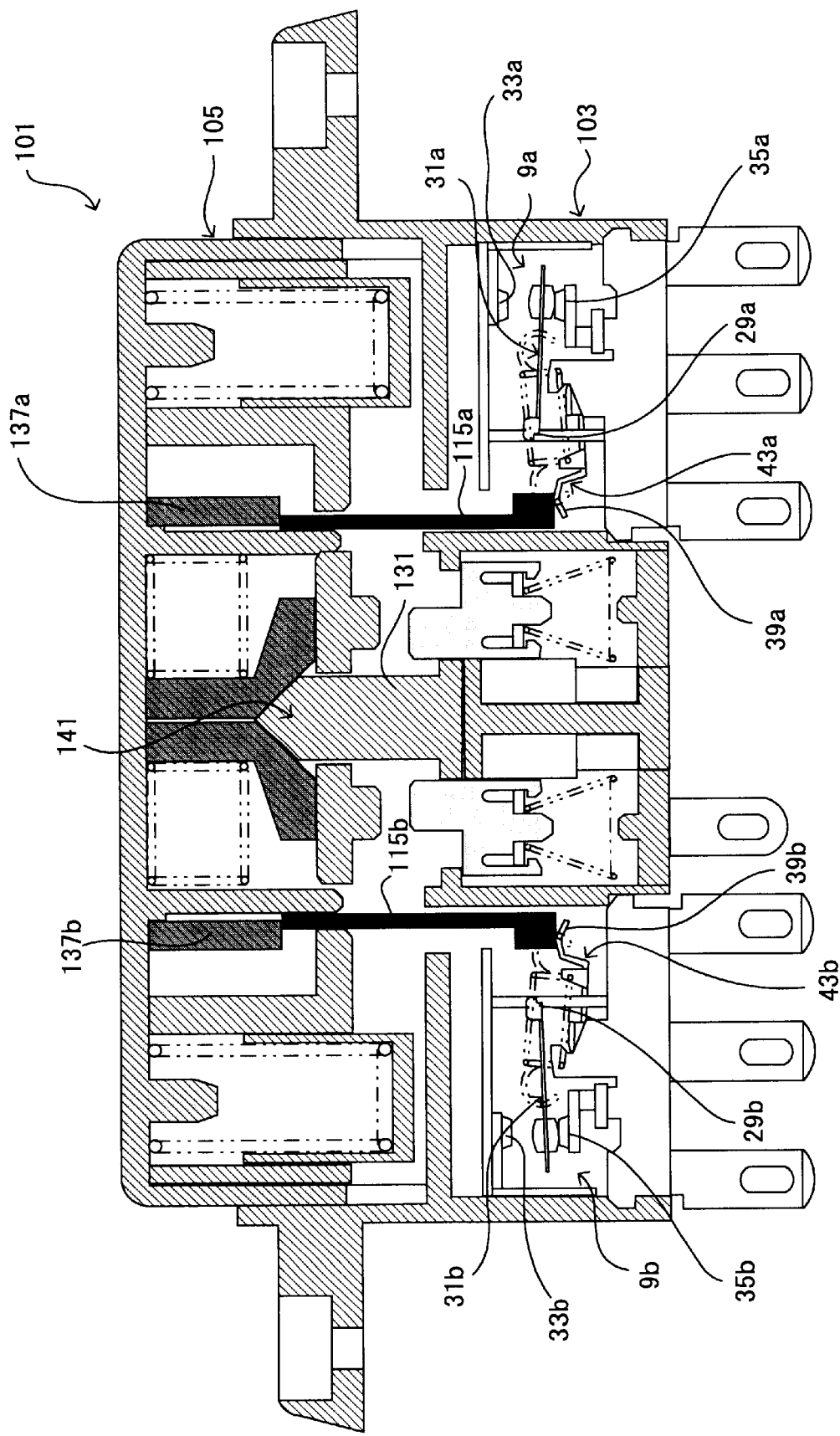
FIG. 12 is a sectional front view showing another state of the push-button switch according to the second embodiment hereof.
Figure 13:
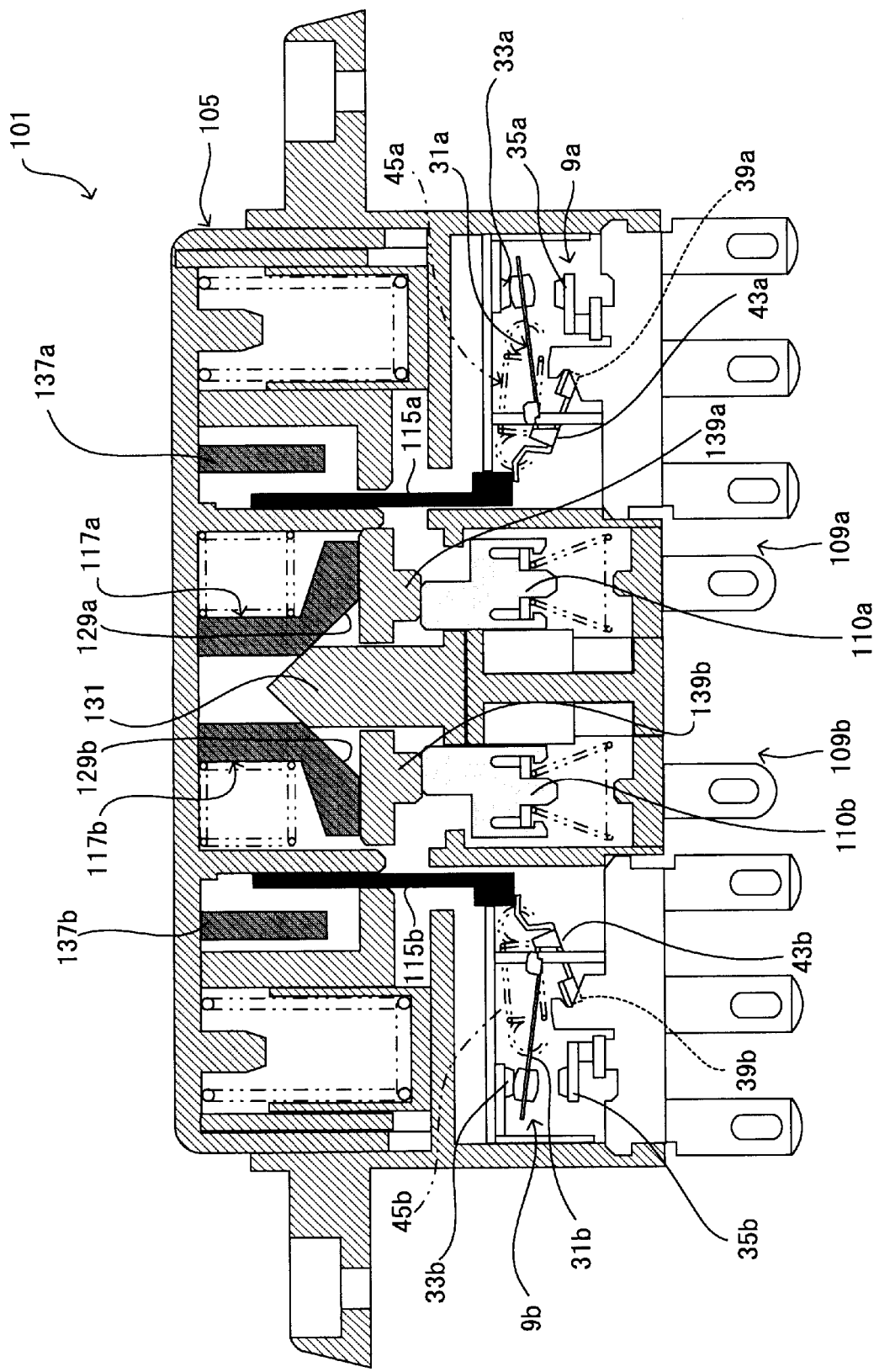
FIG. 13 is a sectional front view showing yet another state of the push-button switch according to the second embodiment hereof.

A second embodiment of the present invention will be described with reference to FIGS. 11 to 13. FIGS. 11 to 13 are sectional front views of the second embodiment in different states for explaining the operations thereof. It is noted that the same reference characters as in the first embodiment described above represent the same or equivalent parts, respectively.

In this embodiment, essential configurations of the c-contacts 9a, 9b are the same as those of the first embodiment and hence, the description of the like parts is dispensed with. The following description principally focuses on differences from the first embodiment.

As shown in FIG. 11, a push-button switch 101 of this embodiment differs from the first embodiment in configurations of a switch case 103, a switching mechanism 107 disposed in a push button 105, and normally close contacts 109a, 109b.

Within the switch case 103, two normally close contacts 109a, 109b are disposed at a central lower portion thereof, whereas a pair of c-contacts 9a, 9b of the above configurations are disposed at the opposite ends of the case as sandwiching the normally close contacts 109a, 109b therebetween. An inside wall of the switch case 103 is integrally formed with partitioning walls 111a, 111b extended over the respective upper portions of the c-contacts 9a, 9b.

Each of the normally close contacts 109a, 109b essentially has the same configuration as that of the normally close contact 7 of the first embodiment described above. As shown in FIG. 11, the normally close contacts 109a, 109b each comprise a movable member 110a, 110b; a movable terminal (not shown) attached to the movable member; and a stationary terminal (not shown) adapted to be in or out of contact with the movable terminal.

The normally close contacts 109a, 109b are provided with helical springs 112a, 112b for urging upward the movable members 110a, 110b, respectively. When the push button 105 is undepressed, the normally close contacts 109a, 109b are close with the stationary terminals being in contact with the movable terminals.

The push button 105 is formed with an accommodating portion 113 vertically extended as defining a rectangular space in plan. The accommodating portion 113 contains therein the switching mechanism 107 for opening/closing the c-contacts 9a, 9b.

The switching mechanism 107 comprises pressing sections 115a, 115b for depressing operative members 43a, 43b of the c-contacts 9a, 9b; a pair of slide blocks 117a, 117b for pressing down the pressing sections 115a, 115b as interlocked with the depression of the push button 105; and pressing shafts 121a, 121b urged downwardly by helical springs 119a, 119b attached to an upper wall of the accommodating portion 113.

The pressing shaft 121a, 121b is disposed between a partitioning plate 123a, 123b and an end of the accommodating portion 113, the partitioning plate having an L-shaped section and extending downward from the upper wall of the accommodating portion 113 of the push button 105. The pressing shaft 121a, 121b has a hollow structure, whereas a lower end of the above helical spring 119a, 119b is fixed to a bottom of the hollow structure.

The slide blocks 117a, 117b are centrally located in the push button 105 in a manner to contact with each other, as allowed to move horizontally (the transverse direction as seen in FIG. 11). The slide block 117a, 117b is formed with a cavity 125a, 125b vertically extended therethrough, whereas a pendent portion 127a, 127b extends from an upper inside surface of the accommodating portion 113 through the cavity 125a, 125b.

The slide block 117a, 117b is formed with a slope 129a, 129b at a lower portion of a first end thereof. The slopes 129a, 129b are adapted for engagement with slopes at an upper end of a pressing member 131 to be described hereinafter. On the other hand, a helical spring 133a, 133b is seated between an inside wall of the first end of the slide block 117a, 117b and the pendent portion 127a, 127b. Thus, the slide blocks 117a, 117b are urged toward the center of the push button 105 by means of the helical springs 133a, 133b.

The pendent portion 127a, 127b presents its lower end into a gap 135a, 135b defined in the partitioning plate 123a, 123b. On the other hand, the pressing section 115a, 115b extends downward with its upper end inserted through a clearance defined by the pendent portion 127a, 127b inserted in the gap 135a, 135b.

The upper end of the pressing section 115a, 115b is adapted to abut against a second end 137a, 137b of the slide block. When the slide block 117a, 117b is moved downward as interlocked with the depression of the push button 105, the second end 137a, 137b of the slide block 117a, 117b abuts against the upper end of the pressing section 115a, 115b to move down the pressing section 115a, 115b.

The partitioning plate 123a, 123b is integrally formed with a projection 139a, 139b on a lower surface near a center-side end thereof, the projection being shaped like ⌐ in section. The projection 139a, 139b descends in conjunction with the downward movement of the slide block 117a, 117b and abuts against the movable member 110a, 110b of the normally close contact 109a, 109b so as to press down the movable member.

In the initial state, the slide blocks 117a, 117b are in contacting relation as urged toward the center of the push button 105 by means of the helical springs 133a, 133b. In this state, the slopes 129a, 129b of the slide blocks 117a, 117b define a triangular recess 141 in section.

The pressing member 131 with a beak-like upper end is located below the recess 141 as spaced a predetermined distance therefrom. When the slide blocks 117a, 117b are depressed via the push button 105, the upper end of the pressing member 131 enters a space between the center-side ends of the partitioning plates 123a, 123b to come into engagement with the recess 141. Thus, the pressing member 131 is adapted to distend the slide blocks 117a, 117b as the depression of the push button 105 is increased.

The operations of the push-button switch of the above arrangement will be described with reference to FIGS. 11 to 13.

When the push button 105 in the first OFF state shown in FIG. 11 is depressed, the second ends 137a, 137b of the slide blocks 117a, 117b come into abutment against the upper ends of the pressing sections 115a, 115b so as to push down the pressing sections 115a, 115b, as shown in FIG. 12.

The pressing sections 115a, 115b thus depressed depress the first ends 39a, 39b of the operative members 43a, 43b of the c-contacts 9a, 9b against the helical springs 45a, 45b, thereby downwardly rotating the first ends 39a, 39b of the operative members 43a, 43b. When the amount of rotation of the operative members reaches the first dead point at which the upward urging force of the helical springs 45a 45b on the first ends of the movable terminals 31a, 31b is changed to the downward urging force, the movable terminals 31a, 31b of the c-contacts 9a, 9b rotate downwardly about the second ends 29a, 29b thereof, as shown in FIG. 12. Thus, the movable terminals 31a, 31b are separated from the normally close stationary terminals 33a, 33b to come into contact with the normally open stationary terminals 35a, 35b, so that the push-button switch 101 is shifted from the first OFF state to the ON state.

At this time, the upper end of the pressing member 131 is engaged with the recess 141 defined by the pair of slide blocks 117a, 117b. When the push button 105 in this state is further depressed, the slopes at the upper end of the pressing member 131 slide on the slopes 129a, 129b of the slide blocks 117a, 117b, as shown in FIG. 13, thereby slidably moving the slide blocks 117a, 117b outwardly with respect to the push button 105. This involves an outward movement of the second ends 137a, 137b of the slide blocks 117a, 117b with respect to the push button 105, so that the second ends 137a, 137b of the slide blocks 117a, 117b are brought out of the abutment against the pressing sections 115a, 115b. The pressing sections 115a, 115b, in turn, are allowed to move upward so as to release the pressure upon the operative members 43a, 43b. Thus, the switching mechanism 107 according to this embodiment constitutes the releasing means of the present invention.

When the operative members 43a, 43b are released from the pressure from the pressing sections 115a, 115b, the first ends 39a, 39b of the operative members 43a, 43b are urged upward into rotation by the helical springs 45a, 45b, as shown in FIG. 13. The rotation of the first ends 39a, 39b of the operative members 43a, 43b changes the downward urging force on the first ends of the movable terminals 31a, 31b to the upward urging force, which upwardly rotates the first ends of the movable terminals 31a, 31b. Thus, the movable terminals 31a, 31b in contact with the normally open stationary terminals 35a, 35b are separated therefrom to come into contact with the normally close stationary terminals 33a, 33b, so that the push-button switch 101 is shifted from the ON state to the second OFF state.

At this time, the projections 139a, 139b depress the movable members 110a, 110b of the normally close contacts 109a, 109b to separate the movable terminals from the stationary terminals so that the normally close contacts 109a, 109b are opened. Even if the movable terminals are fused with the stationary terminals at this time, the depressing projections 139a, 139b forcibly separate the movable terminals from the stationary terminals.

The amount of depression of the push button 105 to shift the push-button switch 101 from the ON state to the first OFF state is set smaller than the amount of depression to shift the switch from the first OFF state to the ON state. Hence, even if the depression of the push button 105 is eased, the push-button switch 101 is maintained in the ON state so long as the decrease in the depression of the push button is within the predetermined range or unless the amount of rotation of the operative members 43a, 43b reaches the second dead point. Thus, similarly to the first embodiment described above, the push-button switch is prevented from being inadvertently shifted to the first OFF state and is also adapted to provide the tactile click-touch or click sound.

According to the second embodiment, an equal effect to that of the first embodiment described above is naturally achieved. Furthermore, the second embodiment features a simple configuration because a single pressing member 131 is used to effect the horizontal movement of the slide blocks 117a, 117b for releasing the operative members 43a, 43b from the depression by the pressing sections 115a, 115b. As a result, the push-button switch 101 accomplishes cost reduction.

The second embodiment described above is provided with two normally close contacts 109a, 109b such that whether the c-contact 9a, 9b are in the first OFF state or the second OFF state can be determined by monitoring the open/close state of the normally close contacts 109a, 109b.

In the second embodiment described above, the first and the second circuits formed by the c-contacts 9a, 9b may have the same wire connections as those shown in FIG. 7 or 10 illustrating the first embodiment. An alternative circuit configuration may be made such that the first and the second circuits formed by the c-contacts 9a, 9b are connected in series with the normally close contacts 109a, 109b, respectively.

(Third Embodiment)

A third embodiment of the present invention will be described with reference to FIGS. 14 to 17. FIGS. 14 to 17 are sectional front views of the third embodiment in different states for explaining the operations thereof. It is noted that the same reference characters as in the first embodiment described above represent the same or equivalent parts, respectively.

In this embodiment, essential configurations of the c-contacts 9a, 9b are the same as those of the first embodiment and hence, the description of the like parts is dispensed with. The following description principally focuses on differences from the first embodiment.

Figure 14:
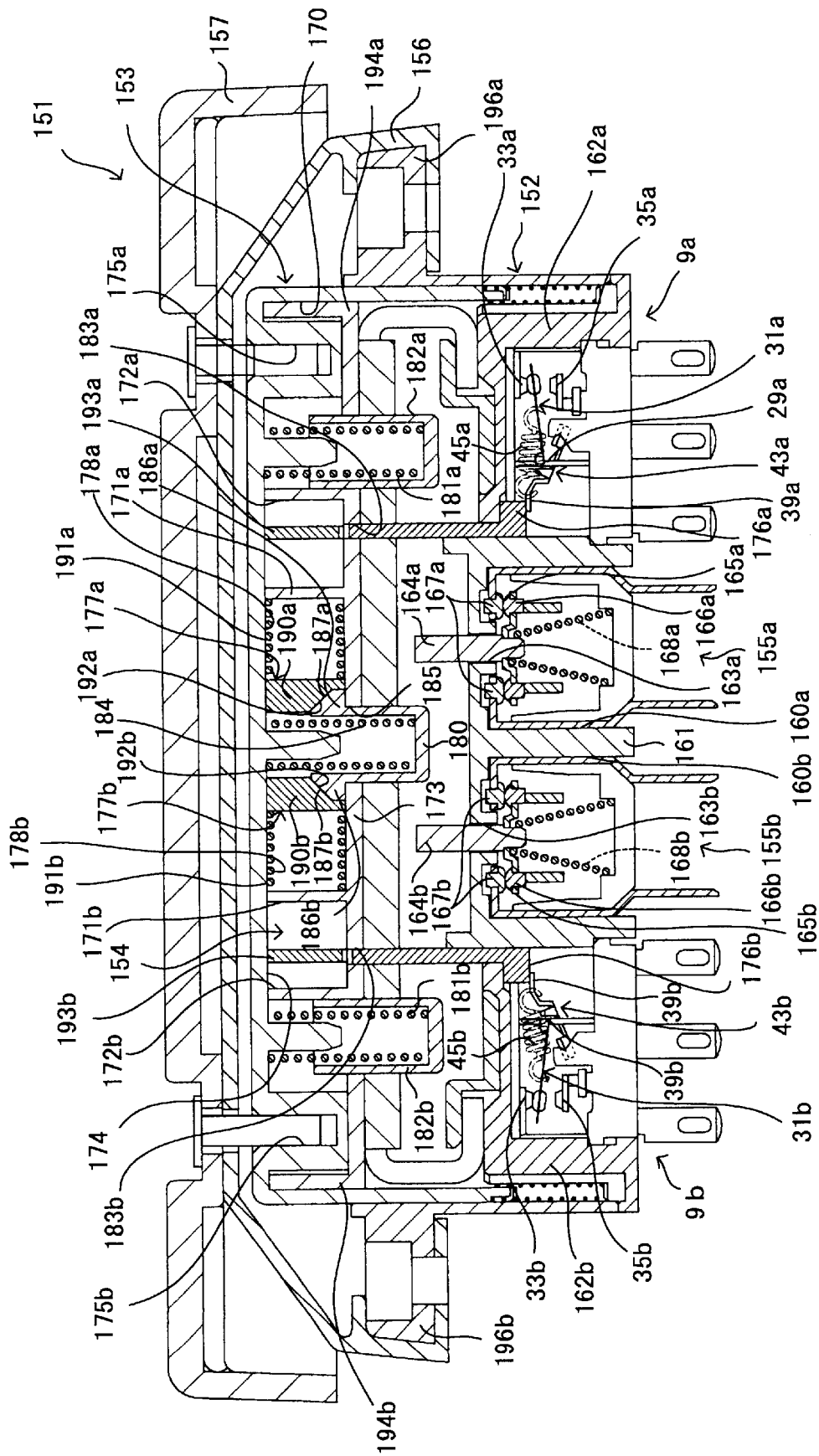
FIG. 14 is a sectional front view showing one state of a push-button switch according to a third embodiment hereof.

As shown in FIG. 14, a push-button switch 151 of this embodiment differs from that of the first embodiment in the configurations of a switch case 152, a switching mechanism 154 disposed in a push button 153 and normally close contacts 155a, 155b. In this embodiment, a rubber cover 156 and an external button 157 are attached to the push button 153 in a manner to cover the same.

The switch case 152 is centrally provided with an accommodation member 161 at a lower portion thereof, the accommodation member 161 including two accommodating portions 160a, 160b. The accommodating portions 160a, 160b contain therein the normally close contacts 155a, 155b, respectively. Disposed on the opposite sides of the accommodation member 161 are a pair of c-contacts 9a, 9b of the above configuration. Similarly to the first embodiment, an inside wall of the switch case 152 is integrally formed with L-shaped partitioning walls 162a, 162b in section, which extend over the upper parts of the c-contacts 9a, 9b, respectively.

The normally close contacts 155a, 155b are essentially configured the same way as the normally close contact 7 of the first embodiment described above. As shown in FIG. 14, the normally close contacts 155a, 155b each comprise a movable member 164a, 164b projecting from a through hole 163a, 163b formed in an upper side of the accommodation member 161; a movable terminal pair 166a, 166b attached to a lower end of the movable member 164a, 164b via a conductive member 165a, 165b; and a stationary terminal pair 167a, 167b adapted to be in or out of contact with the movable terminal pair 166a, 166b.

The movable member 164a, 164b has a helical spring 168a, 168b mounted to its lower end for urging the movable member 164a, 164b upwardly. When the push button 153 is undepressed, the normally close contact 155a, 155b is closed with its stationary terminal pair 167a, 167b and the movable terminal pair 166a, 166b held in contact with each other by means of an urging force of the helical spring 168a, 168b.

The push button 153 is formed with an accommodating portion 170 vertically extended as defining a rectangular space in plan. The accommodating portion 170 is centrally provided with a pressing plate 173 fixed to an upper inside surface of the accommodating portion 170 via two pairs of pendent members 171a, 171b, 172a, 172b. The switching mechanism 154 for opening/closing the c-contacts 9a, 9b is disposed in an upper cavity 174 defined by the pressing plate 173 and the upper inside surface of the accommodating portion 170. The push button 153 is formed with screw holes 175a, 175b at opposite ends thereof for mounting the external button 157 and the rubber cover 156 which will be described hereinafter.

The switching mechanism 154 comprises pressing sections 176a, 176b for depressing the operative members 43a, 43b of the c-contacts 9a, 9b; a pair of slide blocks 177a, 177b for pressing down the pressing sections 176a, 176b as interlocked with the depression of the push button 153; a pressing shaft 180 in locked relation with the slide blocks 177a, 177b; and a pair of pressure bodies 182a, 182b urged downward by helical springs 181a, 181b attached to the upper inside surface of the accommodating portion 170.

The pressing sections 176a, 176b extend downward from through holes 183a, 183b defined at opposite ends of the pressing plate 173 and abut against the first ends 39a, 39b of the operative members 43a, 43b of the c-contacts 9a, 9b on their lower ends.

The pressing shaft 180 has a hollow structure. A helical spring 184 attached to the upper inside surface of the accommodating portion 170 has its lower end fixed to place in the pressing shaft 180, thus urging the pressing shaft 180 downwardly.

The pressing shaft 180 is inserted through a through hole 185 formed centrally of the pressing plate 173, whereas a pair of flanges 186a, 186b formed at an upper end of the pressing shaft 180 are locked to the pressing plate 173 at a circumference of the through hole 185 so that the pressing shaft 180 is restrained from moving downwardly (droppingoff). The flanges 186a, 186b of the pressing shaft 180 are respectively formed with a slope 187a, 187b on a side surface thereof.

The slide block 177a, 177b is formed with a cavity 178a, 178b vertically extended therethrough, through which the center-side pendent member 171a, 171b with respect to the push button 153 is extended. The slide block 171a, 171b is slidably movable in the upper cavity 174 along the horizontal direction (the transverse direction as seen in FIG. 14) and urged toward the center of the push button 153 by a helical spring 191a, 191b interposed between a first end 190a, 190b of the slide block 177a, 177b and the pendent member 171a, 171b extended through the cavity 178a, 178b.

The slide block 177a, 177b is formed with a slope 192a, 192b at the first end 190a, 190b thereof, the slope 192a, 192b locked to the slope 187a, 187b of the flange 186a, 186b of the pressing shaft 180.

A second end 193a, 193b of the slide block 177a, 177b is adapted to abut against an upper end of the pressing section 176a, 176b, so that the slide block 177a, 177b descends as interlocked with the depressed push button 153, thereby pressing down the pressing section 176a, 176b.

The pressure body 182a, 182b is interposed between a partitioning plate 194a, 194b and aside of the pressing plate 173, the partitioning plate having an L-shaped section and extending downward from an inside upper surface at each of the opposite ends of the accommodating portion 170. The pressure body 182a, 182b has a hollow structure whereas the helical spring 181a, 181b has its lower end fixed to a bottom of the hollow body.

Further, as shown in FIG. 14, the external button 157 is attached to a top surface of the push button 153 fry via the rubber cover 156. The external button 157 is secured to the push button 153 with screws at opposite ends thereof. Such an arrangement prevents the deformation or breakage of the top surface of the push button 153 because the push button 153 is not directly depressed. The rubber cover 156 covers the top surface of the push button 153 and has its opposite ends fixed to lower surfaces of flanges 196a, 196b on lateral sides of the switch case 152. The watertightness of the push-button switch 151 is enhanced in this manner.

Next, the operations of the push-button switch 151 of the above arrangement will be described with reference to FIGS. 14 to 17.

Figure 15:
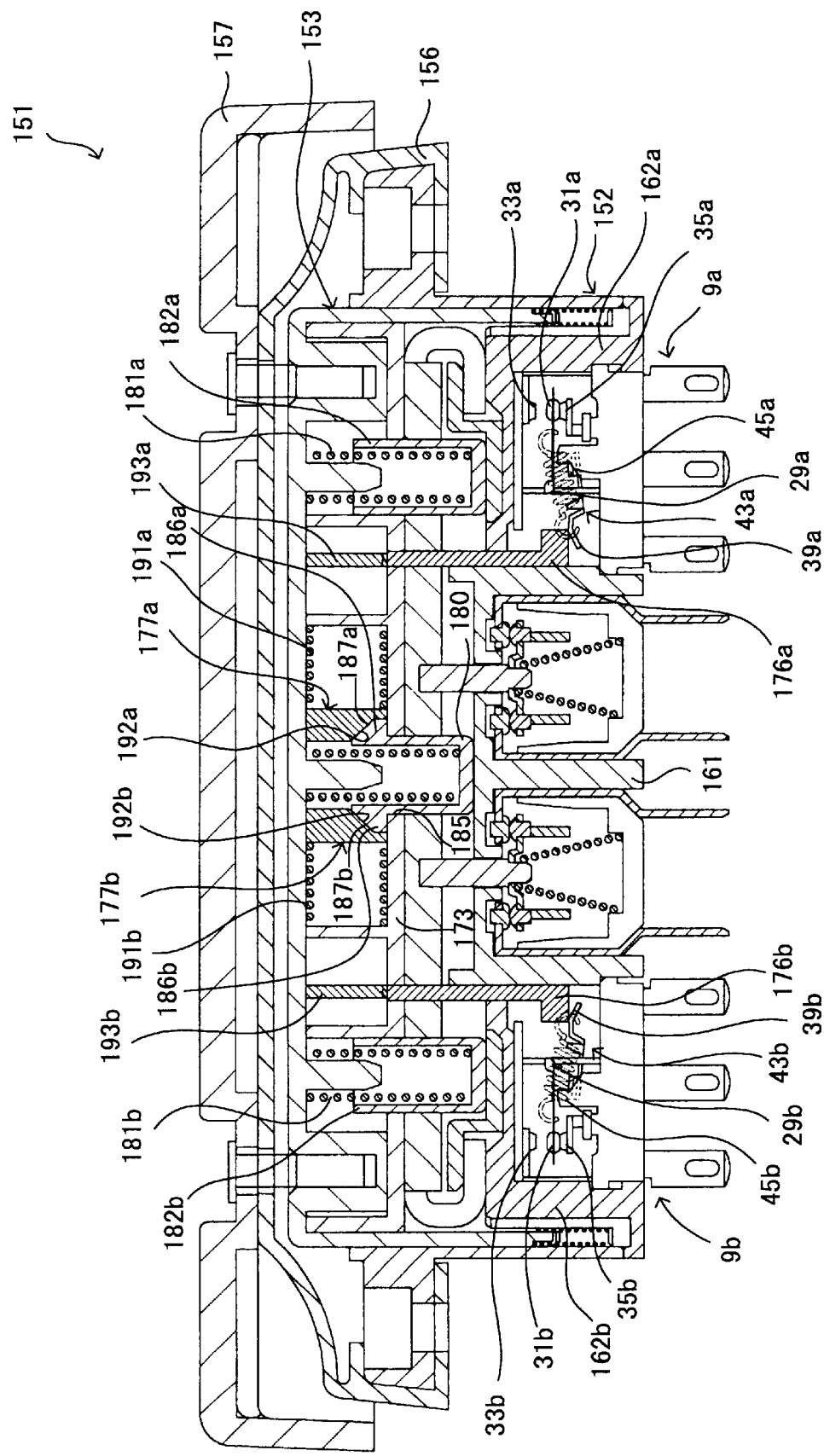
FIG. 15 is a sectional front view showing another state of the push-button switch according to the third embodiment hereof.

When the push button 153 in the first OFF state shown in FIG. 14 is depressed, the second ends 193a, 193b of the slide blocks 177a, 177b come into abutment against the upper ends of the pressing sections 176a, 176b so as to press down the pressing sections 176a, 176b, as shown in FIG. 15.

The depressed pressing sections 176a, 176b, in turn, depress the first ends 39a, 39b of the operative members 43a, 43b of the c-contacts 9a, 9b against the helical springs 45a, 45b, thereby downwardly rotating the first ends 39a, 39b of the operative members 43a, 43b. When the amount of rotation of the operative members reaches the first dead point at which the upward urging force of the helical springs 45a, 45b on the first ends of the movable terminals 31a, 31b is changed to the downward urging force, the movable terminals 31a, 31b of the c-contacts 9a, 9b rotate downwardly about the second ends 29a, 29b thereof, as shown in FIG. 15. Thus, the movable terminals 31a, 31b are separated from the normally close stationary terminals 33a, 33b to come into contact with the normally open stationary terminals 35a, 35b so that the push-button switch 151 is shifted from the first OFF state to the ON state.

During the transition from the first OFF state to the ON state, the slopes 187a, 187b of the pressing shaft 180 apply a pressure to the slopes 192a, 192b of the slide blocks 177a, 177b to drive the slide blocks 177a, 177b outwardly with respect to the push button 153. However, the pressure is surpassed by the force of the helical springs 191a, 191b urging the slide blocks 177a, 177b toward the center of the push button 153, so that the slide blocks 177a, 177b are not moved toward the opposite ends of the push button 153. Hence, the pressing shaft 180 together with the slide blocks 177a, 177b are moved downward as interlocked with the push button 153.

At this time, the pressure bodies 182a, 182b have their bottoms abutted against the upper sides of the partitioning walls 162a, 162b. Therefore, further depressing the push button 153 in this state requires such a force as to overcome the urging force of the helical springs 181a, 181b. This increases the load for further depressing the push button 153 in the ON state.

Figure 16:
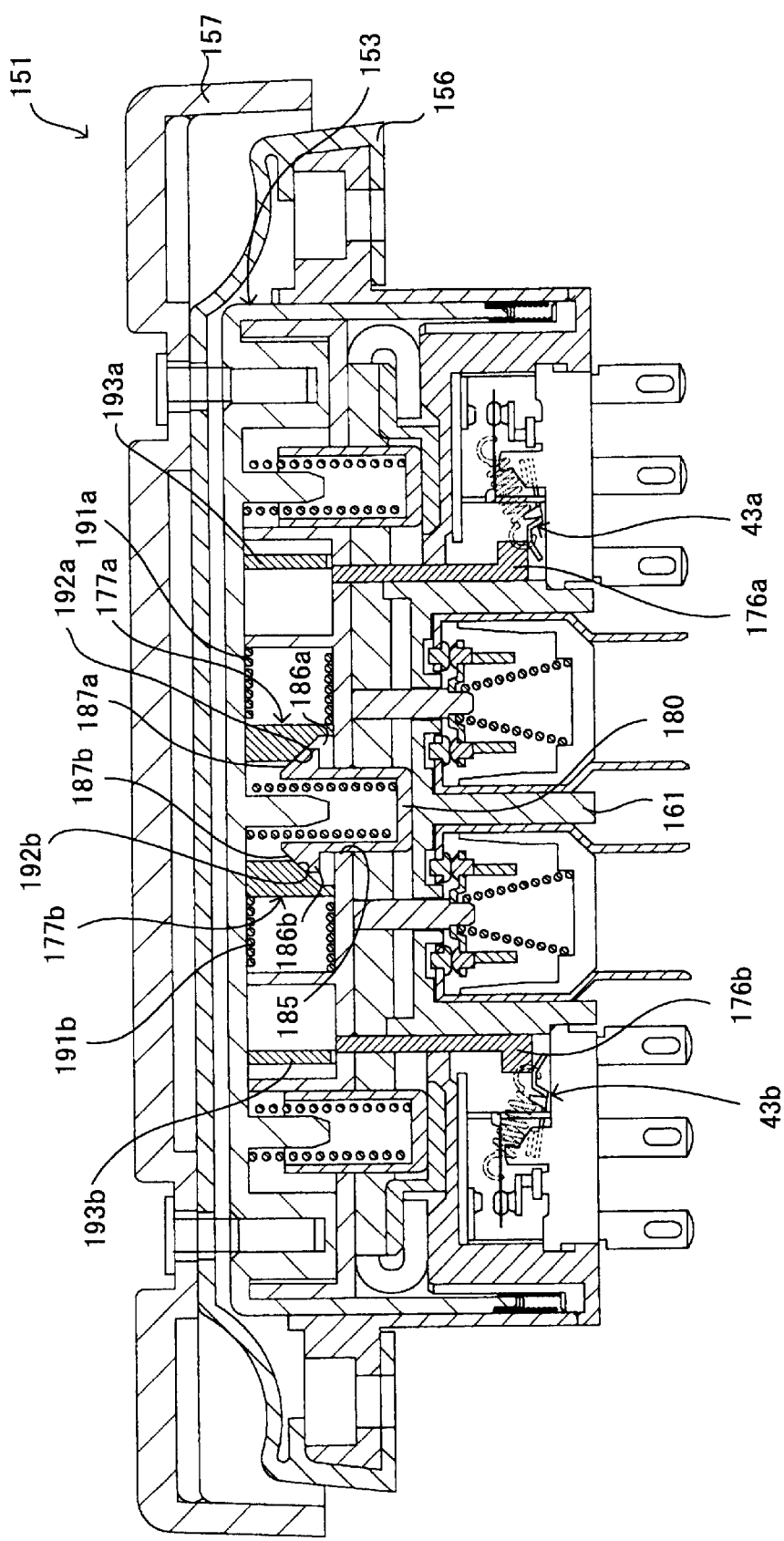
FIG. 16 is a sectional front view showing yet another state of the push-button switch according to the third embodiment hereof.

When the push button 153 in the ON state as shown in FIG. 15 is further depressed, a lower end of the pressing shaft 180 comes into abutment against the upper surface of the accommodation member 161, as shown in FIG. 16. When the push button 153 is still further depressed, the pressing shaft 180 is pushed up by the accommodation member 161 and hence, the flanges 186a, 186b of the pressing shaft 180 is disengaged from the circumference of the through hole 185 in the pressing plate 173.

In this process, the pressure applied to the slopes 192a, 192b of the slide blocks 177a, 177b by the slopes 187a, 187b of the pressing shaft 180 surpasses the urging force of the helical springs 191a, 191b, so that the slopes 192a, 192b of the slide blocks 177a, 177b slide on the slopes 187a, 187b of the pressing shaft 180. Thus, the slide blocks 177a, 177b are slidably moved outwardly with respect to the push button 153.

The outward sliding movement of the slide blocks 177a, 177b brings the second ends 193a, 193b thereof out of the abutment against the pressing sections 176a, 176b. Thus, the pressing sections 176a, 176b are allowed to move upward to release the pressure on the operative members 43a, 43b. Thus, the switching mechanism 154 according to this embodiment constitutes the releasing means of the present invention.

Figure 17:
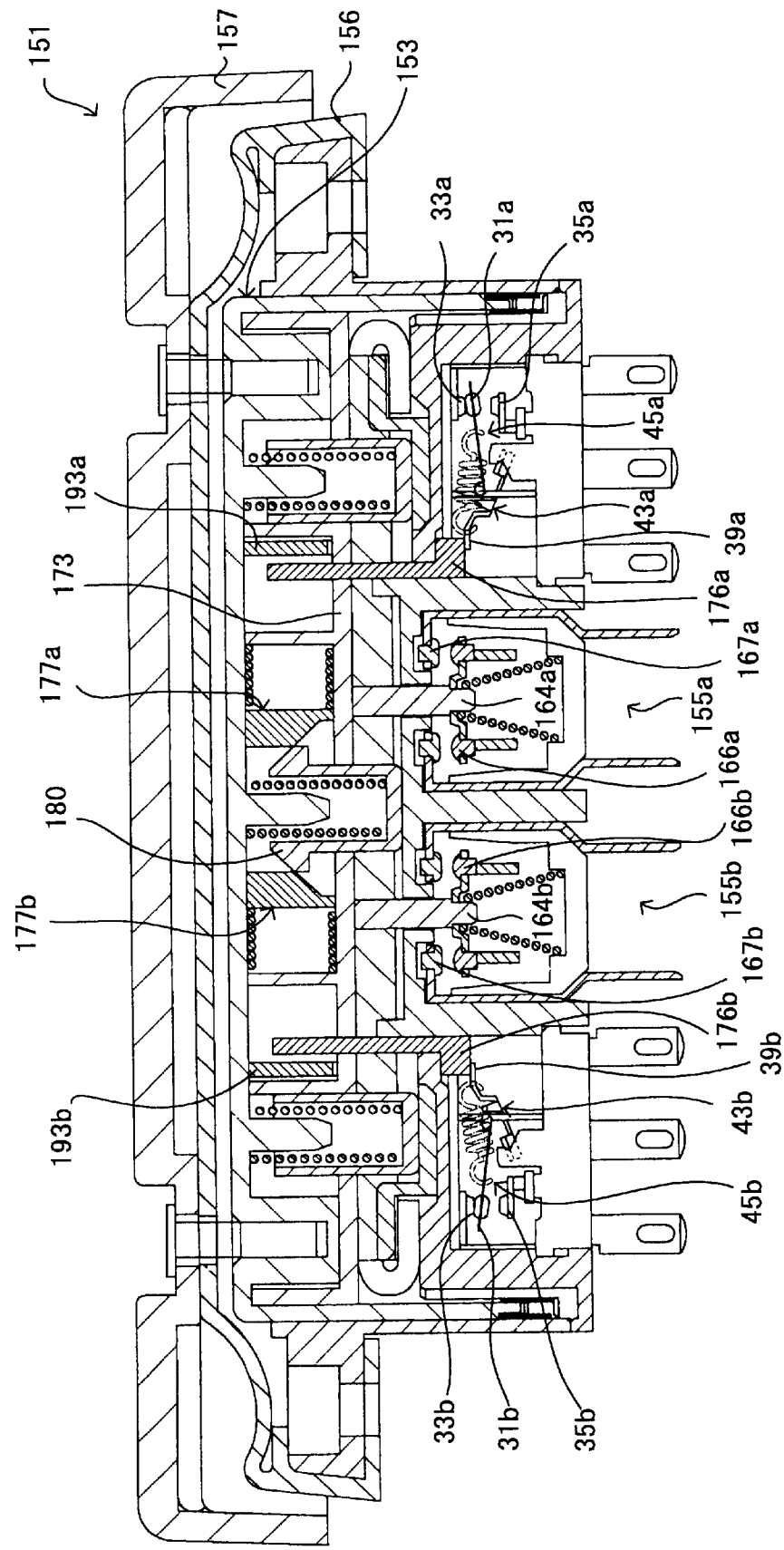
FIG. 17 is a sectional front view showing still another state of the push-button switch according to the third embodiment hereof.

When the operative members 43a, 43b are released from the pressure of the pressing sections 176a, 176b, the first ends 39a, 39b of the operative members 43a, 43b rotate upwardly as urged upward by the helical springs 45a, 45b, as shown in FIG. 17. Because of the rotation of the first ends 39a, 39b of the operative members 43a, 43b, the downward urging force on the first ends of the movable terminals 31a, 31b is changed to the upward urging force which upwardly rotates the first ends of the movable terminals 31a, 31b. Thus, the movable terminals 31a, 31b in contact with the normally open stationary terminals 35a, 35b are separated therefrom to come into contact with the normally close stationary terminals 33a, 33b. As a result, the push-button switch 151 is shifted from the ON state to the second OFF state.

In the second OFF state, the pressing plate 173 of the push button 153 abuts against the upper ends of the movable members 164a, 164b of the normally close contacts 155a, 155b to depress the movable members 164a, 164b, as shown in FIG. 17. Thus, the movable terminal pair 166a, 166b and the stationary terminal pair 167a, 167b of the normally close contact 155a, 155b are forcibly separated from each other. Therefore, if the movable terminal pair 166a, 166b are fused with the stationary terminal pair 167a, 167b, for example, the movable terminal pair 166a, 166b are forcibly separated from the stationary terminal pair 167a, 167b to open the normally close contact 155a, 155b. Thus, the combination of the pressing plate 173 and the movable members 164a, 164b constitutes the forcible separation means of the present invention.

According to the third embodiment, the equal effect to that of the first embodiment described above is naturally achieved. Furthermore, the third embodiment features a simple configuration because a single pressing shaft 180 is used to effect the simultaneous horizontal movement of the slide blocks 177a, 177b for releasing the operative members 43a, 43b from the depression by the pressing sections 176a, 176b. As a result, the push-button switch 151 accomplishes cost reduction.

The third embodiment described above is provided with two normally close contacts 155a, 155b such that whether the c-contacts 9a, 9b are in the first OFF state or in the second OFF state can be determined by monitoring the open/close state of the normally close contacts 155a, 155b.

In the third embodiment described above, the first and the second circuits formed by the c-contacts 9a, 9b may have the same wire connections as those shown in FIG. 7 or 10 illustrating the first embodiment. An alternative circuit configuration may be made such that the first and the second circuits formed by the c-contacts 9a, 9b are connected in series with the normally close contacts 155a, 155b, respectively.

(Fourth Embodiment)

A fourth embodiment of the present invention will be described with reference to FIGS. 18 to 21. FIGS. 18 to 21 are sectional front views of the fourth embodiment in different states for explaining the operations thereof. It is noted that the same reference characters as in the first embodiment represent the same or equivalent parts, respectively.

Figure 18:
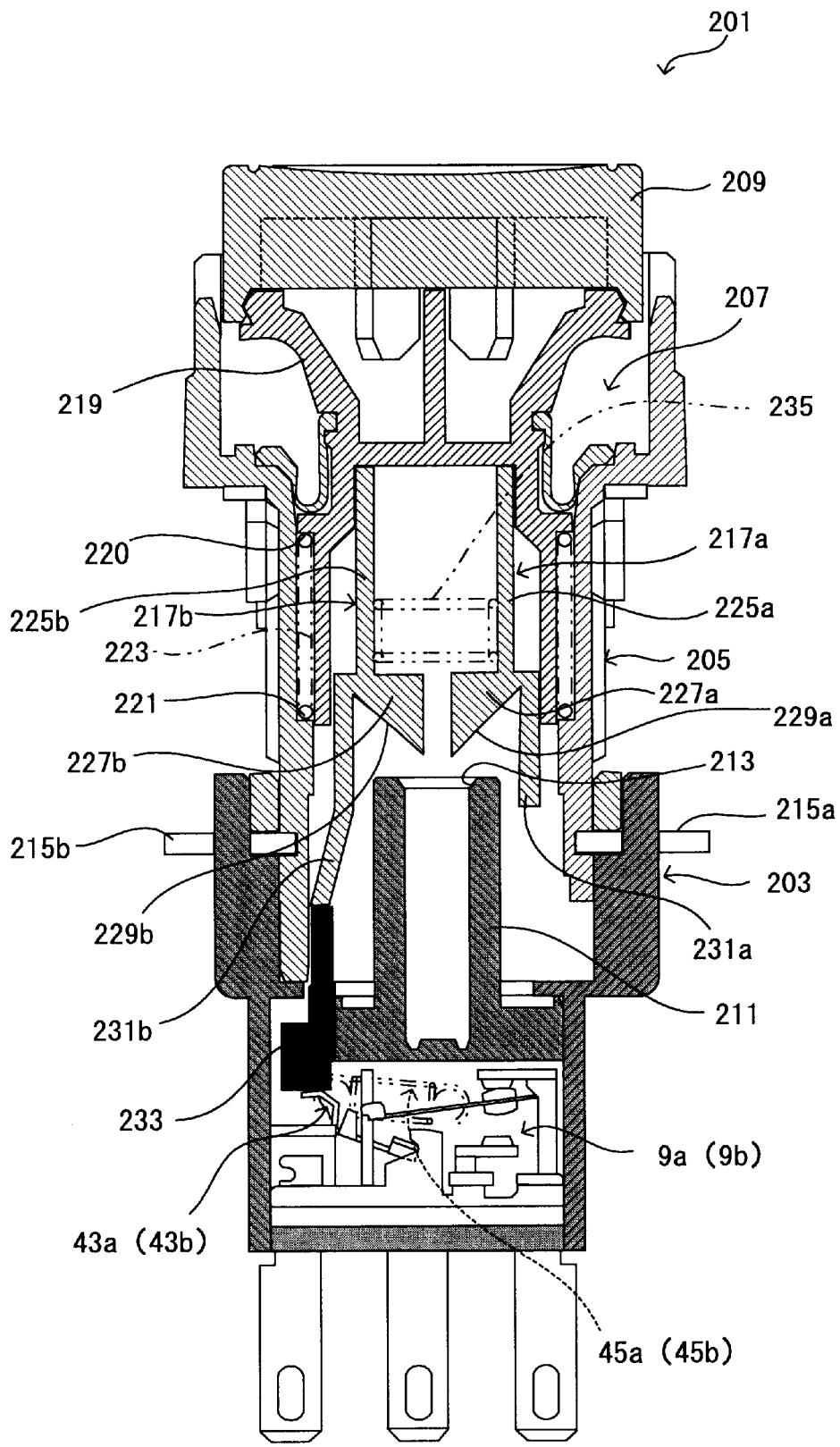
FIG. 18 is a sectional front view showing one state of a push-button switch according to a fourth embodiment hereof.

As shown in FIG. 18, a push-button switch 201 according to this embodiment comprises a switch case 203 provided with two c-contacts 9a, 9b of the same configurations as in the first embodiment; a cylindrical case member 205 mounted to an upper end of the switch case 203; an operating shaft 207 accommodated in the case member 205 for opening/closing the c-contacts 9a, 9b; and a push button 209 mounted to an upper end of the operating shaft 207.

The switch case 203 contains the tandem-arranged c-contacts 9a, 9b in its lower part and is provided with a cylindrical engagement member 211 which is disposed over the c-contacts 9a, 9b. The engagement member 211 is formed with a taper 213 on an inside wall at an upper end thereof. The switch case 203 is formed with a pair of flanges 215a, 215b on its outer side, which are secured to a teaching pendant or the like via screws or the like.

The operating shaft 207 disposed in the case member 205 comprises a pair of pressing members 217a, 217b in opposed relation; and a coupling member 219 attached to upper ends of the pressing members 217a, 217b for coupling the pressing members 217a, 217b with the push button 209. A helical spring 223 is mounted about a lower part of the coupling member 219, as anchored at one end to a step 220 formed centrally of a periphery of the coupling member 219 and at the other end to a step 221 formed on an inside surface of the case member 205 at place lower than a mid-portion thereof. The helical spring 223 urges upwardly the push button 209, the coupling member 219 and the pressing members 217a, 217b.

The pressing member 217a, 217b includes a plate-like support portion 225a, 225b extended vertically; and an engaging piece 227a, 227b integrally formed with the support portion as extended from a lower end thereof. The engaging piece 227a, 227b is formed with a slope 229a, 229b on its lower side, which is adapted for engagement with the taper 213 at the upper end of the engagement member 211.

The engaging piece 227a, 227b of the pressing member 217a, 217b is formed with a projecting piece 231a, 231b on a side thereof, the projecting piece extended downwardly. The projecting piece 231b of the left-hand pressing member 217b is longer than the projecting piece 231a of the right-hand pressing member 217a. Disposed under the longer projecting piece 231b is a pressing section 233 for depressing the operative members 43a, 43b of the two c-contacts 9a, 9b. The projecting piece 231b abuts against an upper end of the pressing section 233 to press down the pressing section 233, which, in turn, depresses the operative members 43a, 43b thereby operating the c-contacts 9a, 9b.

A helical spring 235 is disposed between lower portions of the opposing support portions 225a, 225b of the pressing members 217a, 217b. The pressing members 217a, 217b are urged outwardly by the helical spring 235.

Next, the operations of the push-button switch 201 of the above arrangement will be described with reference to FIGS. 18 to 21.

Figure 19:
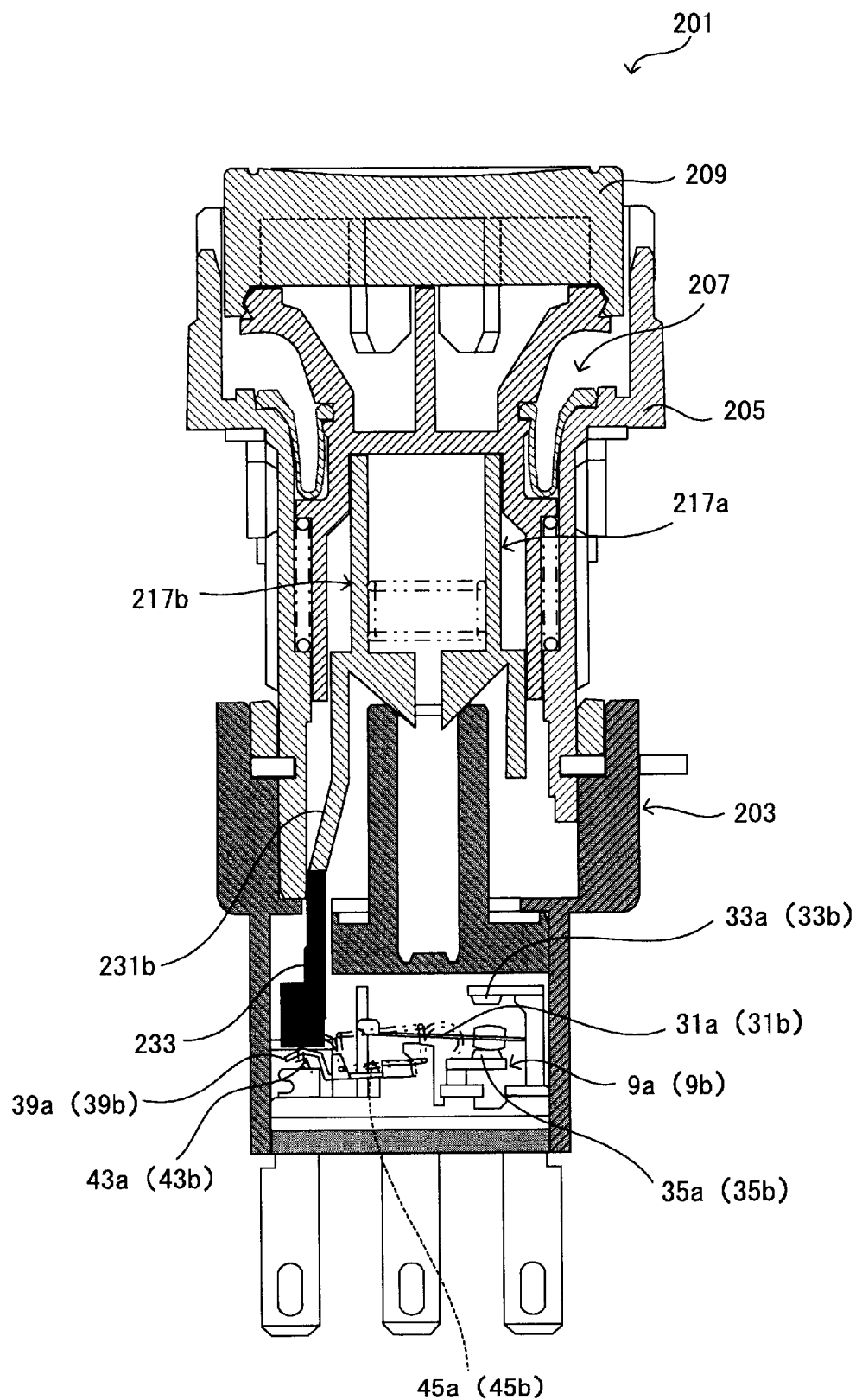
FIG. 19 is a sectional front view showing another state of the push-button switch according to the fourth embodiment hereof.

When the push button 209 in the first OFF state shown in FIG. 18 is depressed, the operating shaft 207 is depressed as interlocked with the push button 209 while the longer projecting piece 231b presses down the pressing section 233, as shown in FIG. 19. Thus, the pressing section 233 depresses the first ends 39a, 39b of the operative members 43a, 43b of the c-contacts 9a, 9b against the helical springs 45a, 45b whereby the first ends 39a, 39b of the operative members 43a, 43b are rotated downwardly.

When the amount of rotation of the first ends 39a, 39b of the operative members 43a, 43b reaches the first dead point at which the upward urging force of the helical spring 45a, 45b on the first ends of the movable terminals 31a, 31b is changed to the downward urging force, the movable terminals 31a, 31b of the c-contacts 9a, 9b are rotated downwardly about the second ends 29a, 29b thereof, as shown in FIG. 19. Thus, the movable terminals 31a, 31b are separated from the normally close stationary terminals 33a, 33b to come into contact with the normally open stationary terminals 35a, 35b. As a result, the push-button switch 201 is shifted from the first OFF state to the ON state.

Figure 20:
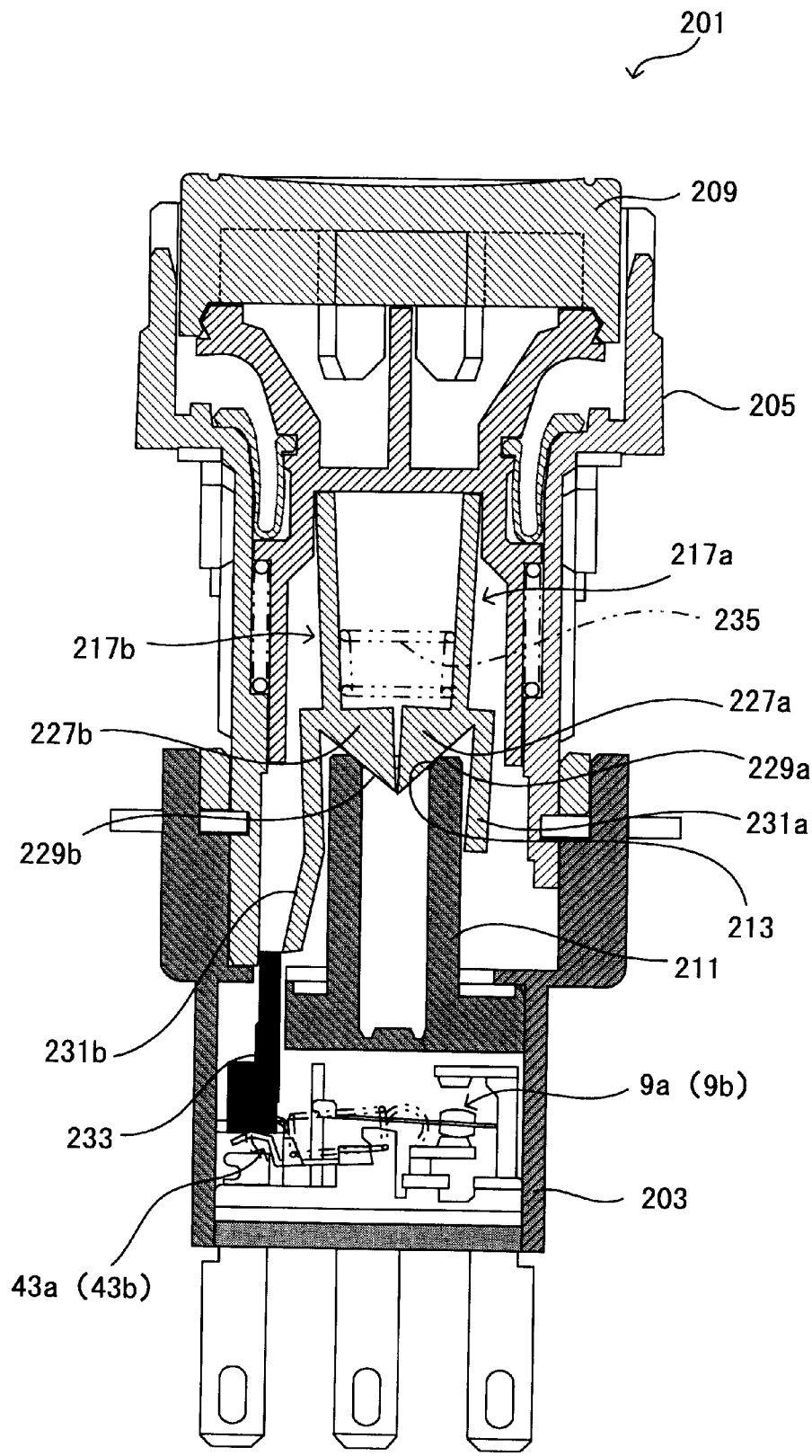
FIG. 20 is a sectional front view showing yet another state of the push-button switch according to the fourth embodiment hereof.

When the push-button switch 201 in this state is further depressed, the engaging pieces 227a, 227b of the pressing members 217a, 217b enter a hollow portion of the engagement member 211, as shown in FIG. 20. On the other hand, while the slopes 229a, 229b of the engaging pieces 227a, 227b slide on the taper 213 of the engagement member 211, the projecting pieces 231a, 231b of the pressing members 217a, 217b move toward the center of the push-button switch 201 against the helical spring 235.

This brings the longer projecting piece 231b out of the abutment against the pressing section 233 which, in turn, is allowed to move upwardly. Hence, the operative members 43a, 43b are released from the pressure from the pressing section 233. Thus, the combination of the pressing members 217a, 217b, the engagement member 211 and the pressing section 233 according to this embodiment constitutes the releasing means of the present invention.

Figure 21:
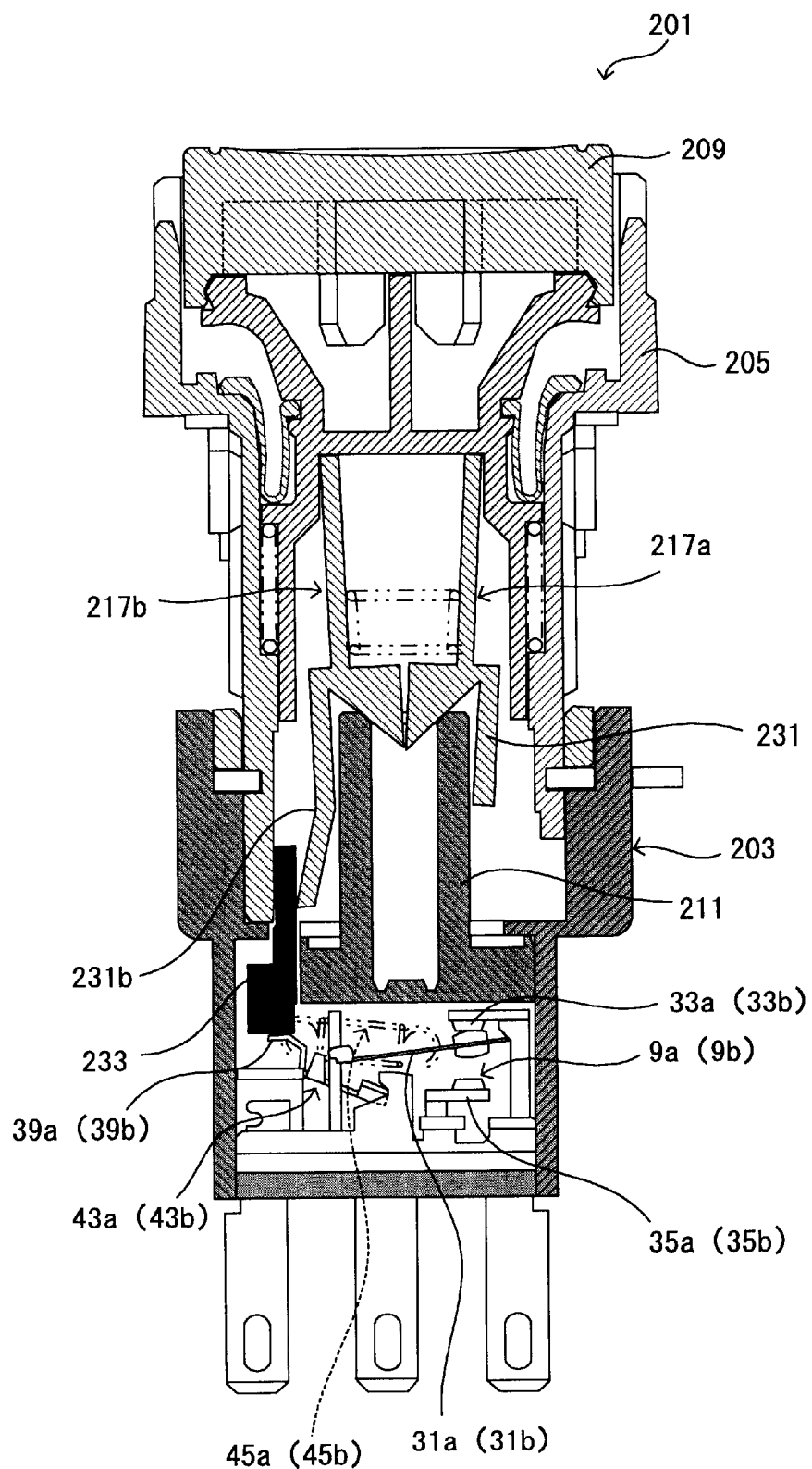
FIG. 21 is a sectional front view showing still another state of the push-button switch according to the fourth embodiment hereof.

When the operative members 43a, 43b are released from the pressure from the pressing section 233, the first ends 39a, 39b of the operative members 43a, 43b are rotated as urged upward by the helical springs 45a, 45b, as shown in FIG. 21. Because of the rotation of the first ends 39a, 39b of the operative members 43a, 43b, the downward urging force on the first ends of the movable terminals 31a, 31b is changed to the upward urging force, which upwardly rotates the first ends of the movable terminals 31a, 31b. Hence, the movable terminals 31a, 31b in contact with the normally open stationary terminals 35a, 35b are separated therefrom to come into contact with the normally close stationary terminals 33a, 33b. Thus, the push-button switch 201 is shifted from the ON state to the second OFF state.

According to the fourth embodiment, the equal effect to that of the first embodiment described above is naturally achieved. Furthermore, the fourth embodiment features a simple on figuration for switching the push-button switch 201 between the ON state and the OFF state because a single pressing member 217b is used for depressing or releasing the pressing section 233. As a result, the push-button switch 201 accomplishes cost reduction.

Although the normally close contact (or the normally open contact) is not shown in FIGS. 18 to 21, such a contact may naturally be provided in the case 205. In this case, there may be provided a single normally close contact (or normally open contact). Otherwise, an individual normally close contact (or normally open contact) may be provided in correspondence to each of the c-contacts 9a, 9b.

In the fourth embodiment described above, as well, the first and the second circuits formed by the c-contacts 9a, 9b may have the same wire connections as those shown in FIG. 7 or 10 illustrating the first embodiment. An alternative circuit configuration may be made such that the first and the second circuits formed by the c-contacts 9a, 9b are connected in series with the normally close contact.

(Fifth Embodiment)

A fifth embodiment of the present invention will be described with reference to FIGS. 22 to 25. FIGS. 22 to 25 are sectional front views of the fifth embodiment in different states for explaining the operations thereof. It is noted that the same reference characters as in the first embodiment represent the same or equivalent parts, respectively.

Figure 22:
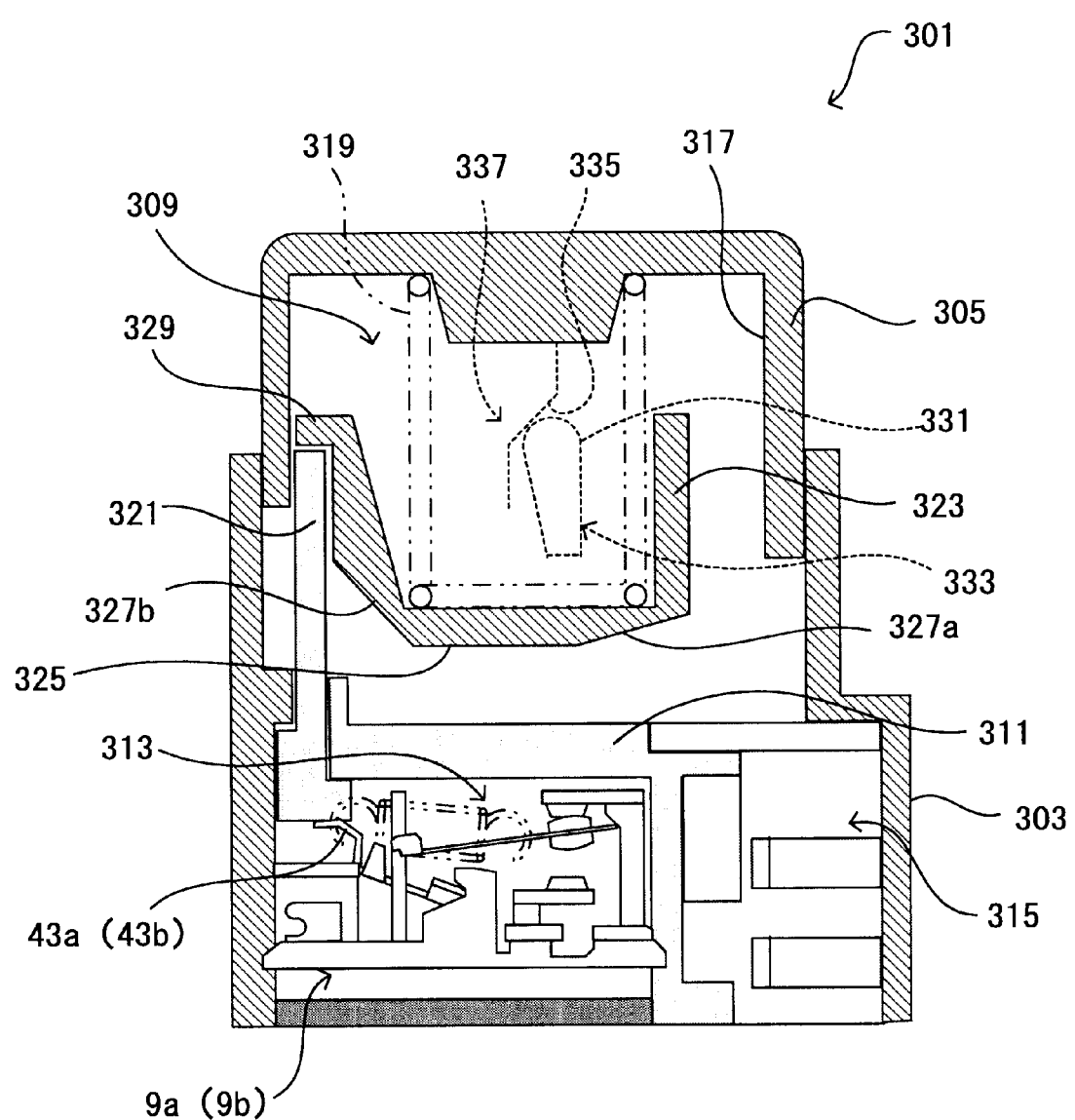
FIG. 22 is a sectional front view showing one state of a push-button switch according to a fifth embodiment hereof.

As shown in FIG. 22, a push-button switch 301 according to this embodiment comprises a switch case 303; a push button 305 depressibly supported by the switch case 303; the c-contacts 9a, 9b disposed in the switch case 303 and having the same configurations as in the first embodiment; the normally close contact (not shown) disposed in the switch case 303 and having the same configuration as in the second embodiment; and a switching mechanism 309 disposed in the push button 305 for opening/closing the c-contacts 9a, 9b.

As shown in FIG. 22, the switch case 303 has its lower portion divided into two accommodating portions 313, 315 by a partitioning plate 311. The left-hand accommodating portion 313 accommodates the tandem-arranged c-contacts 9a, 9b whereas the right-hand accommodating portion 315 accommodates the normally close contact (not shown).

An interior of the push button 305 defines a rectangular accommodating portion 317 in plan, in which the switching mechanism 309 is disposed. The switching mechanism 309 comprises a pressing section 321 for depressing the first ends 39a, 39b of the operative members 43a, 43b of the c-contacts 9a, 9b; and a pressing member 323 for pressing down the pressing section 321.

The pressing member 323 is shaped like a box with an open top. A helical spring 319, fixed to an upper wall of the accommodating portion 317, is anchored at lower end thereof to a bottom of the interior space of the pressing member 323. The pressing section 321 is urged downwardly by the helical spring 319. A horizontal portion 325 defining a bottom of the pressing member 323 is formed with a pair of slopes 327a, 327b at opposite ends of a lower side thereof.

The pressing member 323 is integrally formed with a projecting piece 329 at an upper left end thereof. The pressing member 323 is arranged such that the projecting piece 329 is in engagement with an upper end of the pressing section 321 when the push button 305 is undepressed. Depressing the push button 305 involves a downward movement of the pressing member 323 such that the projecting piece 329 abuts against the pressing section 321 to depress the pressing section 321.

As indicated by the broken line in FIG. 22, a locking piece 333 having an arcuate portion 331 at its upper end is formed on an outside front surface of the pressing member 323. The arcuate portion 331 of the locking piece 333 is locked to a step 337 formed on an inside front wall of the push button 305 and including a slope 335 extended downward as inclined leftwardly.

The operations of the push-button switch of the above arrangement will be described with reference to FIGS. 22 to 25.

Figure 23:
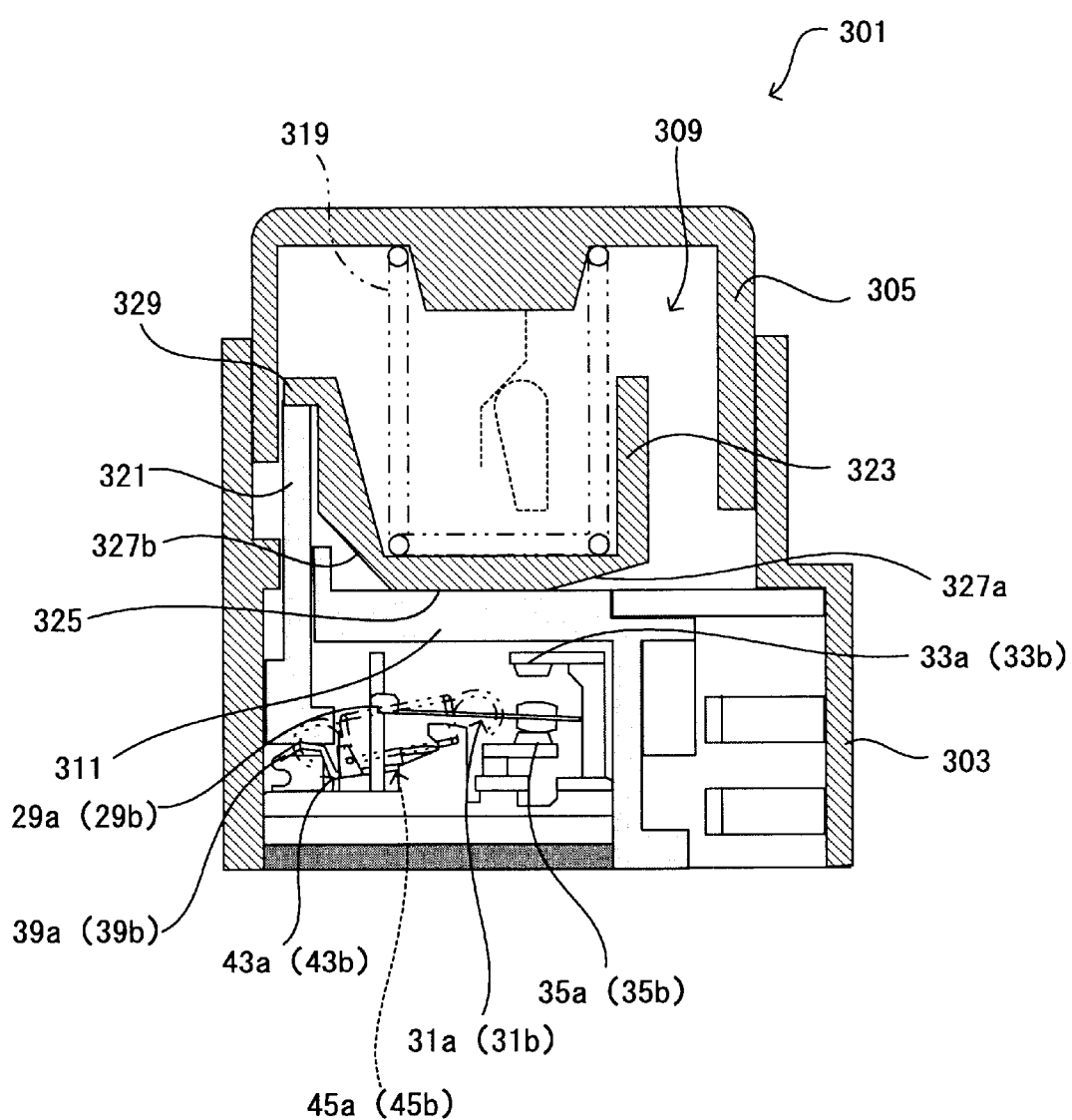
FIG. 23 is a sectional front view showing another state of the push-button switch according to the fifth embodiment hereof.

When the push button 305 in the first OFF state shown in FIG. 22 is depressed, the pressing member 323 urged downward by the helical spring 319 moves down as interlocked with the push button 305, as shown in FIG. 23. In conjunction with the movement of the pressing member 323, the projecting piece 329 thereof presses down the pressing section 321. Thus, the pressing section 321 depresses the first ends 39a, 39b of the operative members 43a, 43b of the c-contacts 9a, 9b against the helical springs 45a, 45b, so that the first ends 39a, 39b of the operative members 43a, 43b are rotated downwardly.

When the amount of rotation of the first ends 39a, 39b of the operative members 43a, 43b reaches the first dead point at which the upward urging force of the helical springs 45a, 45b on the first ends of the movable terminals 31a, 31b is changed to the downward urging force, the movable terminals 31a, 31b of the c-contacts 9a, 9b are rotated downward about the second ends 29a, 29b thereof, as shown in FIG. 23. Thus, the movable terminals 31a, 31b are separated from the normally close stationary terminals 33a, 33b to come into contact with the normally open stationary terminals 35a, 35b. As a result, the push-button switch 201 is shifted from the first OFF state to the ON state.

Figure 24:
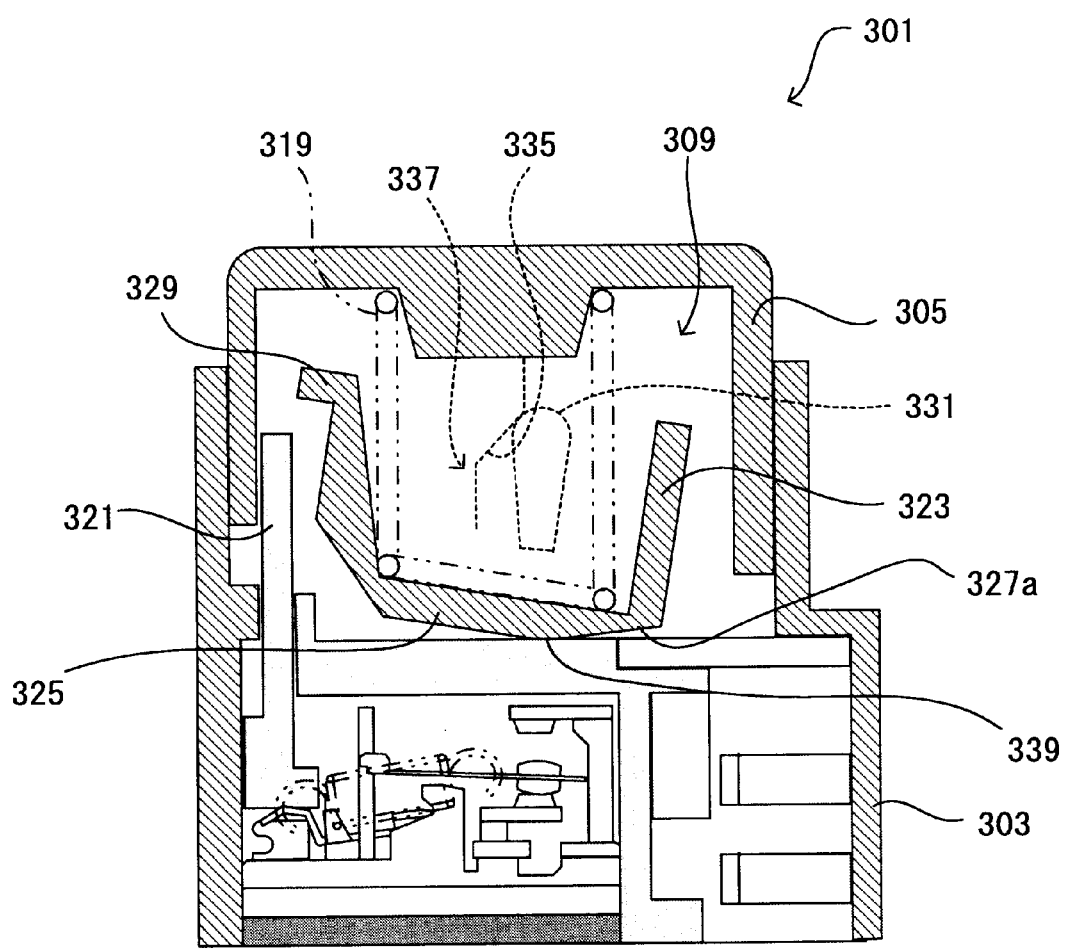
FIG. 24 is a sectional front view showing yet another state of the push-button switch according to the fifth embodiment hereof.

At this time, the horizontal portion 325 at the bottom of the pressing member 323 abuts against the top surface of the partitioning plate 311. When the push button 305 in this state is further depressed, the arcuate portion 331 of the locking piece 333 on the pressing member 323 slides on the slope 335 of the step 337 formed on the inside wall of the push button 305, as shown in FIG. 24. The sliding movement causes the pressing member 323 to rotate about a boundary angled portion 339 defined between the horizontal portion 325 at the bottom of the pressing member 323 and the right-hand slope 327a in the direction of the slope 335 of the step 337. That is, the pressing member 323 rotates rightwardly. As a result, the projecting piece 329 of the pressing member 323 is disengaged from the upper end of the pressing section 321, so that the pressing section 321 is allowed to move upwardly. Thus, the switching mechanism 309 according to this embodiment constitutes the releasing means of the present invention.

Figure 25:
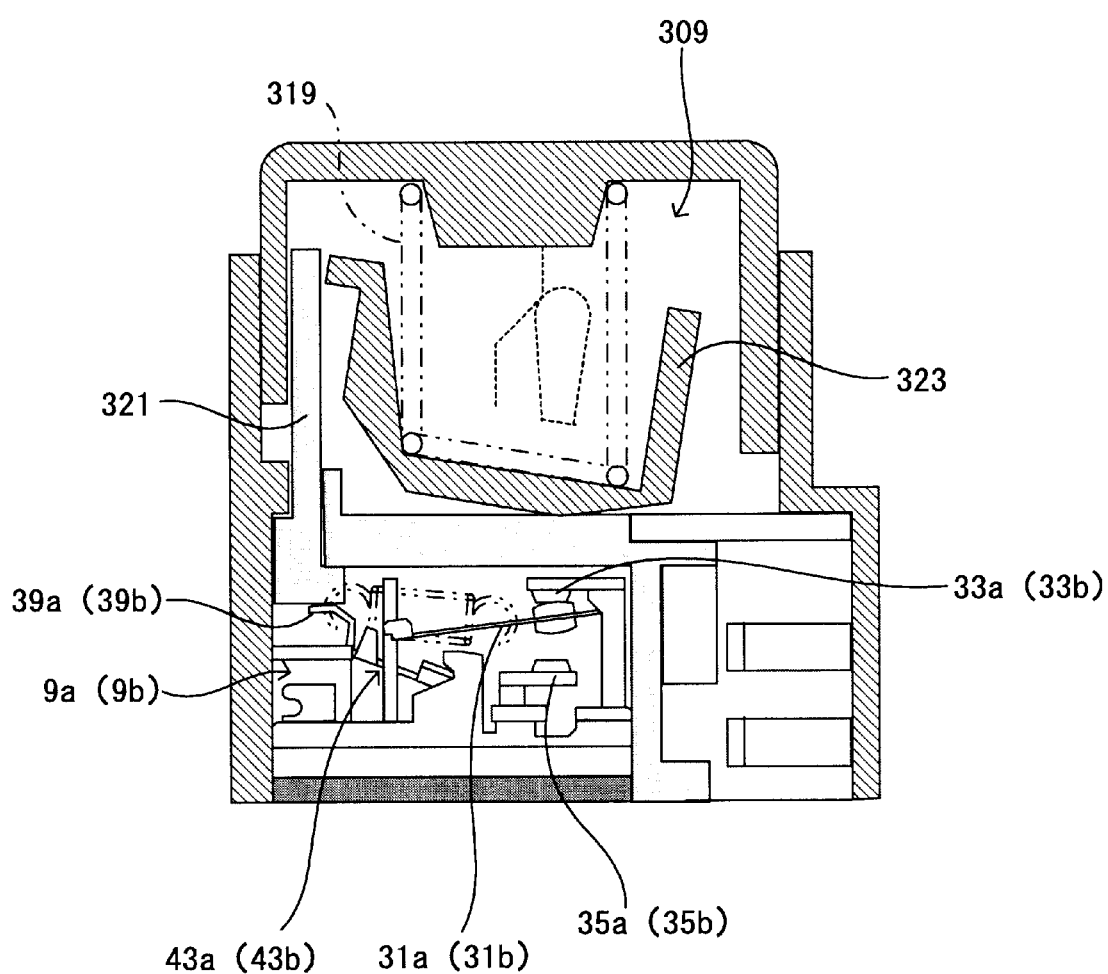
FIG. 25 is a sectional front view showing still another state of the push-button switch according to the fifth embodiment hereof.

When the operative members 43a, 43b are released from the pressure from the pressing section 321, the first ends 39a, 39b of the operative members 43a, 43b are rotated as urged upwardly by the helical springs 45a, 45b, as shown in FIG. 25. Because of the rotation of the first ends 39a, 39b of the operative members 43a, 43b, the downward urging force on the first ends of the movable terminals 31a, 31b is changed to the upward urging force, which upwardly rotates the first ends of the movable terminals 31a, 31b. Hence, the movable terminals 31a, 31b in contact with the normally open stationary terminals 35a, 35b are separated therefrom to come into contact with the normally close stationary terminals 33a, 33b. Thus, the push-button switch 201 is shifted from the ON state to the second OFF state.

At this time, the normally close contact (not shown) in the accommodating portion 315 is opened. Therefore, whether the push-button switch 301 is in the first OFF state or in the second OFF state can be determined by monitoring the open/close state of the normally close contact.

According to the fifth embodiment, the equal effect to that of the first embodiment is naturally achieved. Furthermore, the fifth embodiment accomplishes the cost reduction of the push-button switch 301 because the switching mechanism 309 has a simple configuration including the pressing section 321 and the pressing member 323.

(Sixth Embodiment)

Figure 26:
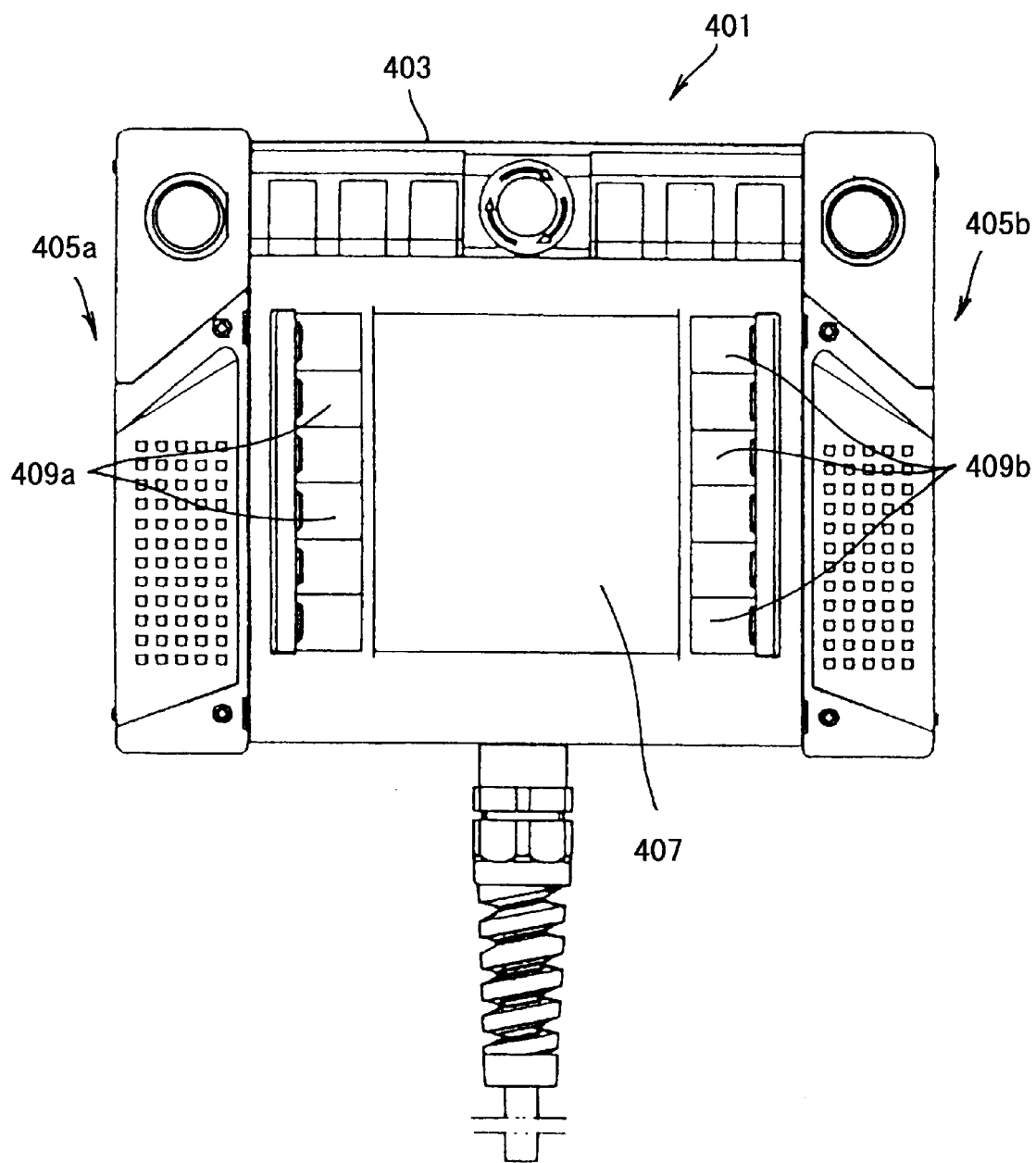
FIG. 26 is a front view showing a teaching pendant according to a sixth embodiment hereof.
Figure 27:
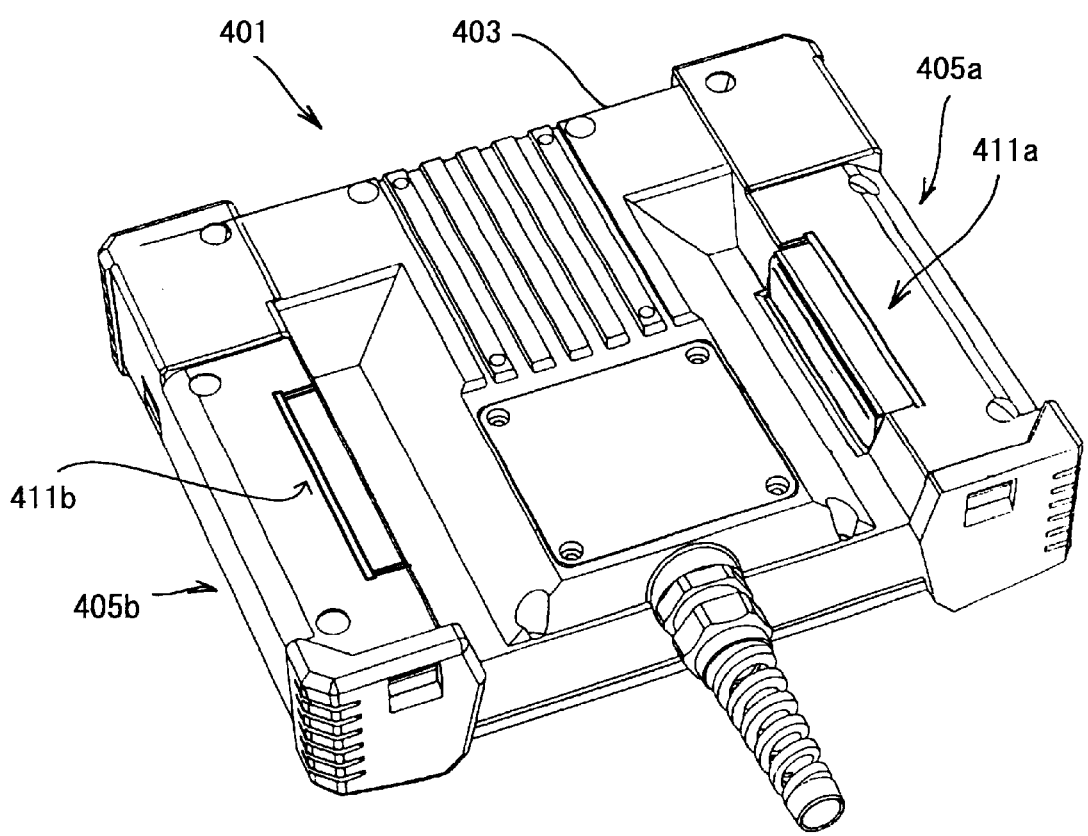
FIG. 27 is a perspective view of the teaching pendant of the sixth embodiment hereof as seen from the rear side.
Figure 28:
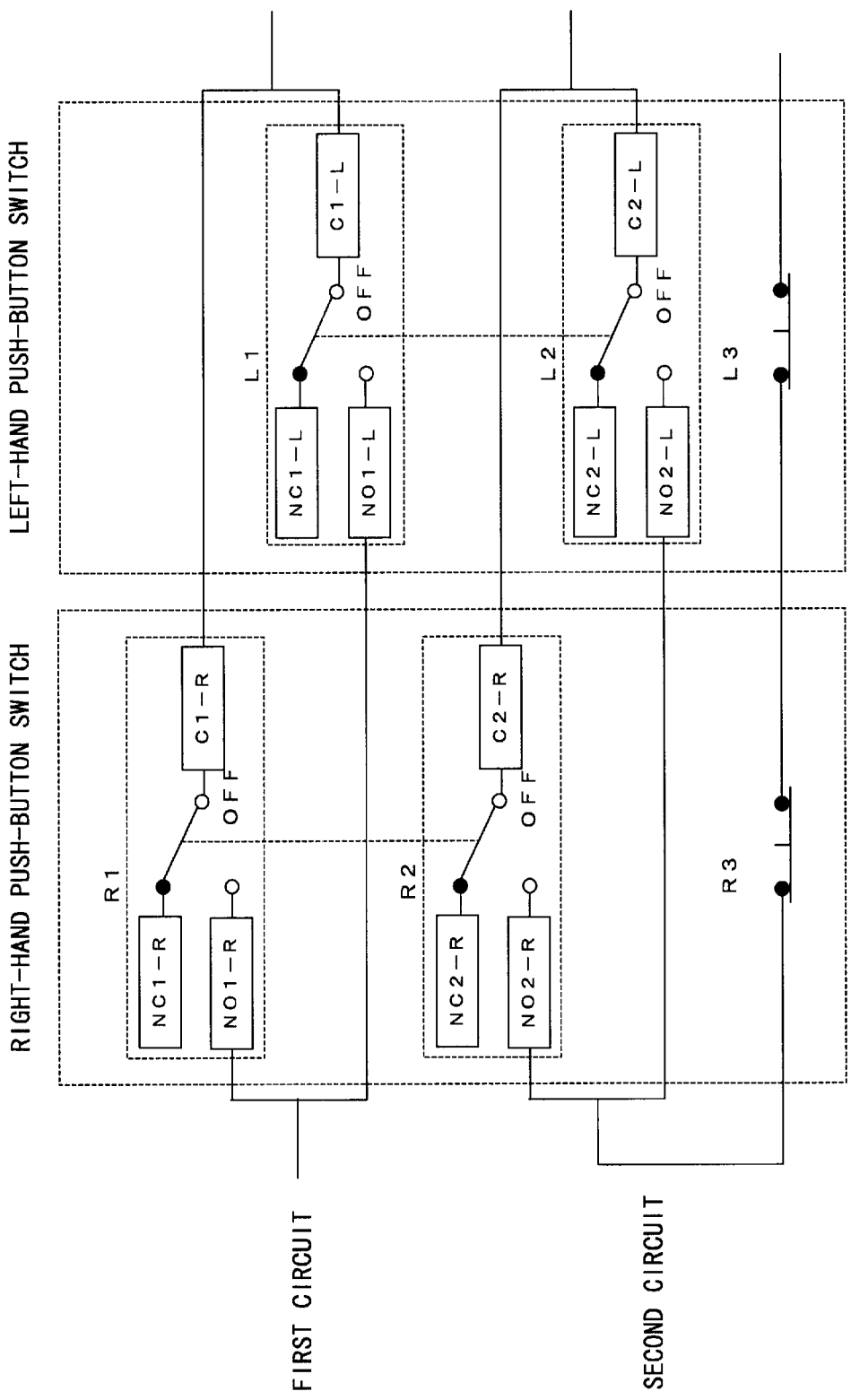
FIG. 28 is a circuit connection diagram for explaining the operations of the sixth embodiment hereof.
Figure 29:
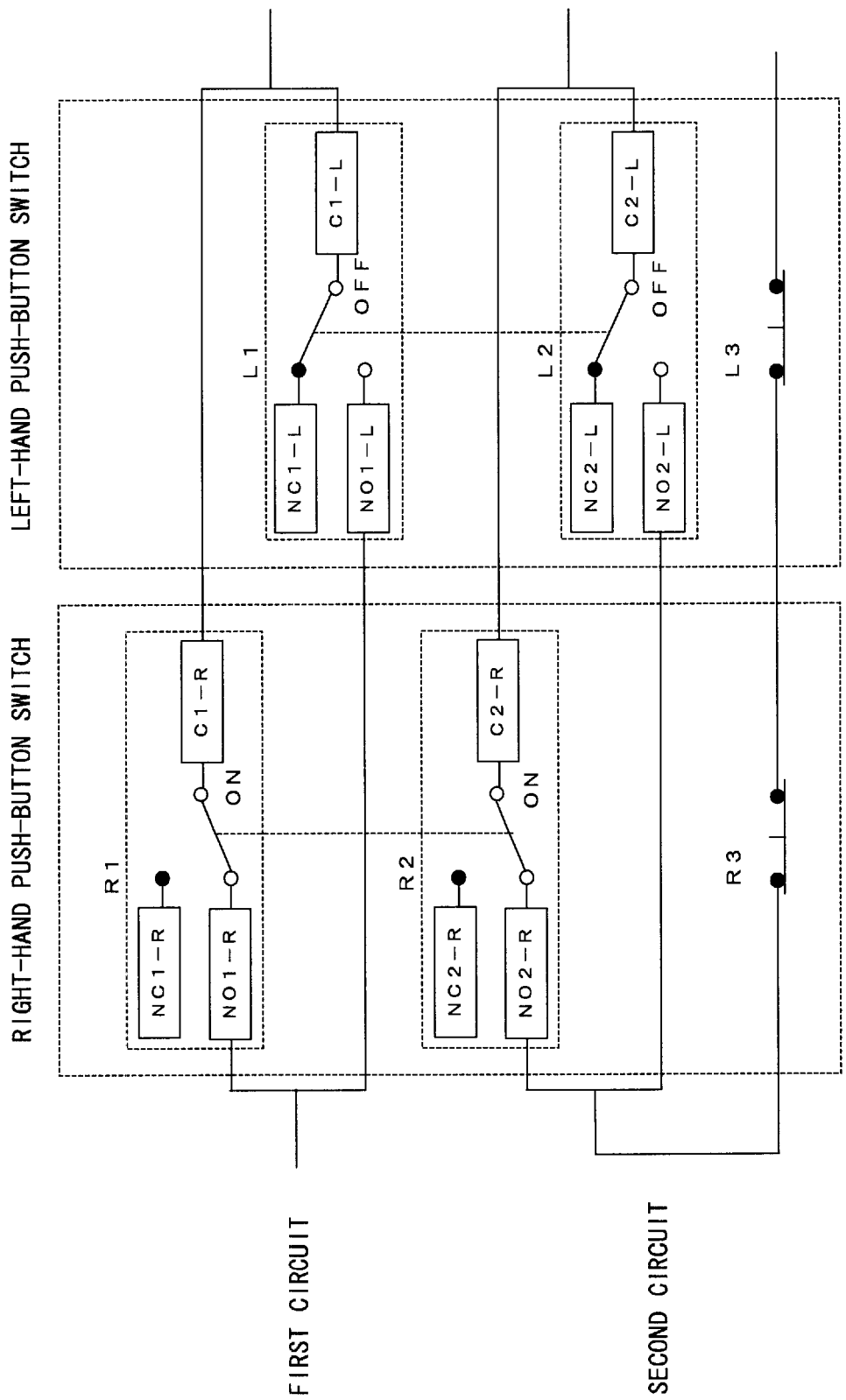
FIG. 29 is a circuit connection diagram for explaining the operations of the sixth embodiment hereof.
Figure 30:
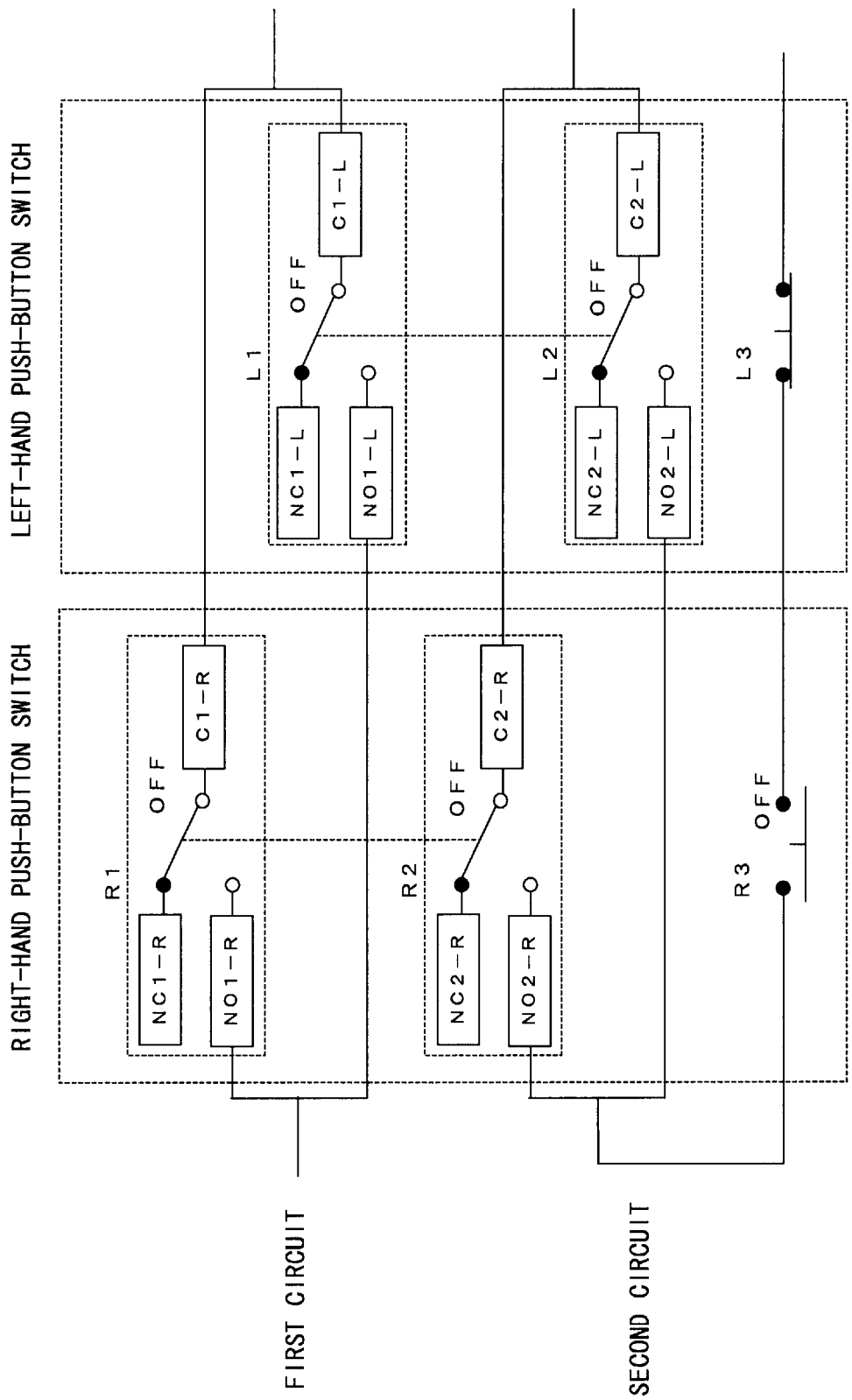
FIG. 30 is a circuit connection diagram for explaining the operations of the sixth embodiment hereof.

Now referring to FIGS. 26 to 30, description will be made on a sixth embodiment wherein the push-button switch of the present invention is applied to a teaching pendant as an operation device for an industrial manipulating robot. FIG. 26 is a front view of the teaching pendant of this embodiment, whereas FIG. 27 is a perspective view thereof as seen from the rear side. FIGS. 28 to 30 are circuit diagrams of a push-button switch disposed in the teaching pendant.

A teaching pendant 401 as the operation device for the industrial manipulating robot is a portable unit to be connected to a control device of the robot and has a configuration as shown in FIG. 26, for example.

As seen in FIG. 26, the teaching pendant 401 is arranged such that opposite end portions of a pendant body 403 define grip portions 405a, 405b to be held by hands. Disposed at a center of the pendant body 403 is a liquid crystal display 407 (hereinafter referred to as "LCD"). As viewing a screen of this LCD 407, the operator properly manipulates, with his thumbs or the like, a plural number of operation keys 409a, 409b and others arranged on the opposite sides of the LCD 407 of the pendant body 403 thereby teaching data such as a program to the robot or operating the robot.

In this case, the robot cannot be taught by merely manipulating the operation keys 409a, 409b. It is designed such that the teaching of the program to the robot or the operation of the robot is not effected unless the operation key 409a, 409b is manipulated after the push-button switch is shifted to the ON state by manipulating an operation section 411a, 411b of the push-button switch, the operation sections 411a, 411b disposed on back sides of the grip portions 405a, 405b of the pendant body 403, as shown in FIG. 27.

The operation section 411a, 411b has an L-shaped section and is designed to be depressed by fingers of the right or left hand holding the pendant body 403. The operation sections 411a, 411b each contain therein a left-hand or right-hand push-button switch (not shown) according to the first embodiment. The push buttons of the left-hand and the right-hand push-button switches can be depressed by depressing the operation sections 411a, 411b, thereby turning ON or OFF the push-button switch.

Next, an exemplary circuit connection of the above teaching pendant will be described with reference to FIG. 28.

As shown in FIG. 28, the teaching pendant comprises two circuits formed by a first and a second circuit. In the first circuit, a c-contact RI of the right-hand push-button switch and a c-contact L1 of the left-hand push-button switch are connected in parallel. In the second circuit, the other c-contact R2 of the right-hand push-button switch and the other c-contact L2 of the left-hand push-button switch are connected in parallel, whereas a normally close contact R3 of the right-hand push-button switch and a normally close contact L3 of the left-hand push-button switch are connected in series with this parallel circuit.

Such circuit connections permit the date entry via the teaching pendant 401 which is enabled by manually operating the teaching pendant with either one of the left and the right hands for bringing the first and the second circuits into conduction.

The right-hand and the left-hand push-button switches employ any one of the push-button switches of the first to fourth embodiments described above. It is noted that NC1-R and NC2-R represent the normally close stationary terminals 33a, 33b of the c-contacts R1, R2 (the same as the c-contacts 9a, 9b shown in FIG. 1, for example) constituting the right-hand push-button switch; that NO1-R, NO2-R represent the normally open stationary terminals 35a, 35b of the c-contacts 9a, 9b constituting the right-hand push-button switch; and that C1-R and C2-R represent the movable terminals 31a, 31b of the c-contacts R1, R2 constituting the right-hand push-button switch.

Likewise, NC1-L, NC2-L represent the normally close stationary terminals 33a, 33b of the c-contacts L1, L2 (the same as the c-contacts 9a, 9b shown in FIG. 1, for example) constituting the left-hand push-button switch; NO1-L, NO2-L represent the normally open stationary terminals 35a, 35b of the c-contacts L1, L2 76; constituting the left-hand push-button switch; and C1-L and C2-L represent the movable terminals 31a, 31b of the c-contacts L1, L2 constituting the left-hand push-button switch. On the other hand, R3 and L3 represent the normally close contacts constituting the right-hand and the left-hand push-button switches, respectively.

Next, the operations of the teaching pendant according to this embodiment will be described with reference to FIGS. 28 to 30. In a state where the operation sections 411a, 411b are undepressed as shown in FIG. 28, depressing the operation section 411b with right hand, for example, will close the two c-contacts R1, R2 of the right-hand push-button switch at a time, as shown in FIG. 29. This shifts the right-hand push-button switch from the first OFF state to the ON state wherein the first and the second circuits are brought into conduction.

This shifts the teaching pendant 401 to a teaching mode wherein the teaching of the program to the robot is enabled. The teaching pendant 401 is adapted to be placed in the teaching mode by manipulating the pendant with either of the right and the left hands. Therefore, if the right hand is fatigued by depressing the operation section 411b in order to teach the program, for example, the teaching pendant 401 may be maintained in the teaching mode by holding the pendant body 403 in the left hand in turn and depressing the operation section 411a with the left hand.

When the right-hand operation section 411b depressed to maintain the right-hand push-button switch in the ON state is further depressed, both the c-contacts R1, R2 are shifted to the second OFF state while the normally close contact R3 is turned OFF, as shown in FIG. 30. Hence, the right-hand push-button switch is shifted to the second OFF state. Thus, both the first and the second circuits are shut down so that the teaching pendant 401 is disabled for teaching of the program.

At this time, an effort to shift the left-hand push-button switch to the ON state by manipulating the left-hand operation section 411a cannot bring the second circuit into conduction, because the normally close contacts R3, L3 of the right-hand and the left-hand push-button switches are connected in series in the second circuit. That is, the operation of the left-hand push-button switch is ineffective. The teaching pendant 401 in this state may be placed again in the teaching mode by temporarily releasing the right hand from the operation section 411b to return the right-hand push-button switch to the first OFF state.

According to the sixth embodiment, the pendant body 403 is provided with the right-hand and the left-hand push-button switches wherein one c-contacts R1, L1 and the other c-contacts R2, L2 are connected in parallel, respectively. Therefore, the teaching pendant can be placed in the teaching mode by manually turning ON either one of the right-hand and the left-hand push-button switches.

Hence, if the right hand is fatigued by manipulating the push-button switch, the operator may hold the pendant in his left hand so as to continue to teach the program. The teaching pendant provides for an efficient teaching operation with reduced load on the operator manipulating the pendant for long hours.

Since the right-hand and the left-hand push-button switches have their normally close contacts connected in series, the second circuit is shut down when either one of the push-button switches is in the second OFF state, for example. Therefore, the teaching pendant is prevented from being shifted to the teaching mode by manipulating the other push-button switch. As a result, the teaching of the program in the second OFF state during emergency can be avoided.

In the sixth embodiment described above, the circuit connections of the right-hand and the left-hand push-button switches via the c-contacts may be made the same way as those shown in FIG. 10 illustrating the first embodiment. That is, the first and the second circuits are adapted to have the opposite ON/OFF positions relative to each other. Needless to say, the equal effect to that of the foregoing embodiments can be attained in this case.

(Seventh Embodiment)

Figure 31:
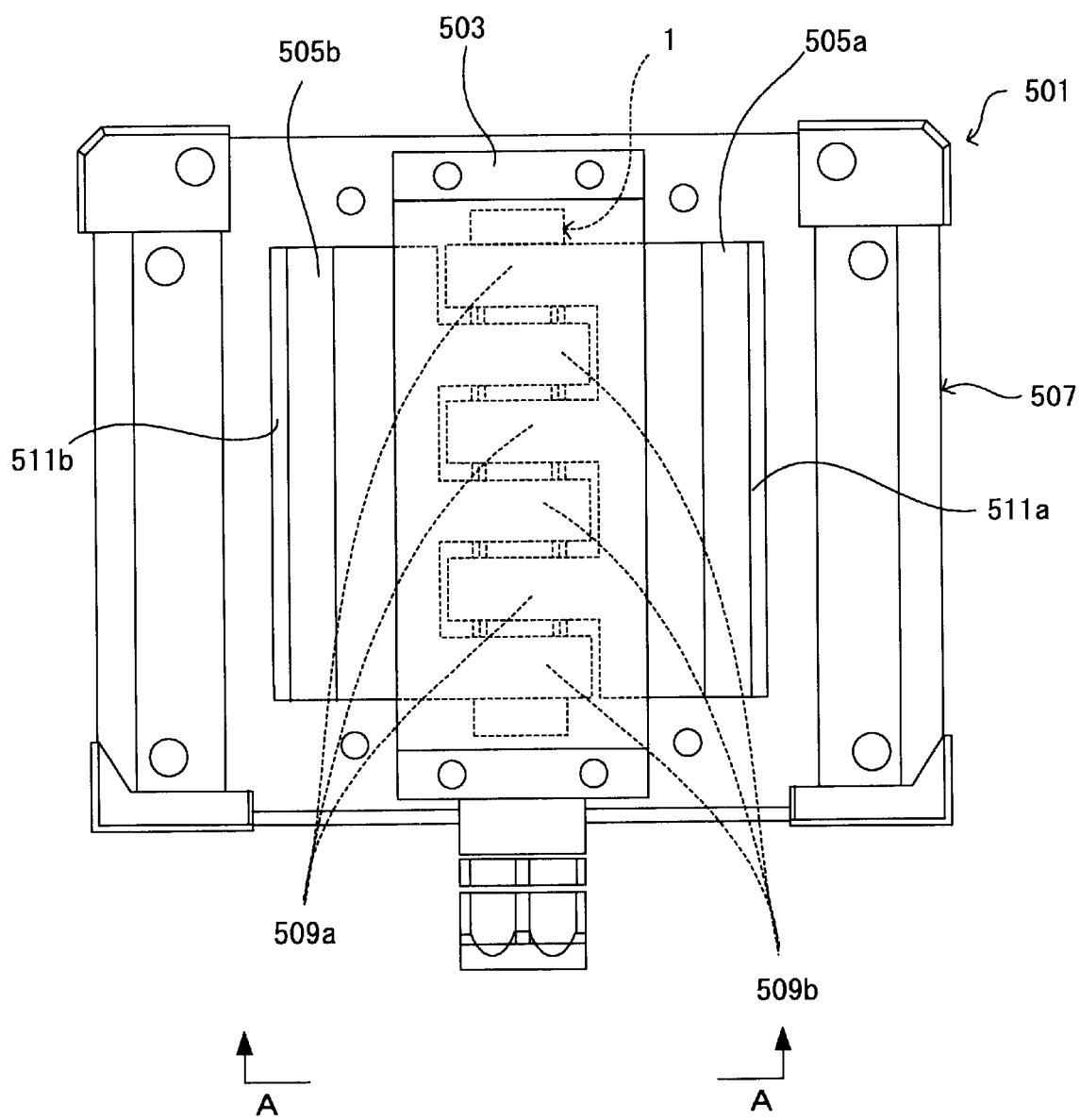
FIG. 31 is a rear view showing a teaching pendant according to a seventh embodiment hereof.
Figure 32:
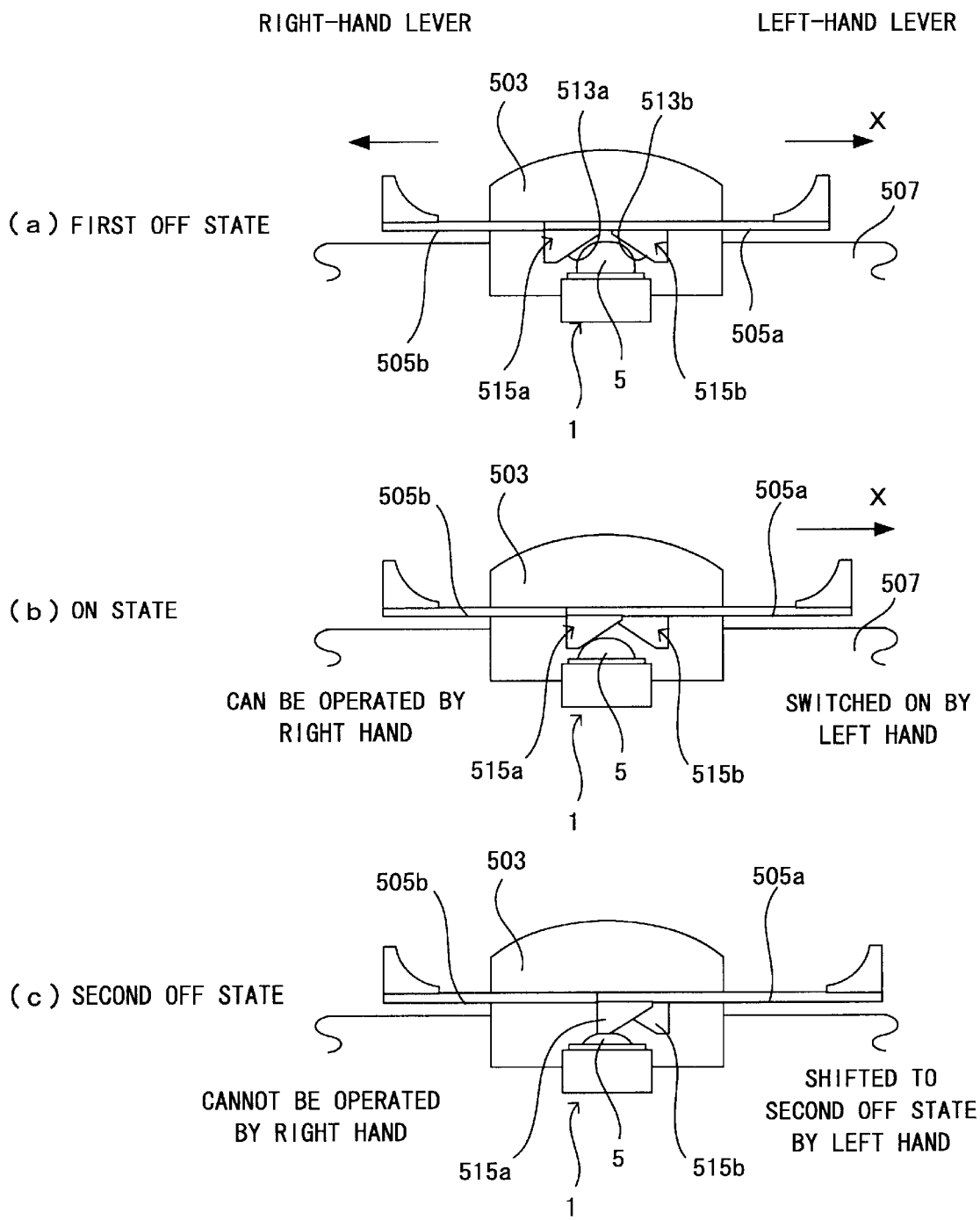
FIG. 32 is a group of diagrams explanatory of the operations of the teaching pendant according to the seventh embodiment hereof.

Now referring to FIGS. 31 and 32, description will be made on a seventh embodiment wherein the push-button switch of the present invention is applied to a teaching pendant as an operation device for an industrial manipulating robot. FIG. 31 is a rear view of the teaching pendant according to this embodiment, whereas FIG. 32 is a group of diagrams for explaining the operations of the teaching pendant.

As shown in FIG. 31, a teaching pendant 501 according to this embodiment is provided with a cover member 503 on a rear side thereof; a single push-button switch 1 of the first embodiment covered by the cover member 503; and a left-hand and a right-hand manipulation levers 505a, 505b for operative depression of the push-button switch 1.

The push-button switch 1 is disposed centrally of the rear side of a pendant body 507 as covered by the cover member 503. The manipulation lever 505a, 505b is laterally movable and formed with a plurality of laterally protruding projections 509a, 509b on one end A thereof, the projections arranged at regular space intervals in a comb-like fashion. These two manipulation levers 505a, 505b oppose each other with their projections 509a, 509b interdigitated. The manipulation lever 505a, 505b is formed with a grip portion 511a, 511b on the other end thereof to be held by the right or left hand.

FIG. 32(a) is a sectional view taken on the line A—A in FIG. 31. As seen in FIG. 32(a), the projection 509a, 509b of the manipulation lever 505a, 505b is integrally formed with a locking piece 515a, 515b at its distal end, the locking piece having a slope 513a, 513b and protruded inwardly of the pendant body 507. A horizontal movement of the manipulation lever 505a, 505b brings the locking piece 515a, 515b into abutment against the push button 5 shaped like an arch in section, thereby depressing the push button 5.

Next, the operations of the teaching pendant of this embodiment will be described with reference to FIG. 32. When, for example, the manipulation lever 505a is moved by the left hand in a direction X in FIG. 32(a) in the first OFF state with the manipulation levers 505a, 505b unmanipulated as shown in FIG. 32(a), the locking piece 515a of the left-hand manipulation lever 505a slides on the push button 5 to depress the push button, as shown in FIG. 32(b).

Thus, the push-button switch 1 is shifted to the ON state where the teaching pendant 501 enables the teaching of the program or the like. In this state, the push button 5 can be depressed by means of the right-hand manipulation lever 505b, as well. Accordingly, even if the left hand is fatigued during the operation, the data entry may be continued by holding the pendant by the right hand.

When the left-hand manipulation lever 505a is further pulled in the direction X in the ON state shown in FIG. 32(b), the locking piece 515a of the left-hand manipulation lever 505a runs aground the push button 5 as depressing the push button 5, as shown in FIG. 32(c). Thus, the push-button switch 1 is shifted to the second OFF state.

As a result, the teaching pendant 501 is disabled for teaching of the program or the like. At this time, the push button 5 is fully depressed by the left-hand manipulation lever 505a, as shown in FIG. 32(c), so that the locking piece 515b of the right-hand manipulation lever 505b is unable to depress the push button 5. The teaching pendant 501 in this state can be shifted to the teaching mode by the steps of returning the manipulation levers 505a, 505b to the initial positions as shown in FIG. 32(a) and then turning ON the push-button switch 1 by manipulating either one of the manipulation levers 505a, 505b.

According to the seventh embodiment, the equal effect to that of the sixth embodiment is naturally achieved. Furthermore, the teaching pendant features a simple circuit configuration because there is provided only one push-button switch 1. Hence, the teaching pendant accomplishes the cost reduction.

The provision of only one push-button switch 1 offers the following merit. Once the push-button switch 1 is shifted to the second OFF state, the teaching pendant is disabled for the teaching operation unless both the manipulation levers 505a, 505b are returned to the initial positions thereby returning the push-button switch 1 to the first OFF state. This leads to an enhanced safety during the teaching operation.

According to the seventh embodiment described above, the push-button switch 1 is adapted to be depressed by the locking piece 515a, 515b of the manipulation lever 505a, 505b slidably moved on the push button 5. However, the present invention is not limited to this arrangement and a modification may be made as shown in FIG. 33, for example.

Figure 33:
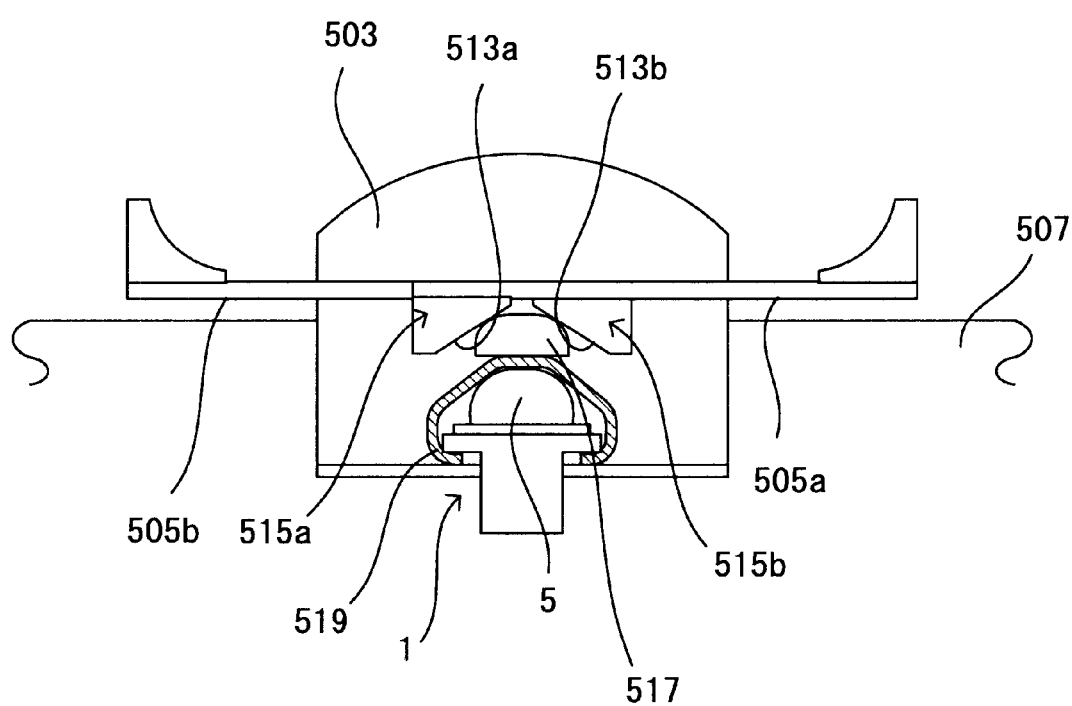
FIG. 33 is a diagram showing an exemplary modification of the teaching pendant according to the seventh embodiment hereof.
Figure 34:
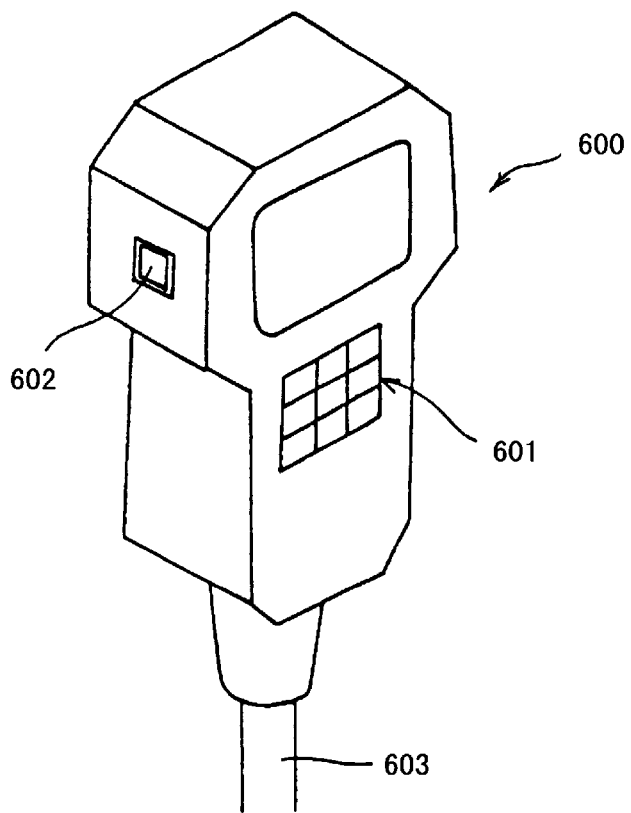
FIG. 34 is a perspective view showing a teaching pendant comprising a conventional push-button switch.
Figure 35:
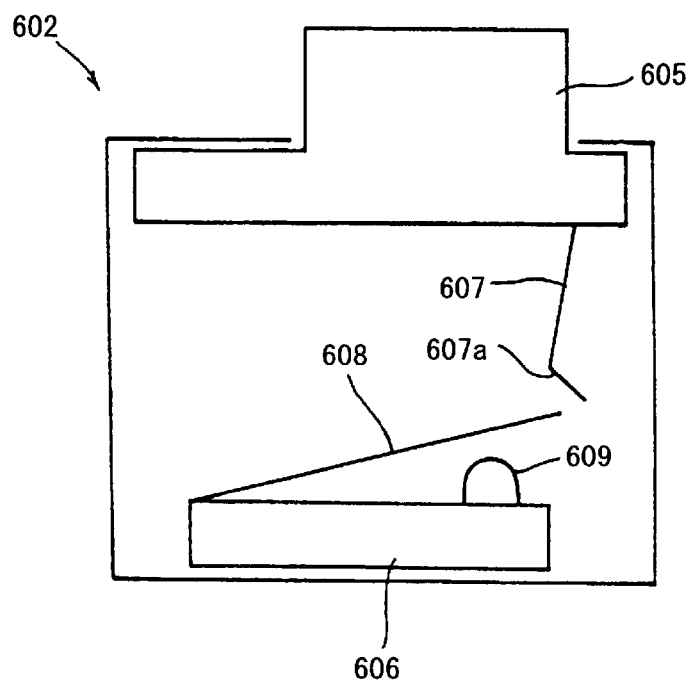
FIG. 35 is schematic diagram showing an arrangement of the conventional push-button switch.
Figure 36:
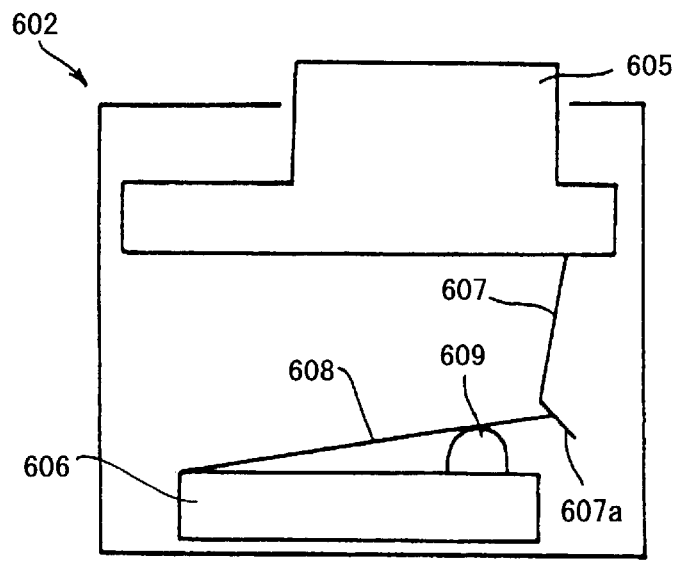
FIG. 36 is a diagram explanatory of the operations of the conventional push-button switch.
Figure 37:
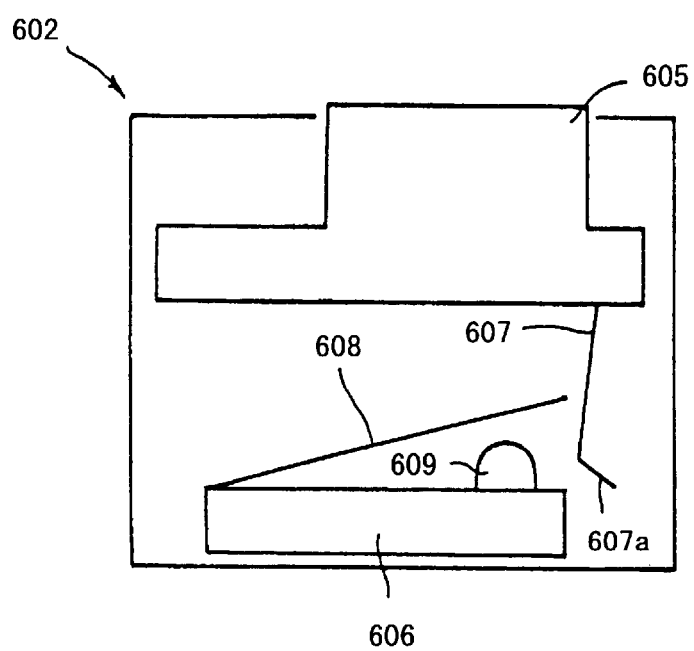
FIG. 37 is a diagram explanatory of the operations of the conventional push-button switch.
Figure 38:
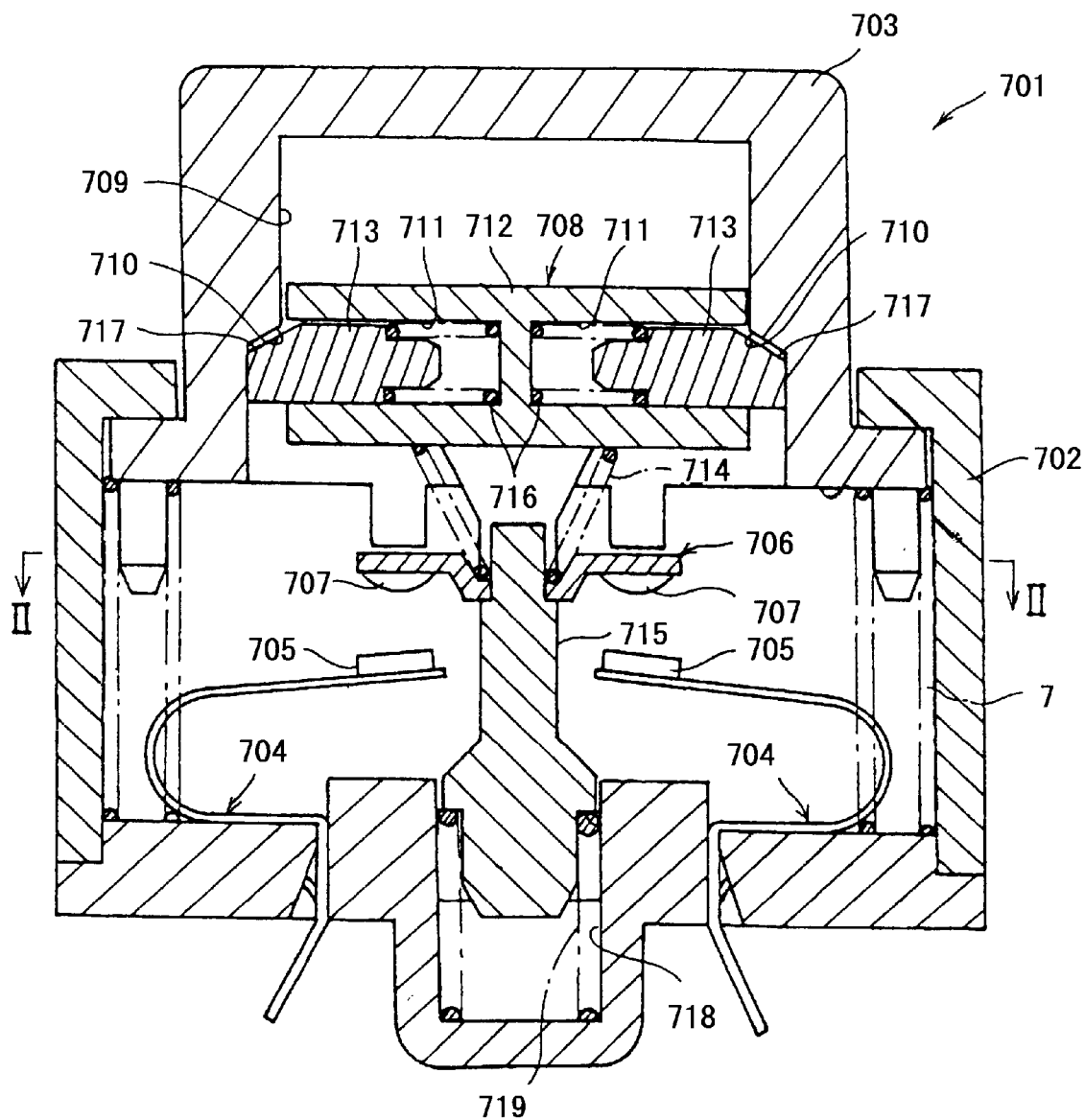
FIG. 38 is a sectional front view showing another conventional push-button switch.
Figure 39:
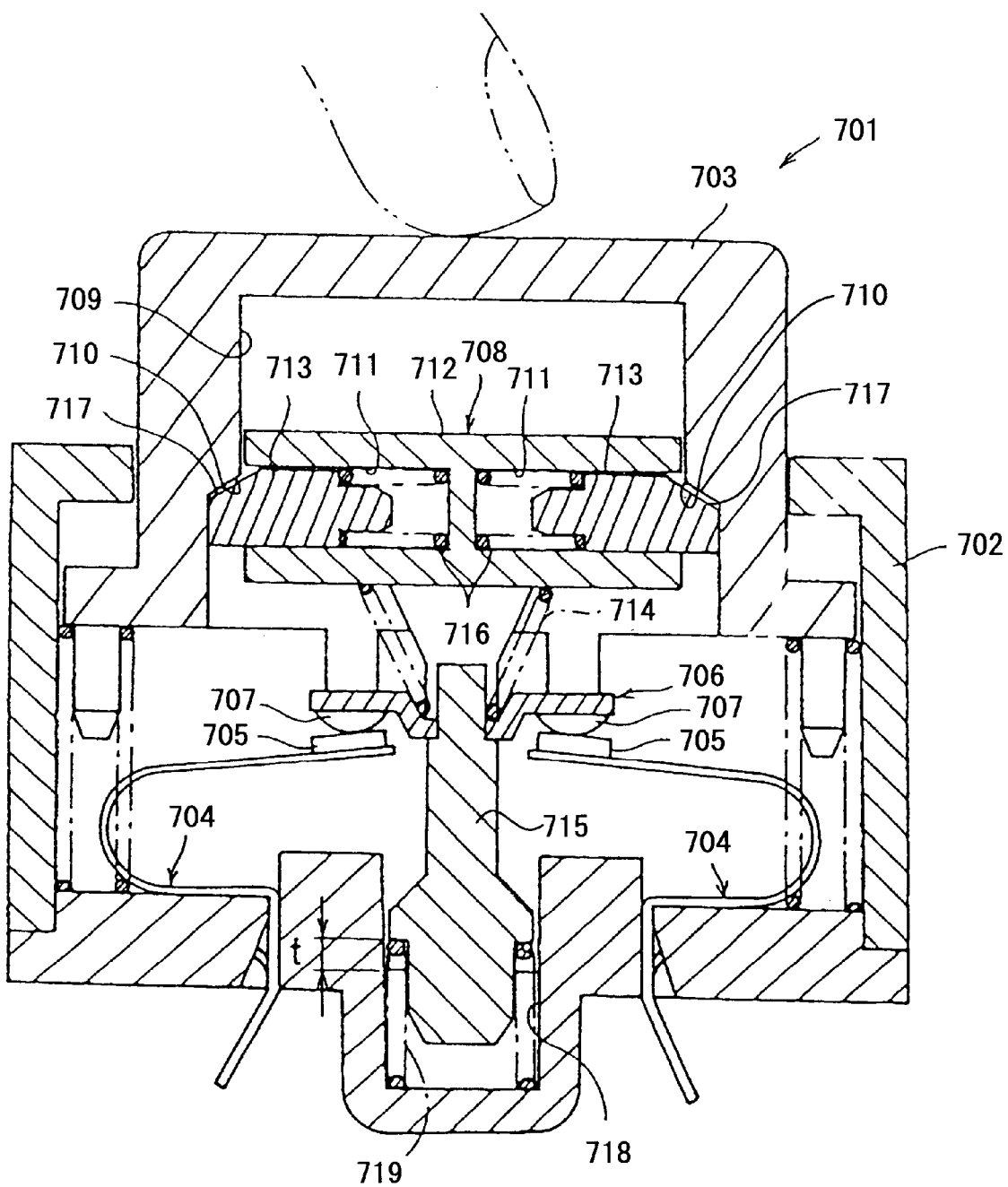
FIG. 39 is a sectional front view showing another state of the push-button switch of FIG. 38.
Figure 40:
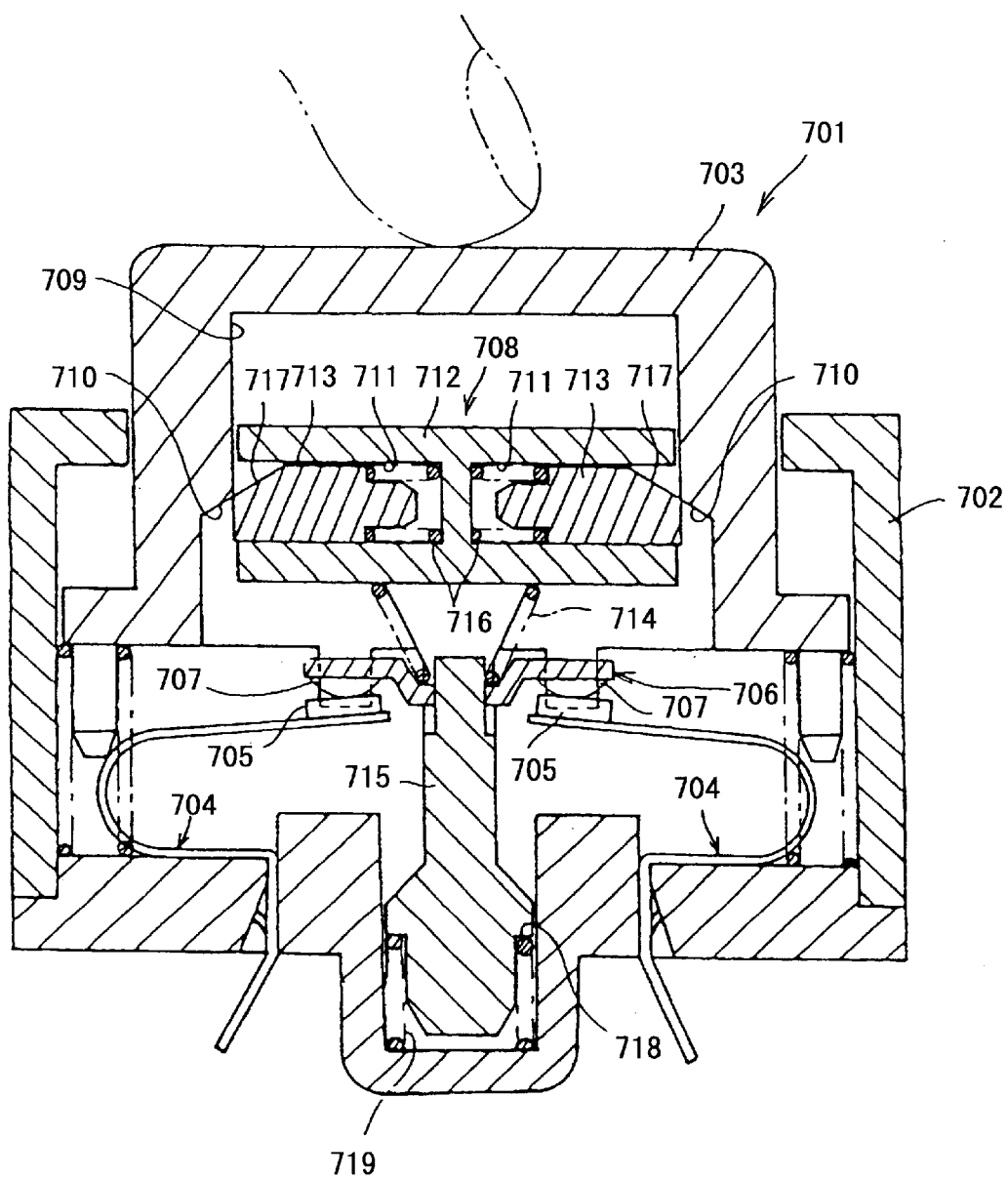
FIG. 40 is a sectional front view showing yet another state of the push-button switch of FIG. 38.
Figure 41:
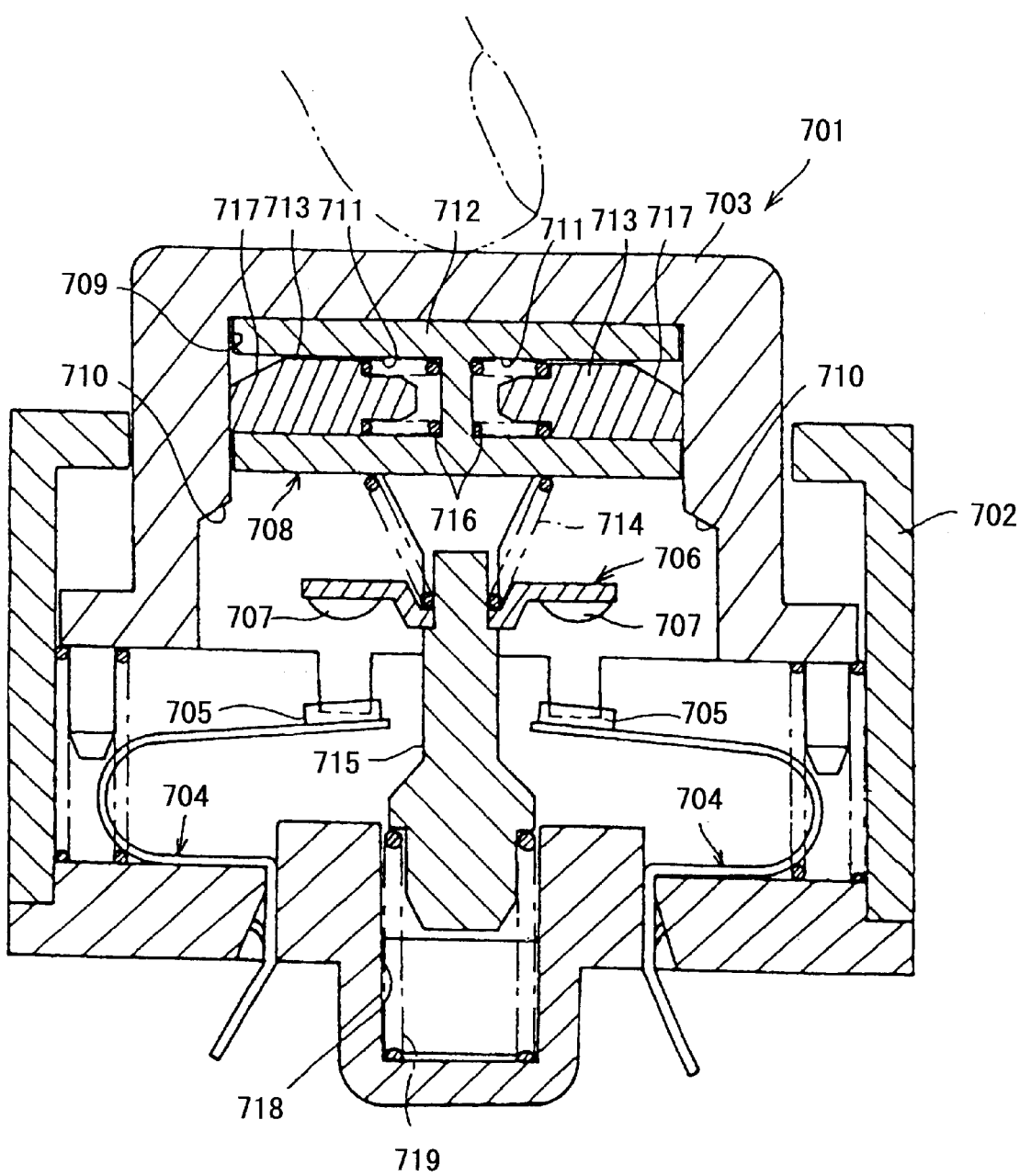
FIG. 41 is a sectional front view showing still another state of the push-button switch of FIG. 38.

As shown in FIG. 33, an alternative arrangement may be made such that an intermediary member 517 is interposed between the locking pieces 515a, 515b and the push button 5 in a manner to be movable in the direction of depression of the push button 5, and that the push button 5 id covered with a rubber cover 519.

According to this arrangement, manipulating the manipulation lever 505a, 505b causes the locking piece 515a, 515b to slide on the intermediary member 517 as moving the intermediary member 517 toward the pendant body 507. This causes the intermediary member 517 to depress the push button 5 via the rubber cover 519 thereby turning ON/OFF the push-button switch 1.

Since the locking member 515a 515b is adapted to depress the push button 5 via the intermediary member 517 and the rubber cover 519, the push button 5 is prevented from being deformed or broken by the sliding contact with the locking piece 515a, 515b. The rubber cover 519 also serves as waterproof means. However, a similar effect can be obtained by an arrangement wherein the rubber cover 519 is dispensed with and only the intermediary member 517 is provided for depressing the push button 5.

Incidentally, the push-button switch 1 of the seventh embodiment may be replaced by any one of the push-button switches of the second to fifth embodiments.

As a matter of course, the push-button switches of the second to fifth embodiments may each be provided with three or more c-contacts.

As a matter of course, the push-button switches of the first, the second, the fourth and the fifth embodiments may each be provided with the external button such as illustrated by the third embodiment.

In the push-button switches of the foregoing embodiments, the push button portion may be replaceable.

It is preferred that the push-button switches of the foregoing embodiments are provided with the waterproof configuration which may be constituted by the rubber cover such as illustrated by the third embodiment or by a packing interposed in the push button portion.

It is to be noted that the present invention is not limited to the foregoing embodiments and other various changes and modifications may be made thereto within the spirit and scope of the present invention.

INDUSTRIAL APPLICABILITY

As mentioned supra, the push-button switch according to the present invention is provided with two or more contacts in the case for switching ON/OFF the push-button switch, the contacts adapted to be turned ON/OFF at a time by depressing a single push button. In the event of a failure of one of the contacts, for example, the push-button switch can be switched ON/OFF by way of the other contacts. Thus, the push-button switch is enhanced in reliability.

Since the contact has a so-called snap action configuration, a proper tactile click-touch or click sound is produced at the transition of the push-button switch from the first OFF state to the ON state or from the ON state to the second OFF state. This assists the operator depressing the push button 5 in determining whether or not the push-button switch 1 is in the ON state enabling the data entry. Thus, a push-button switch featuring a good reliability is provided.

The teaching pendant of the present invention is arranged such that while one of the push-button switches is in the second OFF state, the operation of the other push-button switch via the other operation section is disabled. Therefore, the data entry operation is not effected if, for example, an operation is made to turn ON the other push-button switch.

What is claimed is:

1. A push-button switch designed to be switched OFF-ON-OFF by depressing a button comprising:

a switch case; a push button depressibly supported by said switch case; a contact comprising a movable terminal disposed in said switch case in a manner that a first end thereof is rotatable about a second end thereof, and a normally open stationary terminal fixed to place in said switch case and arranged to be in or out of contact with said movable terminal through rotation of the first end of said movable terminal; an operative member disposed in said switch case in a manner that a first end thereof is rotatable as interlocked with depression of said push button; urging means having its opposite ends locked to the first end of said movable terminal and the first end of said operative member for urging the first end of said movable terminal while urging the first end of said operative member in a first direction; and releasing means brought into action by more than a predetermined amount of depression of said push button to release said operative member from interlocked relation with said push button, wherein when in conjunction with increase of an amount of depression of said push button, an amount of rotation of the first end of said operative member against said urging means is increased to a first dead point at which an urging force applied by said urging means to said movable terminal is changed from the first direction to a second direction, said movable terminal is brought into contact with said normally open stationary terminal thereby shifting said contact from a first OFF state to an ON state, wherein when the amount of rotation of the first end of said operative member released from the rotation against said urging means reaches a second dead point at which the urging force applied by said urging means to said movable terminal is changed from the second direction to the first direction, said movable terminal is moved away from said normally open stationary terminal thereby shifting said contact from said ON state to a second OFF state, and wherein two or more of said contacts are disposed in said switch case and are simultaneously turned ON or OFF by depressing said push button.

2. The push-button switch as claimed in claim 1, wherein as to transition from said ON state to said first OFF state resulting from eased depression of said push button, the amount of rotation of the first end of said operative member to reach said second dead point is set smaller than the amount of rotation of the first end of said operative member to reach said first dead point.

3. The push-button switch as claimed in claim 1, wherein one of said contacts includes a normally close stationary terminal, and wherein the one contact maintains said movable terminal and said normally close stationary terminal thereof in contacted relation when the other contacts are in said first OFF state, maintaining said movable terminal and said normally close stationary terminal thereof in separated relation when the other contacts are in said ON state, maintaining said movable terminal and said normally close stationary terminal thereof in contacted relation when the other contacts are in said second OFF state.

4. The push-button switch as claimed in claim 1, wherein an auxiliary contact is disposed in said switch case, said auxiliary contact designed to be opened or closed when said contacts are in said first OFF state and to be closed or opened when said contacts are in said second OFF state.

5. The push-button switch as claimed in claim 4, wherein said auxiliary contact is provided in correspondence to each of said contacts.

6. The push-button switch as claimed in claim 4 or 5, wherein said auxiliary contact comprises a normally close contact designed to be closed when said contacts are in said first OFF state and to be opened when said contacts are in said second OFF state, and is provided with forcible separation means for forcibly opening said auxiliary contact in said second OFF state.

7. The push-button switch as claimed in any one of claims 1 to 5, comprising a distribution member for evenly distributing a pressing load applied by depressing said push button.

8. The push-button switch as claimed in any one of claims 1 to 5, comprising a rubber cover mounted to place in a manner to cover said push button.

9. The push-button switch as claimed in any one of claims 1 to 5, comprising an external button mounted to place in a manner to cover said push button.

10. A teaching pendant including the push-button switch as claimed in any one of claims 1 to 5, wherein a pendant body includes a left-hand and a right-hand operation sections to be held in a left hand and a right hand, respectively, each of said operation sections including said push-button switch at an inner side thereof to be operated by gripping, and wherein gripping either one of said operation sections shifts said push-button switch therein to said ON state thereby enabling a data input operation.

11. The teaching pendant as claimed in claim 10, wherein when either one of said operation sections is gripped to shift said push-button switch therein to said second OFF state, the gripping of the other operation section does not enable an operation of said push-button switch therein.

12. A teaching pendant including the push-button switch as claimed in any one of claims 1 to 5, wherein a pendant body is provided with one piece of said push-button switch and a right-hand and a left-hand manipulation levers to be gripped by a right hand and a left hand, respectively, for operative depression of said push-button switch, and wherein either one of said manipulation levers is manipulated to shift said push-button switch to said ON state thereby enabling a data input operation.

13. The teaching pendant as claimed in claim 12, wherein when either one of said manipulation levers is gripped to shift said push-button switch to said second OFF state, the gripping of the other manipulation lever does not enable an operation of said push-button switch.

* * * * *